(12) United States Patent
Nakamura

(10) Patent No.: US 7,542,877 B2
(45) Date of Patent: Jun. 2, 2009

(54) COMPUTER SYSTEM AND METHOD FOR CONTROLLING COMPUTER SYSTEM

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 11/640,949

(22) Filed: Dec. 19, 2006

(65) Prior Publication Data

US 2008/0004841 A1    Jan. 3, 2008

(30) Foreign Application Priority Data

Jun. 30, 2006   (JP)   .............................. 2006-181263

(51) Int. Cl.
  *G06F 15/00*   (2006.01)
(52) U.S. Cl. ...................................... 702/185; 702/182
(58) Field of Classification Search .................. 700/21, 700/26, 33, 34, 36, 89, 306; 702/182, 185
  See application file for complete search history.

(56) References Cited

U.S. PATENT DOCUMENTS

| | | | | |
|---|---|---|---|---|
| 7,142,990 | B2 * | 11/2006 | Bouse et al. .................. | 702/35 |
| 2005/0015665 | A1 | 1/2005 | Kato et al. | |
| 2005/0193281 | A1 | 9/2005 | Ide et al. | |

FOREIGN PATENT DOCUMENTS

| | | |
|---|---|---|
| JP | 2005-038223 | 7/2003 |
| JP | 2005-216066 | 1/2004 |
| JP | 2005-327261 | 4/2005 |

OTHER PUBLICATIONS

Nakamura, Takahusa, et al., "Introduction to Statistics—Chapter IV Organizing Bivariate and Multivariable Data", University of Tokyo Press, 1989, ISBN 04-13-04 2060-7, pp. 67-89 in Japanese with partial English translation.
Cristianini, Nello, et al., "An Introduction to Support Vector Machines: and Other Kernel-Based Learning Methods—Chapter 6.1 Support Vector Classification", Cambridge University Press 2000, Kyoritsu Shuppan Co., Ltd., 2005, ISBN 4-320-12134-1, pp. 93-113, in English, pp. 129-149 in Japanese.

(Continued)

*Primary Examiner*—Edward R Cosimano
*Assistant Examiner*—Douglas N Washburn
(74) *Attorney, Agent, or Firm*—Reed Smith LLP; Juan Carlos A. Marquez, Esq.

(57) ABSTRACT

Provided is a control method for a computer system including at least one computer, including: collecting information on operating statuses of the computer system; storing correlation information indicating a correlation among the collected pieces of information; at least one of: detecting a failure that has occurred in a service executed in the computer system from the collected information with reference to the correlation information and creating a process of recovering the detected failure; and accepting an input of a process performed with respect to the computer system; evaluating an effect and a side-effect given to the computer system through execution of at least one of the created process and the inputted process with reference to the correlation information; and determining at least one of a need, an order, and time of execution of the at least one process whose effect and side-effect are evaluated.

18 Claims, 28 Drawing Sheets

OTHER PUBLICATIONS

Zhang, Steve, et al., "Ensembles of Models for Automated Diagnosis of System Performance Problems", Jun. 28, 2005, pp. 1-20.

Bodik, Peter, et al, "Combining Visualization and Statistical Analysis to Improve Operator Confidence and Efficiency for Failure Detection and Localization", Autonomic Computing, 2005. ICAC 2005, Proceedings. Second International Conference, Jun. 13, 2005, pp. 89-100.

* cited by examiner

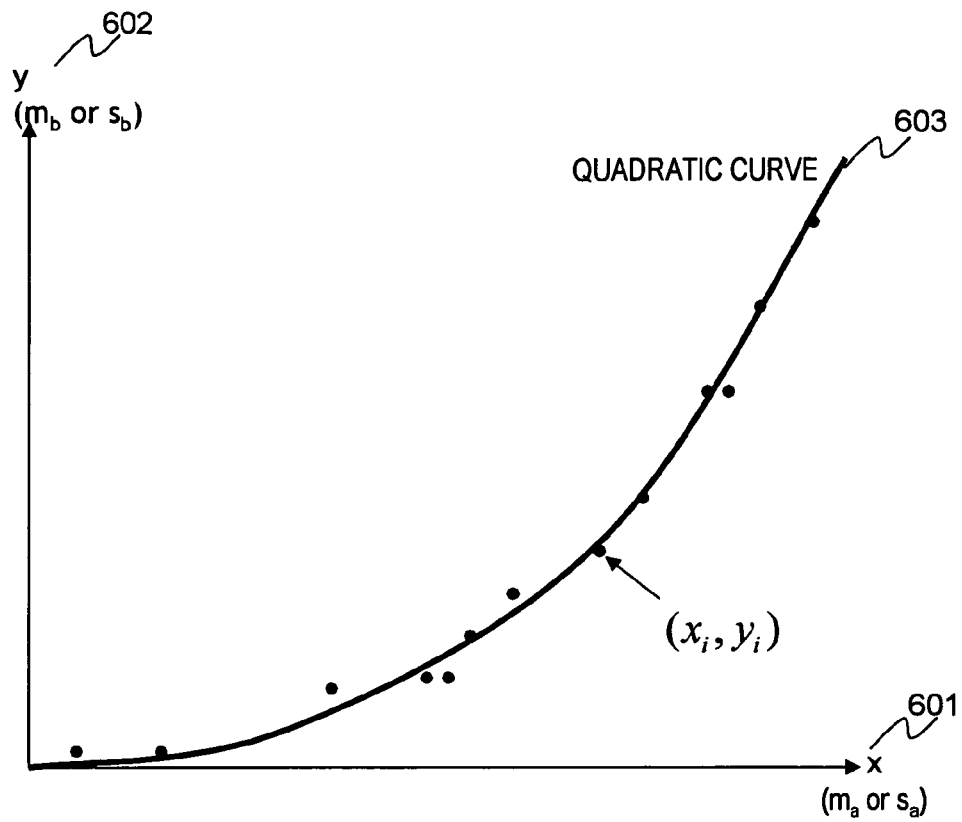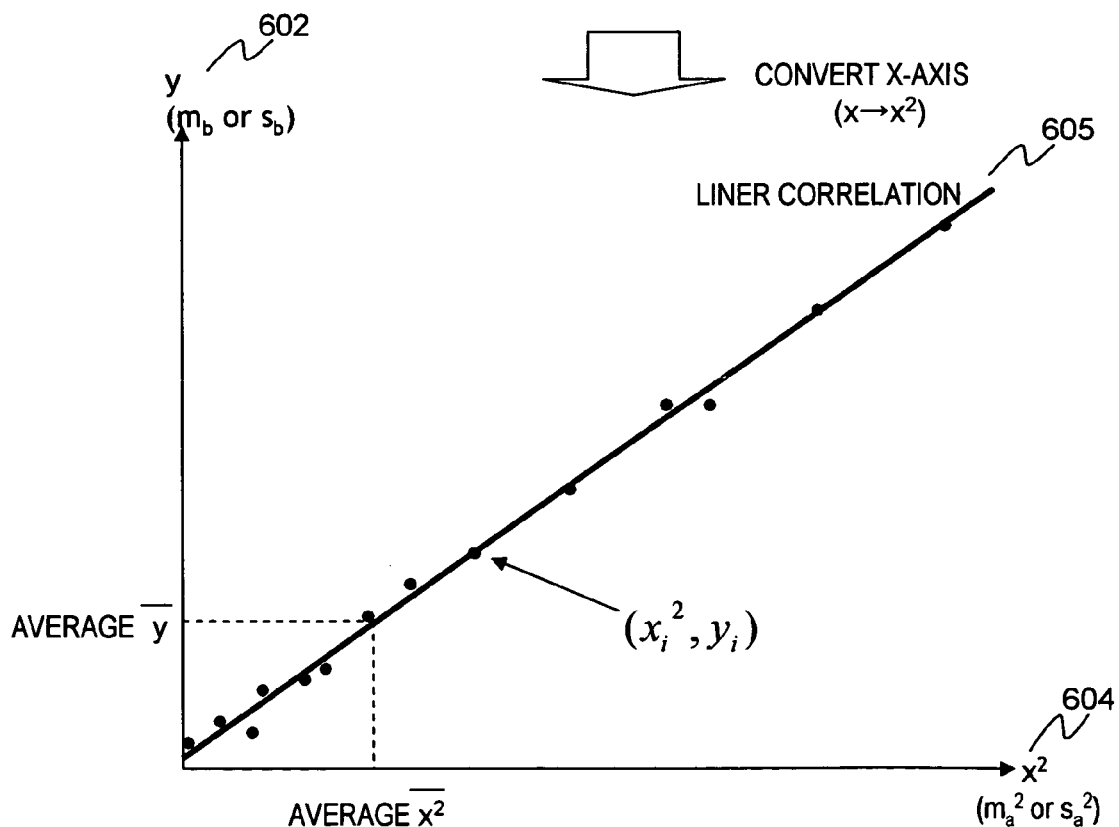
FIG.6

| TIME | EVENTS,PROCESSES ($e_A$, $p_A$) | $m_1$ | $m_2$ | .. . | $m_W$ | $s_1$ | $s_2$ | .. . | $s_X$ |
|---|---|---|---|---|---|---|---|---|---|
| $t_{a+1}$ | NO | $m_{1\_a+1}$ | $m_{2\_a+1}$ | .. . | $m_{W\_a+1}$ | $s_{1\_a+1}$ | $s_{2\_a+1}$ | .. . | $s_{X\_a+1}$ |
| $t_{a+2}$ | GENERATE/ EXECUTE | $m_{1\_a+2}$ | $m_{2\_a+2}$ | .. . | $m_{W\_a+2}$ | $s_{1\_a+2}$ | $s_{2\_a+2}$ | .. . | $s_{X\_a+2}$ |
| $t_{a+3}$ | GENERATE/ EXECUTE | $m_{1\_a+3}$ | $m_{2\_a+3}$ | .. . | $m_{W\_a+3}$ | $s_{1\_a+3}$ | $s_{2\_a+3}$ | .. . | $s_{X\_a+3}$ |
| ⋮ | NO | ⋮ | ⋮ | .. . | ⋮ | ⋮ | ⋮ | .. . | ⋮ |
| $t_{a+x}$ | NO | $m_{1\_a+x}$ | $m_{2\_a+x}$ | .. . | $m_{W\_a+x}$ | $s_{1\_a+x}$ | $s_{2\_a+x}$ | .. . | $s_{X\_a+x}$ |

(EXAMPLE) CORRELATION BETWEEN EVENT $e_A$ AND MONITORING DATA $m_1$

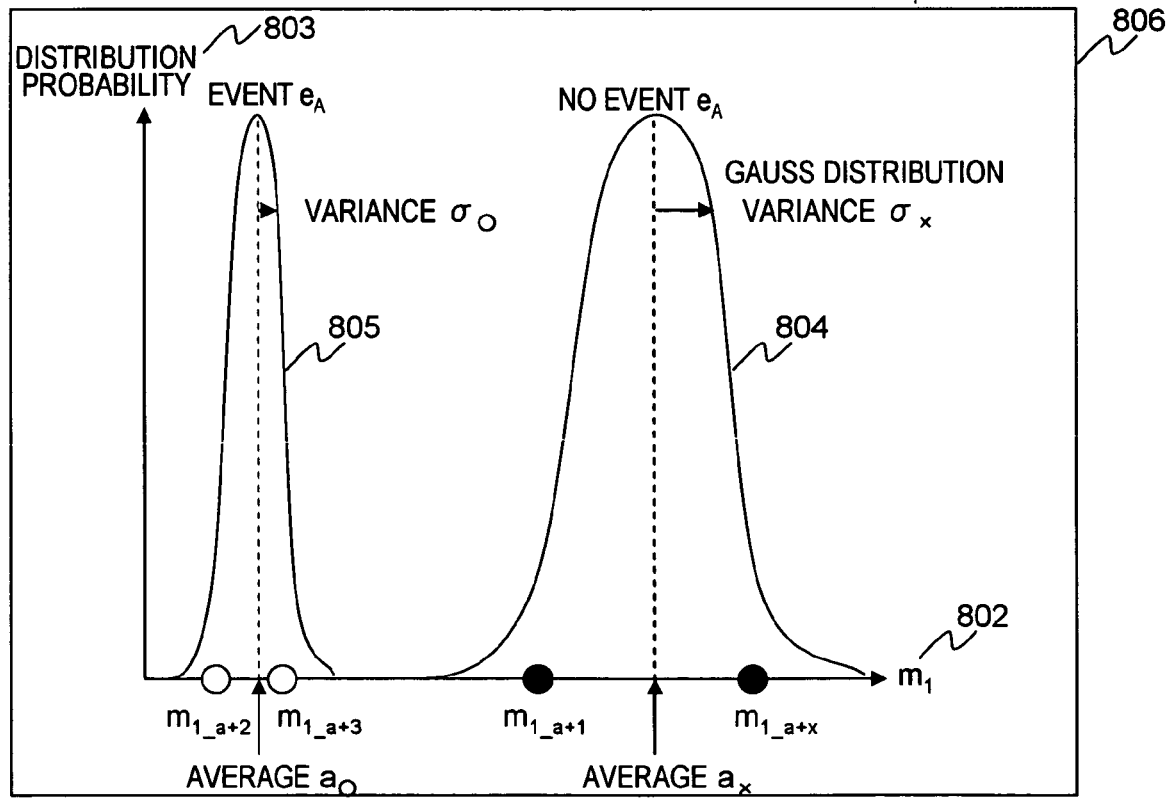

FIG.8

COMPUTER SYSTEM AND METHOD FOR CONTROLLING COMPUTER SYSTEM

CLAIM OF PRIORITY

The present application claims priority from Japanese patent application 2006-181263 filed on Jun. 30, 2006, the content of which is hereby incorporated by reference into this application.

BACKGROUND OF THE INVENTION

This invention relates to a computer system having a function of preventing an occurrence of a failure and recovering a failure that has occurred, in particular, a method of controlling a failure prevention/recovery process.

Along with developments in computer technology, a computer system has been closely related to various social activities. The use of an advanced computer system has encouraged the spread of online trading and e-commerce in which transactions of a large amount of money and commodities are processed in a short time, which has made the computer system indispensable in finance, distribution, and service industries. The computer system is also used in, for example, plant control at a nuclear electric plant, etc., operation control of an aircraft, a train, etc., and administrative services such as e-government services, thereby playing an important role in a social infrastructure.

As described above, the computer system has become an indispensable element in various social activities. Therefore, once a failure occurs in the computer system (hereinafter, abbreviated as system failure) leading to a function decline, an abnormal operation, and a service suspension in the computer system, it has a tremendous impact on society, resulting in a massive loss of money, collapse of credibility, and social confusion.

Meanwhile, the use of an open system has become widespread. The open system employs various types of hardware and software produced by different manufactures which are combined to construct a computer system mainly for the purpose of a cost reduction in the computer system. The spread of the open system is attributable to the development in the openness of external specifications of software and hardware, along with the performance enhancement and the cost reduction in general hardware components and with the technological advancement of open source software.

The open system allows a user to construct a computer system by combining optimal products in terms of cost, function, or the like. On the other hand, since the computer system is realized by the combination of a plurality of products produced by different manufactures, a trouble may occur due to incompatibilities between the products. Further, the computer system has become more complicated due to the segmentation of function, which makes it more difficult to investigate the cause of the system failure once it occurs.

One example of the above-mentioned computer system includes a Web system. The Web system is used in, for example, e-commerce, for connecting a plurality of suppliers and a plurality of consumers, making it easy to conduct rapid transaction and payment through an electronic banking system in order to deal with a flow of goods that varies from hour to hour. A system failure, which has occurred in the Web system described above, leads to a disruption or the like in the flow of goods or the payment process, wielding a very large influence over the economic activities.

The Web system is typically constituted of a 3-tier system, which includes a Web server, an application server, and a database server. Each of the tiers is constituted of one or more computers. Each of the computers often includes a plurality of types of hardware or software produced by different manufacturers. In the Web system, the Web server accepts a request from a client. The application server performs a process corresponding to the request accepted by the Web server. In performing the process, the application server runs a query and issues a request to the database server, and returns the results obtained with respect to the query and the request to the client through the Web server, to thereby complete the process.

As described above, in the recent computer system, a process corresponding to one request is realized by a combination of a plurality of hardware components and a plurality of software components (hereinafter, collectively referred to as system component). Accordingly, an error/failure occurring in one of the components may affect other system components, which may develop into a system failure.

However, it is difficult to make it all clear how the system components are interacting with one another, because the computer system is realized by the combination of various system components produced by different manufacturers. Further, different processes which are performed in correspondence with a plurality of different requests may affect one another when the processes are performed in parallel. Therefore, it is difficult to identify what kind of error/failure has occurred in what location and the size of the impact of the error/failure. It is also difficult to immediately detect the occurrence of the system failure itself.

In order to solve the above-mentioned problems, there have been proposed various solutions.

JP 2005-216066 A discloses a method of monitoring a system in which a plurality of computer systems operate while interacting with one another, to thereby detect on line an error/failure occurring in the computer system. According to the method, a service to be realized on the computer system by a program is stored in association with a transaction log over the plurality of system components in order to realize the service, and an occurrence of an abnormal pattern in a transaction different from the normal pattern is detected based on a probability model, to thereby detect the occurrence of an error/failure. However, according to the method, it is not possible to detect an error/failure when the transaction pattern exhibits no change.

JP 2005-216066 A also discloses a method of extracting a correlation between monitoring data such as a monitoring value in the computer system and an event such as an input from an operation management tool or a user, retrieving a past correlation based on the monitoring data to extract the event currently being generated, to thereby detect a system failure. However, according to this method, it is not possible to determine how much of effect or side-effect is to be produced by a failure prevention process or a failure recovery process. It is not possible either to store, into the correlation information, information for determining the effect or side-effect.

JP 2005-38223 A discloses a method of detecting an operating status of a computer system, retrieving a plurality of rules corresponding to the current operating status of the computer system from among conditional expressions described as rules, comparing the effects to be obtained by each of the plurality of rules thus retrieved with respect to the countermeasures to deal with a certain problem, the countermeasures being described in the plurality of rules, selecting a countermeasure having the highest effect and executing the countermeasure thus selected, to thereby update the effects described in the rules based on the actual effect obtained by the execution of the countermeasure. According to this method, it is not possible to perform a failure prevention process or a recovery process that is not described in the rules. Also, an update which is to be made with respect to the effect obtained by the execution of the countermeasure or the priority of the process matters is performed only to the indexes included in the conditional expressions described in the rules, with no consideration being given to any other effects that might to be brought about to other indexes.

A conceivable example of a control method for failure prevention/recovery in a computer system, which can be attained by combining the solutions disclosed in the above-mentioned JP 2005-216066 A and JP 2005-38223 A, may be a control method of detecting an event being generated in the computer system based on a log of a plurality of computer systems, with reference to a probability model or a correlation history, preventing and recovering the failure in the computer system according to the set rules, to thereby update the rules based on the actual effect obtained by the execution of the rules.

SUMMARY OF THE INVENTION

According to the background art described above, the problems to be solved by this invention are summarized as follows.

A computer system has become an indispensable system in various fields of a social system. Along with more sophisticated use of a computer system due to the development of the technology therefor, a larger-scale and more complicated computer system has been introduced. Therefore, the impact of a system failure has rapidly growing to a greater extent on a massive scale than ever. On the other hand, there is a fear of losing credibility and availability with the computer system.

In particular, there has been a problem in that, along with the wide use of a hierarchical computer system and an open system, the computer system has become more complicated due to the segmentation of the system components constituting the computer system and the combination of a plurality of products produced by different manufacturers, which may be a main factor of reducing credibility and applicability with regard to the compatibility of the combination.

It is not realistic to securely ensure the credibility and applicability in advance with respect to all the combination of the system components, because there are a tremendous number of combinations. One of the issues that need to be resolved is to detect an occurrence of a system failure at an early stage to recover the failure, on the assumption that the system failure possibly occurs. Further, it is also necessary to predict the occurrence of the system failure to thereby prevent the failure.

In order to solve the issues, it is necessary to perform a series of control of predicting an occurrence of a system failure with high precision, detecting the failure with high precision, properly determining the cause of the system failure, and performing an appropriate failure prevention/recovery process to the cause of the system failure.

According to the conventional art described above, a correlation history is created between the monitoring value indicating, for example, a resource amount or a load in the computer system and an event being generated in the system due to, for example, an input and output operation or a change in settings made by a person, other computers, a program, or the like. Based on the correlation history thus created, an occurrence of a system failure is detected, the cause of the failure is determined, and a countermeasure is selected for recovering the failure based on the predetermined rules, to thereby solve the issue. However, in order to realize a proper prevention/recovery process according to the cause of the system failure, there are further problems as follows, and this invention has been made to solve these problems.

(Problem 1) To select a system failure prevention/recovery process and to control a command for the process, according to any dynamic change caused in the computer system, for example, in terms of a configuration, due to a user input or an external environment. In other words, Problem 1 is aimed at avoiding selecting and executing an unnecessary, insufficient, or excessive prevention/recovery process, in selecting a stationary prevention/recovery process for the system failure and in controlling a command for the process for a fixed system failure, with respect to a change in settings such as a change in a resource amount, a change in a redundant configuration, or a change in a connection status with an external network in the operating computer system. Controlling a command for the process includes setting a timing for executing the process, setting an execution order of the process, and setting a system in executing the process.

(Problem 2) To select a proper prevention/recovery process for a system failure that is not prescribed in the rules. In other words, Problem 2 is aimed at dealing with a case where an abnormal status that is not prescribed in the rules is predicted or detected, by using, for example, a method of determining an error/failure based on a change with respect to the normal operation as a failure prediction and prevention method.

(Problem 3) To control a command for a system failure prevention/recovery process in consideration of how the prevention/recovery process affects another control and vice versa. In other words, Problem 3 is aimed at, for example, selectively executing a process among redundant processes or contradicting processes and controlling the execution order of a plurality of processes, with respect to a system failure prevention/recovery process which has been selected based on the prediction of the occurrence of the system failure, the detection of the occurrence of the system failure, and the evaluation of the cause of the system failure and with respect to other processes for system, to thereby attain a control of the process so as to ensure the highly effective process without contradiction. Examples of another process performed for the system include an update of the system component due to scheduled maintenance and incidental maintenance, and a restart of the system.

(Problem 4) To select a system-failure prevention/recovery process or another process, and to control a command for the process, in consideration of a side-effect which may be subsidiary brought about to the system by the prevention/recovery process and another process, to thereby make safety provisions for the side-effect subsidiary caused in the system. In other words, Problem 4 is aimed at predicting a side-effect to be caused in the current computer system by the selected process, the process being selected from a system failure prevention/recovery process and other processes for the system. Then, the process is selected based on the result of investigation, the execution order of the processes is rearranged, and control such as additionally providing a process for dealing with a predicted side-effect is executed before the execution of the process, to thereby attain a control of ensuring the highly effective process without the side-effect.

According to a representative aspect of this invention, there is provided a control method for a computer system including at least one computer, including: collecting information on operating statuses inside and outside the computer system, on a process executed in the computer system, and on at least one of records of events that have been generated in the computer system; storing correlation information indicating a correlation among the collected pieces of information; at least one of: detecting a failure that has occurred in a service provided by the computer system from the collected information with reference to the stored correlation information and creating a recovering process the detected failure; and being inputted a process executed by the computer system; evaluating an effect and a side-effect given to the computer system through execution of at least one of the created process and the inputted process with reference to the correlation information; and determining at least one of a need, an order, and time of execution of the at least one process whose effect and side-effect are evaluated.

According to an embodiment of this invention, it is possible to create process that can produce a higher effect.

BRIEF DESCRIPTION OF THE DRAWINGS

The present invention can be appreciated by the description which follows in conjunction with the following figures, wherein:

FIG. 6 is an explanatory diagram of another example of the correlation information stored in the region A of the correlation table according to the first embodiment of this invention;

FIG. 8 is an explanatory diagram of an example of the correlation information stored in a region B of the correlation table according to the first embodiment of this invention;

DETAILED DESCRIPTION OF THE PREFERRED EMBODIMENTS

Figure 1:
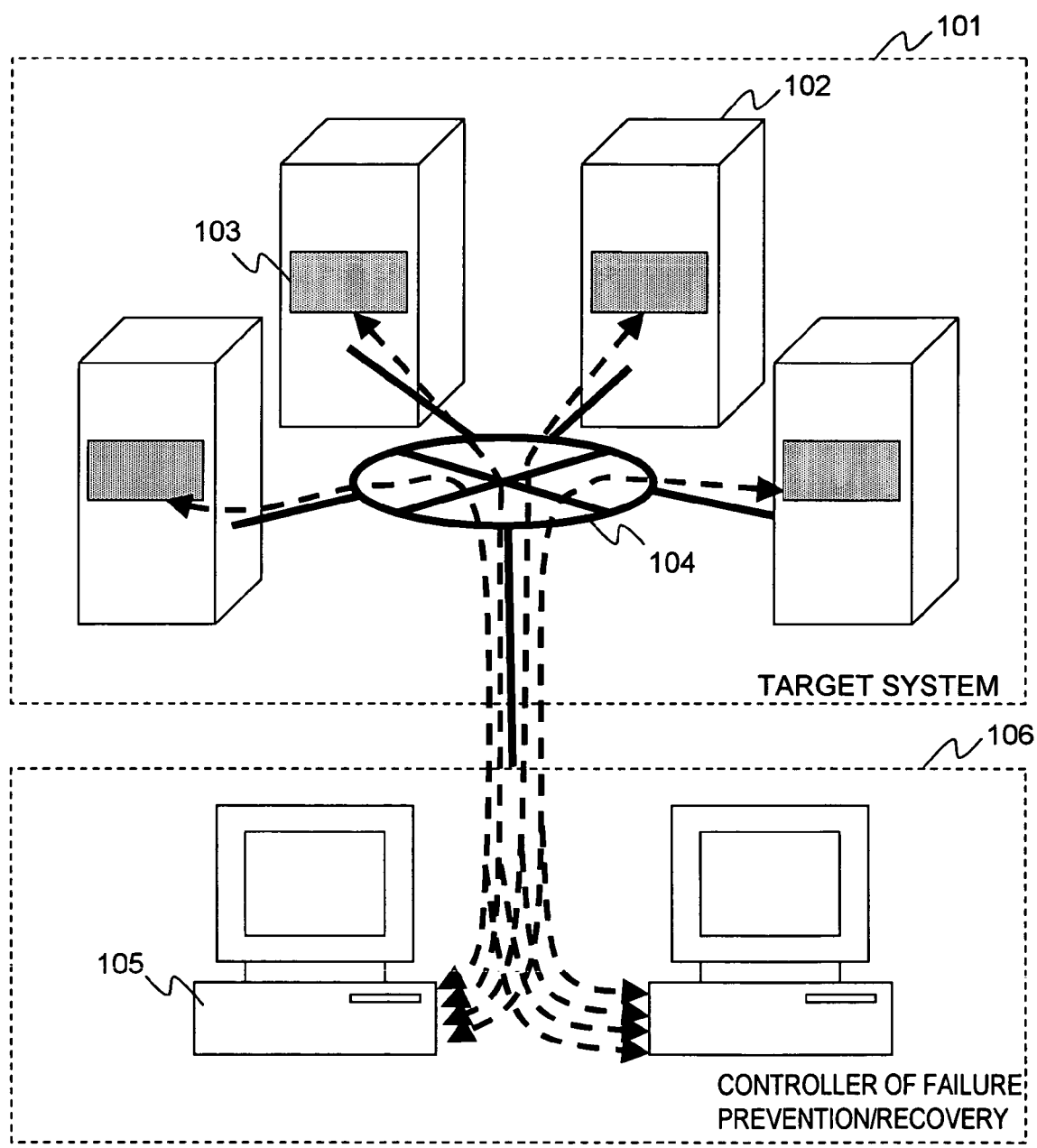
FIG. 1 is an explanatory diagram of an outline of a computer system according to an embodiment of this invention.

First, the outline of this invention will be explained.

According to this invention, there is provided a computer system having a function of preventing a failure from occurring or a function of recovering a failure that has occurred, in which a correlation history between a monitoring data indicating a resource amount, a load, or the like in the computer system, and an event being generated in the system due to an input and output operation and a change in settings made by a person, another computer, another program, or the like is used to determine the current operating status of the computer system. This invention also relates to a control method of selecting a failure prevention/recovery process, determining the side-effect to be brought about in the computer system due to other scheduled events and the execution of the selected prevention/recovery process, and selecting the execution order for the process and the process to be executed.

According to a representative embodiment of this invention, there is provided means for collecting information on an operating status of a computer system which includes a plurality of computers subject to failure prevention and recovery and a network for connecting the computers, and means for storing correlation information indicating mutual relation between the collected information and statistical data obtained by statistically processing the collected information. This invention provides a failure prevention/recovery controlling method, a computer system, and a failure prevention/recovery program, with which it is possible to detect a failure with reference to the stored correlation information, to analyze a cause of the failure, to prevent a failure, to create the failure prevention and recovery process, and to selectively execute the prevention/recovery process which can be more effective while giving less side-effect to others by predicting the effect and side-effect to others of the failure prevention/ recovery by the prevention/recovery process.

Hereinafter, the failure prevention/recovery controlling method according to this invention will be explained with reference to some specific examples.

A failure prevention/recovering controlling method (first method) according to a first embodiment of this invention is attained by a controller of failure prevention/recovery constituted of the following parts.

First, the controller of failure prevention/recovery includes a data collector/statistical processor for collecting information relating to a monitoring data item indicating an operating status, a generating event, and an executed process, and for obtaining a statistical data item through statistical processing, in order to analyze and store a status and characteristics of a target system for failure prevention and failure recovery. The controller of failure prevention/recovery also includes a correlation information storage for analyzing a correlation between collected information and statistical data items, and storing the correlation as correlation information. The controller of failure prevention/recovery further includes a correlation information updater and a correlation information abstractor for inputting and outputting information stored in the correlation information storage. The correlation information includes information indicating that, for example, two monitoring data items X and Y are in a relationship of X=aY, an event C is generated when a statistical data item D is D>0, and a statistical data item F decreases after the execution of a process E.

The controller of failure prevention/recovery further includes an error/failure detector-root cause analyzer-prevention/recovery process creator for detecting an error/failure by comparing the current status of the system with the preceding operating status of the system, by using information such as a monitoring data item indicating the current status of the system obtained from the data collector/statistical processor and correlation information obtained from the correlation information storage, in order to detect the failure, to analyze the cause of the failure, and to create a prevention process and recovery process according to the failure. The error/failure detector-root cause analyzer-prevention/recovery process creator analyzes the failure. When a failure occurs, the error/failure detector-root cause analyzer-prevention/recovery process creator creates a countermeasure corresponding to the cause of the failure based on the correlation information. A failure is detected when, for example, the two monitoring data items X and Y, which are in a relationship of X=Y according to the correlation information, are in a relationship of X>>Y according to the latest monitoring data, and it is detected that a failure that has occurred in at least one of X and Y. There may be a plurality of processes.

The controller of failure prevention/recovery further includes an effect/side-effect evaluator for evaluating an effect and a side-effect to be produced by the execution of a certain process based on the correlation information, with regard to the prevention/recovery process created by the error/failure detector-root cause analyzer-prevention/recovery process creator. Also, the controller of failure prevention/ recovery further includes a prevention/recovery process commander for issuing a command to execute the process thus created. The controller of failure prevention/recovery further includes an evaluator/commander controller for controlling the effect/side-effect evaluator and the prevention/recovery process commander. The correlation information includes, for example, changes in monitoring data and in statistical data after the execution of the process. When those changes are similar to the error/failure to be eliminated by the process, it is evaluated that the process has an effect, while when those changes deteriorates the error/failure or changes other normal values, it is evaluated that the process has a side-effect.

The effect/side-effect evaluator sends, based on the evaluation described above, the process that satisfies certain criteria as candidates for execution to the prevention/recovery process commander. The prevention/recovery process commander selects from among the execution candidates the process that is highly effective with less side-effect, adjusts the execution order with respect to other processes, and gives a command for execution to the target system. The evaluator/ commander controller controls criteria to be used for evaluation and adjustment made in the effect/side-effect evaluator and the prevention/recovery process commander. Specifically, the evaluator/commander controller, for example, sets a threshold for determining whether the process is effective, and assigning priority to either one of effect and side-effect in adjusting the execution order. The evaluator/commander controller also includes an interface for displaying an output from the error/failure detector-root cause analyzer-prevention/recovery process creator and the evaluation result of effect and side-effect, a list of candidate processes, and for adjusting a threshold and a priority order.

According to the first method, the correlation information is updated over time, and therefore a failure is detected, the cause of the failure is analyzed, the process is created, and the effect and side-effect of the process is evaluated according to a dynamic change in the computer system. Accordingly, the evaluation result of the process also changes, which makes it possible to select a proper process according to the change in configuration and execute the process. Therefore, Problem 1 can be solved.

Also, the correlation information includes such information that the statistical data item B decreases after the execution of the process A. Therefore, when an error/failure occurs in which the statistical data item B increases, the information may be searched the other way round so as to create the process A as an effective process because the process A decreases the statistical data item B. In other words, it is possible to create an effective process with respect to an unknown error/failure by searching the correlation information. Therefore, Problem 2 can be solved.

A failure prevention/recovery control method (second method) according to a second embodiment of this invention is different from the first method in the following points.

According to the first method, the correlation information is used to detect a failure, and the cause of the failure is analyzed, to thereby create a prevention/recovery process. However, it is also possible to create a process without using the correlation information. According to the second method, an prevention/recovery process command input interface is provided for giving a command for the process with respect to the effect/side-effect evaluator and an interface is used to externally designate the process, to thereby evaluate the effect and side-effect of the command for the process inputted through the interface by using the correlation information. The process command may be inputted from outside not only to deal with an error/failure when it occurs but also to change the system configuration, to update software, or to perform scheduled maintenance and incidental maintenance for a routine.

According to the second method, it is possible to evaluate the effect and side-effect of the process to be performed in response to the command inputted from outside before executing the process, and therefore it is possible to suspend the execution of the process which may produce an unexpected side-effect. Accordingly, Problems 1 and 3 can be solved.

A failure prevention/recovery control method (third method) according to a third embodiment of this invention is based on the first method and the second method to which the following points are additionally provided.

According to the third method, there is provided a feedback loop so as to feed back the process in the case where it is decided in the effect/side-effect evaluator that the process will not produce a sufficient effect or have a great side-effect to others. The error/failure detector-root cause analyzer-prevention/recovery process creator again creates the process. The prevention/recovery process command inputter, to which a command for the process is inputted from outside, accepts an input for anther command for the process in the similar manner as described above. The evaluator/commander controller controls a convergence condition for the feedback loop. For example, the feedback loop may be controlled so as to manage the generation of the created process to thereby allow the process to be fed back over the three generations at maximum.

According to the third method, it is possible to feed back the process before the execution based on the effect and side effect of the process, to thereby make it possible to make safety provisions for the side-effect subsidiary caused in the system. Therefore, Problem 4 can be solved.

A failure prevention/recovery control method (fourth method) according to a fourth embodiment of this invention is based on the third method to which the following points are additionally provided.

According to the third method, there is provided a feedback loop so as to feed back the process in the case where the process will have a great side-effect to others. However, there may be a case where a proper process cannot be found even if the process is fed back. In view of this, according to the fourth method, there is provided an side-effect reduction process creator for creating other processes to reduce side-effect to others, to thereby realize prevention and recovery of a failure by using the plurality of the processes thus created. The additional processes can be created by searching for the process that produces an effect to reduce the side-effect, based on the correlation information. According to the fourth method, similarly to the third method, the evaluator/commander controller performs control so as to restrict the recursive creation of the process, to thereby avoid an endless loop from being formed due to the recursive creation of the side-effect reduction process.

According to the fourth method, it is possible to execute a highly-effective failure recovery/prevention process while suppressing side-effect to others. Therefore, Problem 4 can be solved.

A failure prevention/recovery control method (fifth method) according to a fifth embodiment of this invention is based on the first to fourth methods in which the following points are expanded.

The correlation information according to the first to fourth methods includes information storing a correlation between a monitoring data item, a statistical data item, an event, and a process at a certain point of time. However, a failure may relate, on the time axis, to an index of another point of time. According to the fifth method, the correlation information storage stored a correlation of the monitoring data etc. in such a manner that a correlation in the past and a correlation at present are both stored.

According to the fifth method, it is possible to extract and use more correlation information, to thereby enhance the possibility to execute the process that is highly effective but has less side-effect.

A failure prevention/recovery control method (sixth method) according to a sixth embodiment of this invention is based on the first to fifth methods in which the following points are expanded.

The correlation information according to the first to fifth methods includes a correlation based on each event and process as a unit. However, there may be an interdependence, on the time axis, among events, or between an event and a process. According to the sixth method, the correlation information storage stores a correlation based on a series of events or a sequence of processes as a unit.

According to the sixth method, similarly to the fifth method, it is possible to extract and use more correlation information, to thereby enhance the possibility to execute the process that is highly effective but has less side-effect.

Next, the outline of a computer system according to this invention will be explained with reference to FIG. 1, prior to the explanation to be given of each embodiment of this invention.

As shown in FIG. 1, the computer system according to this invention includes a target system 101 and a controller of failure prevention/recovery 106.

The target system 101 includes one or more computers 102 and a network 104 connecting the computers 102. The computers 102 each include a processor for performing computations, a storage for storing data and a program to be used for the computation performed by the processor, and an interface connected to the network 104.

The processor performs various processes by invoking various programs stored in the storage and executing the programs. The network interface includes, for example, a LAN card capable of communicating by using a TCP/IP protocol. The computer 102 is capable of communicating with devices such as a computer 105 connected to the network 104 through the network interface.

Each of the computers 102 includes an agent 103 for exchanging information with the controller of failure prevention/recovery 106 by executing a program, and executing the process according to an instruction given by the controller of failure prevention/recovery 106.

The agent 103 communicates with the controller of failure prevention/recovery 106 through the network 104. One or more of the agents 103 may be provided to each of the computers 102. Alternatively, the agent 103 may be shared by a plurality of the computers 102. It is also possible to provide the agent 103 to only one of the computers 102, while the rest of the computers 102 may not include the agent 103.

The controller of failure prevention/recovery 106 includes one or more computers 105. Those computers 105 are connected to the network 104, each exchange information with each of the computers 102 in the target system 101, and issues a command for various processes to each computers 102.

The computers 105 each include a processor for performing computations, a storage for storing data and a program to be used for the computation performed by the processor, and an interface connected to the network 104.

The processor performs various processes by invoking various programs stored in the storage and executing the programs. The network interface includes, for example, a LAN card capable of communicating by using a TCP/IP protocol. The computer 105 is capable of communicating with devices such as a computer 102 connected to the network 104 through the network interface.

As shown in FIG. 1, the controller of failure prevention/recovery 106 may be constituted of the computers 105 that are different from those in the target system 101. It is also possible to construct the controller of failure prevention/recovery 106 by the computers 102 in the target system 101. In this case, the controller of failure prevention/recovery 106 is included in the target system 101.

Next, embodiments of this invention will be described individually with reference to the drawings.

First Embodiment

Figure 2:
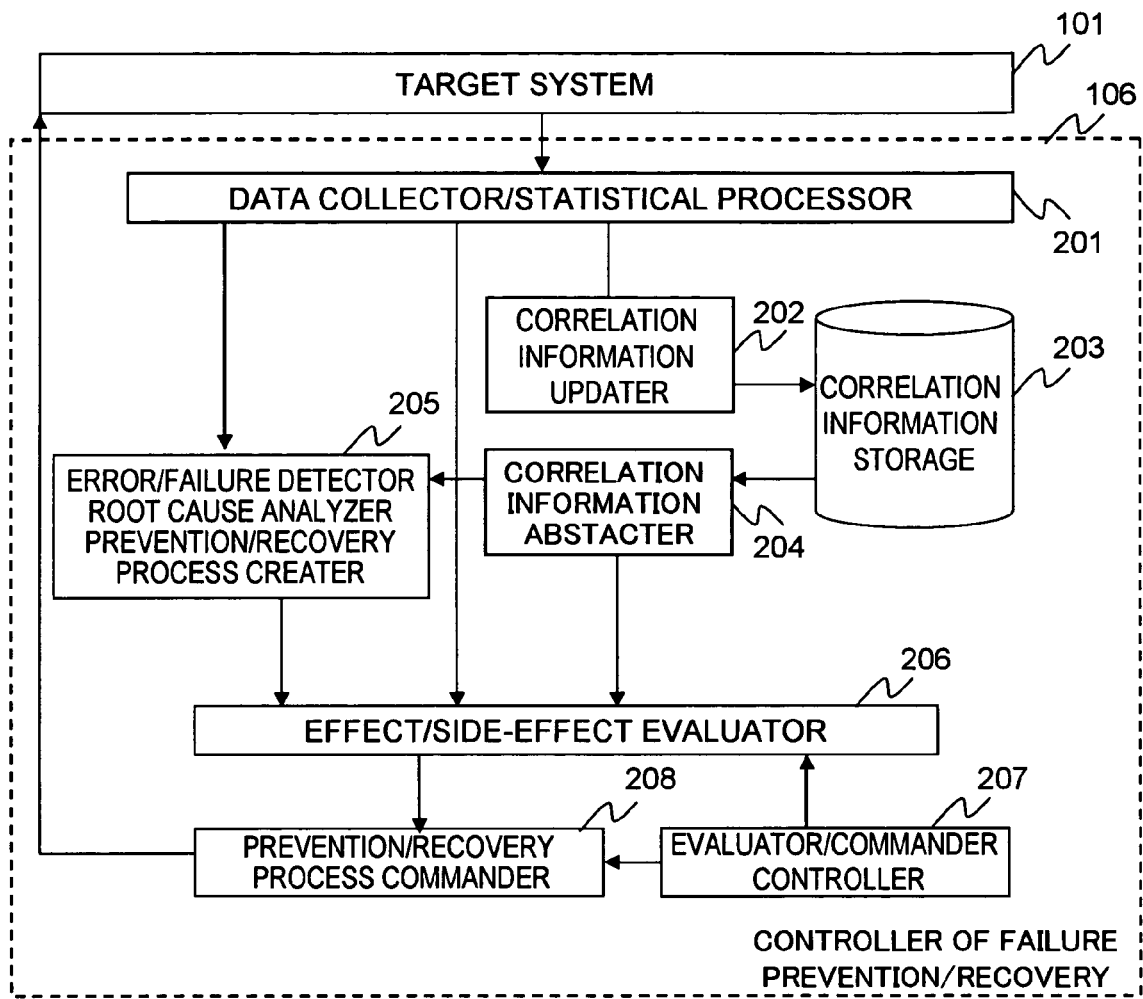
FIG. 2 is a block diagram showing a configuration of a controller of failure prevention/recovery according to a first embodiment of this invention.

FIG. 2 is a block diagram showing a configuration according to a first embodiment of this invention.

As shown in FIG. 2, a computer system of the first embodiment includes a target system 101 and a controller of failure prevention/recovery 106. Since main components relating to the control method according to this invention are included in the controller of failure prevention/recovery 106, the controller of failure prevention/recovery 106 will be described in detail below.

The controller of failure prevention/recovery 106 collects pieces of information, and extracts, accumulates, and reads out correlation information. Then, the controller of failure prevention/recovery 106 detects error/failure of the computer system using the collected information and correlation information, analyzes a root cause of the error/failure, prevents the error/failure, creates recovery process, evaluates an effect and side-effect of the recovery process, and instructs the target system of the process. Further, the controller of failure prevention/recovery 106 controls the operations described above.

Thus, the controller of failure prevention/recovery 106 includes a data collector/statistical processor 201, a correlation information updater 202, a correlation information storage 203, a correlation information abstracter 204, an error/failure detector-root cause analyzer-prevention/recovery process creator 205, an effect/side-effect evaluator 206, an evaluator/commander controller 207, and a prevention/recovery process commander 208. Those components are implemented by executing a program stored in the storage by the processor.

The data collector/statistical processor 201 collects from the target system 101 monitoring data indicating an operation status, events generated in the target system 101, and information on the process executed by the target system 101. The monitoring data collected by the data collector/statistical processor 201 includes: a system monitoring data such as a usage rate of a CPU and an amount of a memory usage; monitoring data collected by an operating system, such as the number of occurrence of page faults and the number of occurrence of interruption processing; monitoring data collected by middleware, such as the number of function calls; and monitoring data indicating the operation status included in a log outputted by respective applications.

In this invention, the pieces of monitoring data are measurement data outputted time-sequentially or periodically. For example, the number of calls for the processing is represented by a number sequence aligned in time-sequence order of 0, 2, 0, 1, 3, . . . for each unit time.

The events generated in the target system 101 include: information on a diagnosis result or the like of hardware, such as a parity error of a memory; information on the operation of software, such as garbage collection of a memory system; information on the control of a system component, such as load adjustment of applications; and information on a change of environment outside, such as disconnection of external networks and decrease in power supply voltage. In this invention, the events are measurement data outputted with an interval of a relatively long period of time, or at an undefined time interval. For example, in the case of a breakdown of the hardware or the like, the executed process is represented by a combination of the time and contents of the event, such as "generated in portion $H_1$ at time $T_1$" or "generated at portion $H_2$ at time $T_2$".

The process executed by the target system 101 includes: information on commands or the like to the system, such as change of configuration and reactivation of the system instructed by an administrator; and information on change of settings of the program, command to the software, such as execution of a query to the database, and the like inputted by a user. In this invention, the executed process is measurement data outputted with an interval of a relatively long period of time, or at an undefined time interval. For example, in the case of reactivation of the application, the executed process is represented by a combination of the time and contents of the process, such as "reactivation of application $A_3$ at time $T_3$ by instruction of user $P_3$" or "reactivation of application $A_4$ at time $T_4$ by instruction of administrator $P_k$".

Here, the process refers to a phenomenon which has occurred in the target system 101 by the instruction or command from the outside of the target system 101, and the event refers to a phenomenon other than the process. It is not essential to discriminate the events and the executed process clearly in this invention, so the terms will be described as events collectively, or event and process below.

The data collector/statistical processor 201 also statistically processes the collected information. The statistical processing refers to a processing executed for obtaining various kinds of data (statistical data) which can be calculated based on the collected information. To be specific, the statistical processing includes processing of obtaining cumulative data, average time, and variance or frequency distribution of the monitoring data, processing of obtaining a maximum value and minimum value of the monitoring data at the time of generation of the event, processing of obtaining frequency at which two events are generated at the same time, and the like.

The data collector/statistical processor 201 stores the collected information in the correlation information storage 203. In addition, the data collector/statistical processor 201 creates data indicating the correlation between the pieces of information of the event, the process, or the like, the monitoring data, and the statistical data. The generation of the data items is also included in the statistical processing, but the data obtained for storing the information in the correlation information storage 203 is referred to as correlation information in particular. Details of the correlation information will be described later.

In this embodiment, the monitoring data and the statistical data are included in the correlation information. However, the statistical data is not essential in the configuration, and only the correlation between the monitoring data and the events may be referred to as the correlation information.

Next, description will be given of the correlation information storage 203, the correlation information updater 202, and the correlation information abstracter 204.

The correlation information storage 203 stores data indicating the correlation of the monitoring data, the statistical data, and information of events, process, and the like. Details of the data indicating the correlation will be described later. The data includes an equation representing a correlation coefficient or a regression line of monitoring data C and monitoring data D, and co-occurrence probability, for example. In this invention, data indicating the correlation will be collectively referred to as correlation information.

The correlation information storage 203 stores correlation information in a form of a correlation table in which correlation values of two pieces of information A and B are stored, or of a probability model in which the correlation of the two pieces of information A and B is expressed in probability. The correlation information is created in the data collector/statistical processor 201, and is stored in the correlation information storage 203 by the correlation information updater 202. Further, the correlation information stored in the correlation information storage 203 is read out by the correlation information abstracter 204. It should be noted that each of the correlation information updater 202, the correlation information storage 203, and the correlation information abstracter 204 is shown in FIG. 2 only by one. However, a plurality of components may be provided.

Next, the error/failure detector-root cause analyzer-prevention/recovery process creator (hereinafter, abbreviated as "detector/process creator") 205 will be described.

The detector/process creator 205 detects an error/failure status of the target system 101 by using the information collected and subjected to the statistical processing by the data collector/statistical processor 201, and the correlation information read out from the correlation information storage 203 by the correlation information abstracter 204. Then, the detector/process creator 205 analyzes the root cause of the error/failure and creates a prevention/recovery process for avoiding and restoring the failure.

As the method of detecting the error/failure status and analyzing the root cause thereof by the detector/process creator 205, a method disclosed in "Ensembles of Models for Automated Diagnosis of System Performance Problems", S. Zhang et al. and "Combining Visualization and Statistical Analysis to Improve Operator Confidence and Efficiency for Failure Detection and Localization", P. Bodik et al. described above may be employed, for example.

Next, a simpler method of detecting the error/failure status will be exemplified. In a case where the regression line of monitoring data X and monitoring data Y establishes X=Y according to the correlation information stored in the correlation information storage 203, when the current relation of the monitoring data X and the monitoring data Y obtained by the data collector/statistical processor 201 establishes Y=2X, it can be detected that error/failure has occurred in at least one of the monitoring data X and the monitoring data Y. In addition, there is also a method of detecting whether the current event obtained by the data collector/statistical processor 201 is an event indicating error/failure when the event indicating the error/failure of the target system is stored in the correlation information storage 203.

Further, a method of detecting error/failure when a monitoring data Z exceeds a threshold W may also be employed. Further, a method of detecting error/failure when pieces of information, which are generally to be collected at a constant interval, cannot be collected by the data collector/statistical processor 201 may also be employed.

As described above, as the method of detecting the error/failure and analyzing the root causes thereof, there may be employed a method of utilizing either one of the information obtained from the data collector/statistical processor 201 and correlation information stored in the correlation information storage 203, and a method of utilizing both the pieces of information. In this invention, the method of detecting the error/failure and analyzing root causes thereof by the detector/process creator 205 includes any methods including the method of detecting the error/failure and analyzing root causes thereof of the target system 101 by utilizing at least one of the information obtained from the data collector/statistical processor 201 and the correlation information stored in the correlation information storage 203.

The detector/process creator 205 creates a prevention/recovery process for avoiding and restoring the failure generated due to the detected error/failure, based on the results of the error/failure detection and the analysis of the root causes of the error/failure by the method described above. As the method of creating the prevention/recovery process, there is a method of applying in advance a rule of the process corresponding to the root cause of the error/failure, and creating the process based on the rule. Further, there is a method of storing the process executed with respect to the error/failure generated in the past in the correlation information storage 203 as a history, and creating the process based on the history of the process executed with respect to the similar kind of error/failure.

Further, there is also a method of storing as a history only the process exhibiting favorable effect by the method described above, and setting the process as the process to be executed. In addition, there is also a method of searching for a process correlated to the monitoring data, statistical data, and the like causing the error/failure, from among the executed processes stored in the correlation information storage 203 by using the correlation information.

The detector/process creator 205 does not have to create only one prevention/recovery process, and may create one or more processes. In this invention, the method of creating a prevention/recovery process by the detector/process creator 205 includes any methods including a method of creating a prevention/recovery process for avoiding and restoring a failure generated due to the detected error/failure based on the results of the error/failure detection or the analysis of root causes of the error/failure of the target system 101 using either one of the information obtained from the data collector/statistical processor 201 and the correlation information stored in the correlation information storage 203.

In addition to the error/failure currently generated in the target system 101, the detector/process creator 205 can detect a prediction of error/failure expected to be generated in the future in the target system 101. For example, it is evaluated as error/failure when a difference of the monitoring data and the normal value (regression line) is large, and it is evaluated as a prediction of error/failure when the difference between the monitoring data and the normal value (regression line) is still small but is becoming larger gradually.

Next, the effect/side-effect evaluator (hereinafter, abbreviated as "evaluator") 206 will be described.

The evaluator 206 receives the result of the root cause analysis and the prevention/recovery process from the detector/process creator 205 at the time of detection of the error/failure, and evaluates the effect and side-effect imparted to the target system 101 due to the execution of the prevention/recovery process, using the information indicating the status of the target system 101 obtained by the data collector/statistical processor 201 and the correlation information stored in the correlation information storage 203 via the correlation information abstracter 204. The methods described below are examples of the evaluation method.

First, the monitoring data and the statistical data causing the error/failure, and the normal values and abnormal values of each pieces of data are obtained from the detector/process creator 205. Further, one or more processes for avoiding and restoring the error/failure are obtained from the detector/process creator 205. Next, correlation information of the monitoring data, statistical data, events, and the like of the process is obtained from the correlation information obtained from the correlation information storage 203 via the correlation information abstracter 204.

Then, the evaluator 206 updates the information indicating the current status of the target system 101 obtained from the data collector/statistical processor 201 by using the obtained correlation information. Accordingly, the status of the target system 101 after the execution of the process is calculated, whereby the degree by which the monitoring data or the statistical data causing the error/failure change from the abnormal value to the normal value can be calculated. The closer the calculation results are to the normal values, the larger the effect of the prevention/recovery process is evaluated to be.

On the other hand, the monitoring data and the statistical data after the execution of the process, which are not the root cause of the error/failure, are calculated in the same manner as described above. Whether the calculated value has become an abnormal value with respect to the correlation information is evaluated as a side-effect. Here, the farther apart the calculation results are from the normal value, the larger the side-effect of the process is evaluated to be.

The method of evaluating the effect and side-effect by the evaluator 206 is not limited to that described above. In this invention, the method of evaluating the effect and side-effect includes any methods including a method of performing at least one of an evaluation (evaluation of effect) of a degree by which the status of the target system 101 is changed from the abnormal status to the normal status by the prevention/recovery process created by the detector/process creator 205, and an evaluation (evaluation of side-effect) of a degree by which the status of the target system 101 is changed from the normal status to the abnormal status by the prevention/recovery process created by the detector/process creator 205, using at least one of the information obtained from the data collector/statistical processor 201 and the correlation information stored in the correlation information storage 203.

Next, description will be given of the prevention/recovery process commander (hereinafter, abbreviated as "commander") 208.

The commander 208 obtains the prevention/recovery processes and the information related to the effect and side-effect of the processes from the evaluator 206, and determines whether the processes are necessary, the order and time of execution of the processes, and the like. As a method of the determination, there is a method of determining the order of execution by setting the processes expected to exhibit an effect of a certain degree or more and a side-effect of a certain degree or less as processes to be executed, and executing the processes starting from the process having a larger effect, for example.

The commander 208 may issue a command for the processes to be executed to the target system 101 in accordance with the execution order and the execution time. Further, the commander 208 may transmit to the target system 101 the processes to be executed and the information on the execution order and the execution time.

The evaluator/commander controller 207 controls operations of the evaluator 206 and the commander 208. To be specific, the control of the operation of the evaluator 206 includes control of the evaluation methods of the effect and side-effect by the evaluator, periodic cycle of the evaluation, and the like.

The effect evaluation method includes setting a threshold for determining presence or absence of the effect, and setting a function $f(X, Y, Z)$ for quantifying the amount of effect from the current value X of the monitoring data and the statistical data causing the error/failure, the value Y after the execution of the process, and the normal value Z. As an example of the function $f(X, Y, Z)$, $f(X, Y, Z)=(X-Z)\times(X-Z)/((Y-Z)\times(Y-Z))$ is established in the case where the degree of error/failure is proportional to a square of the amount by which the degree of error/failure is apart from the normal value, and the ratio of the degree of error/failure before and after the process execution is assumed as the effect. In this example, the larger the value of the function $f(X, Y, Z)$, the larger the effect is evaluated to be.

In the method of evaluating the effect and side-effect as described above, evaluation criteria may change depending on the processes being executed in the target system 101 and the monitoring data, statistical data, events, and the like of the target, and evaluation criteria may also temporally change. Thus, the evaluator/commander controller 207 includes an interface for setting those criteria.

The interface is provided with an input portion for conducting settings related to the evaluation of the effect and side-effect before and during the operation of the target system 101, a display portion for displaying items that can be set, and a setting portion for transmitting the setting contents to the evaluator 206. As an input method to the input portion, there are methods such as input through a command line interface, input through a graphical interface, input by a file, and input by devices, e.g., a volume and a switch.

The control of the operation of the commander 208 includes control of a method of evaluating whether execution of the processes is necessary and a method of determining the execution order of the processes by the commander 208 using the prevention/recovery process obtained from the evaluator 206 and the information on the effect and side-effect of that process. Whether execution of the processes is necessary may be evaluated by, for example, setting the function for setting and evaluating the threshold of the minimum effect necessary, or setting and evaluating the threshold of the maximum side-effect acceptable. Further, the execution order may be determined by, for example, realigning the processes (specifically, selecting whether the process having larger effect is to be executed prior to those having smaller effects, or the process having smaller side-effect is to be executed prior to those having larger side-effects).

The interface for conducting settings in the same manner as in the control of the operation of the evaluator 206 is also provided for the control of the operation of the commander 208. The configuration of the interface in this case is identical to that used for the setting of the evaluator 206.

Figure 3:
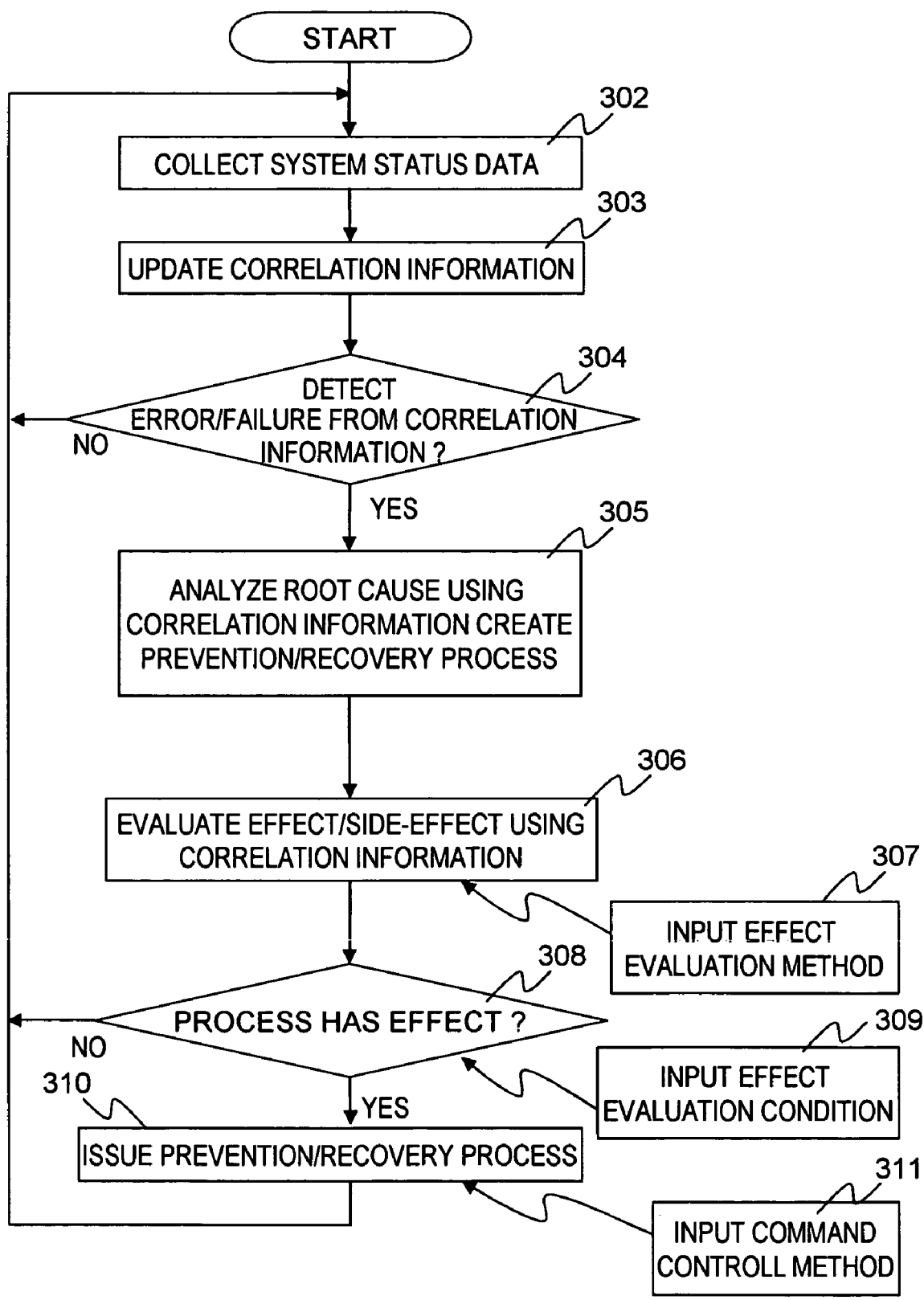
FIG. 3 is a flowchart showing an operation of the controller of failure prevention/recovery according to the first embodiment of this invention.

Next, an operation of the controller of failure prevention/recovery 106 according to the first embodiment will be described with reference to the flowchart of FIG. 3.

First, the data collector/statistical processor 201 collects information on the status of the target system 101 (Step 302).

Next, the correlation information updater 202 updates the correlation information stored in the correlation information storage 203 using the pieces of information collected by the data collector/statistical processor 201 (Step 303). It should be noted that in the initial status, the processing of Step 303 refers to addition of correlation information.

Next, the detector/process creator 205 detects presence or absence of error/failure based on the current system status and the correlation information (Step 304). An example of the method of detecting the presence or absence of the error/failure is as described above. The procedure returns to Step 302 when no error/failure is detected in Step 304.

On the other hand, when error/failure is detected in Step 304, the detector/process creator 205 analyzes the root cause using the correlation information and creates the prevention/ recovery process (Step 305). An example of the processing of Step 305 is as described above.

Next, the effect/side-effect evaluator 206 evaluates the effect and side-effect of the process using the correlation information (Step 306). The effect and side-effect of the process are evaluated based on conditions inputted to the evaluator/commander controller 207 in Step 307.

Then, the commander 208 evaluates the presence or absence of the effect of the process (Step 308). The effect is evaluated based on the conditions inputted to the evaluator/commander controller 207 in Step 309.

In the case where no effect of the process can be expected, the procedure returns to Step 302. On the other hand, in the case where the effect of the process can be expected, the commander 208 issues a command for the prevention/recovery process to the target system 101 (Step 310). Commander control method regarding whether command execution is necessary, the command execution order, or the like is based on the method inputted to the evaluator/commander controller 207 in Step 311. The commander control method relates to control of the execution of the process according to the system status, and immediate execution of the process even when the side-effect of the process is large, and execution of the process when reaching a predetermined time, for example.

Upon issuance of the command for the prevention/recovery process in Step 310, the procedure returns to Step 302.

It should be noted that the update of the correlation information in Step 303 may be carried out at an arbitrary time point, after Step 304 or before returning to Step 302. Further, the input processing of Steps 307, 309, and 311 may not be necessary as long as predetermined data (method) is used.

Next, a method of storing correlation information in the correlation information storage 203 will be described with reference to FIG. 4.

As described above, the methods of storing correlation information in the correlation information storage 203 includes a method using the correlation table and a method using the probability model. FIG. 4 shows a case of the method using a correlation table 409. The correlation table can be produced with ease as compared with the probability model, and the learning effect can be easily grasped as compared with the probability model.

Monitoring data 401, statistical data 402, events 403, and executed processes (hereinafter, abbreviated as "processes") 404 are stored in the correlation table 409. Hereinafter, those mentioned above will be collectively referred to as correlation information items.

Figure 4:
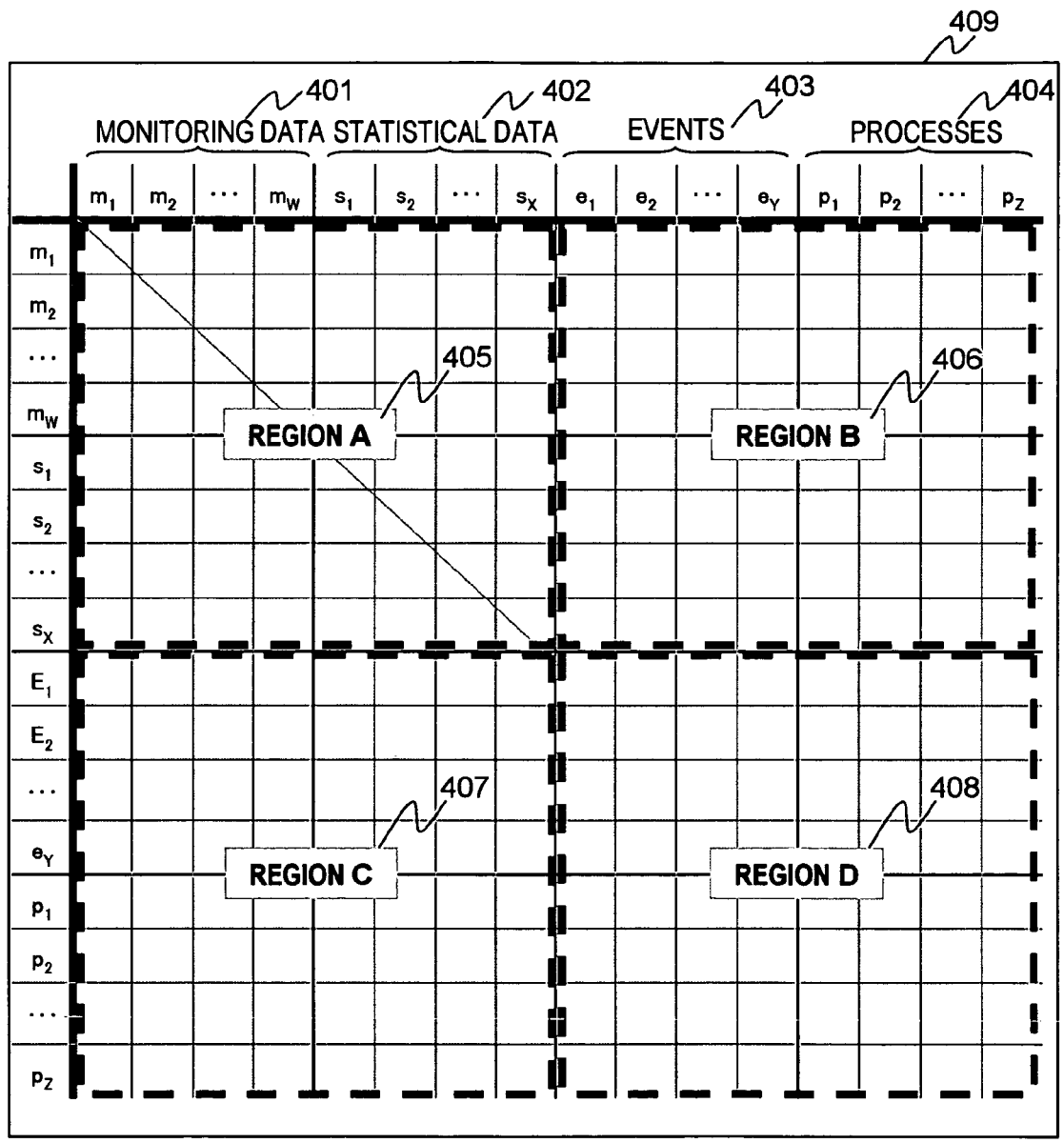
FIG. 4 is an explanatory diagram of correlation information stored in a correlation information storage according to the first embodiment of this invention.

In the example shown in FIG. 4, the correlation table 409 is composed of two axes of an ordinate axis and an abscissa axis, and is in a form of a round-robin of the correlation information items. Each of the correlation information items includes one or more elements. For example, the events 403 includes Y items $e_1$ to $e_Y$. In the example shown in FIG. 4, a total number of elements of the correlation information items is represented by (W+X+Y+Z). The correlation table 409 has a size of (W+X+Y+Z) in each of the ordinate axis and the abscissa axis.

A region A (405) of the correlation table 409 is a region storing information related to correlation between the monitoring data 401 and the statistical data 402. In the region A (450), mainly a degree of correlation, proportional relation, and the like of the data items continuously outputted are stored therein. For example, a relation of $m_1=m_2$ or the like with respect to the two monitoring data items of a usage rate $m_1$ of a first CPU and a usage rate $m_2$ of the second CPU, are stored in the region A (450).

By using data stored in the region A (405), it becomes possible to detect the error/failure between the items of monitoring data 401, between items of statistical data 402, and between the monitoring data 401 and the statistical data 402. It should be noted that in the region A (405), the ordinate axis and the abscissa axis are symmetrical with respect to a principal diagonal of the region A, so a same value is stored in column $m_2$ of row $m_1$ and column $m_1$ of row $m_2$. Accordingly, a left lower half or a right upper half in a triangle shape in the region A (450) may be eliminated. Details of the processing of storing data in the region A (450) will be given with reference to FIGS. 5 to 7.

A region B (406) of the correlation table 409 is a region in which information related to the correlation between the monitoring data 401 and the statistical data 402 with respect to the events 403 and the processes 404 is stored. In the region B (406), a difference between both the monitoring data 401 and the statistical data 402 at the time of generation of the events 403 or execution of the processes 404, and both the monitoring data 401 and the statistical data 402 obtained other than at the time of both of the events 403 or execution of the processes 404 are mainly stored. By using the information stored in the region B (406), the events 403 being generated and the processes 404 being executed can be obtained from the monitoring data 401 and the statistical data 402. Details of the processing of storing data in the region B (406) will be given with reference to FIGS. 8 and 9.

A region C (407) of the correlation table 409 is a region in which information related to the correlation between the events 403 and the processes 404 with respect to the monitoring data 401 and the statistical data 402 is stored. In the region C (407), a difference between the monitoring data 401 and the statistical data 402 before and after generation of the events 403 or before and after the execution of the processes 404 is mainly stored. By using the information stored in the region C (407), it is possible to determine the effect and side-effect to be exhibited in the monitoring data 401 and the statistical data 402 after the generation of the events 403 or after execution of the processes 404. Details of the processing of storing data in the region C (407) will be given with reference to FIGS. 10 and 11.

Although the region B (406) and the region C (407) are both regions for storing information related to the correlation between the monitoring data 401 and the statistical data 402 with respect to the events 403 and the processes 404, each of the regions stores different kinds of information as described above. Further, the region B (406) is used to obtain the events 403 being generated and the processes 404 being executed based on the monitoring data 401 and the statistical data 402, whereas the region C (407) is used to determine the effect and side-effect to be exhibited in the monitoring data 401 and the statistical data 402 due to the generation of the events 403 or the execution of the processes 404. The difference between the two regions requires both kinds of information to be stored separately.

A region D (408) of the correlation table 409 is a region in which information related to the correlation between the events 403 and the processes 404 is stored. In the region D (408), the events 403 and the processes 404 to be generated/executed concurrently with or subsequent to the generation of the events 403 or execution of the processes 404 are mainly stored. By using the information stored in the region D (408), the linkage between the events 403 and the processes 404 can be obtained. For example, the linkage where an event B being generated after a process A is executed can be obtained. Details of the processing of storing data in the region D (408) will be given with reference to FIGS. 12 and 13.

The configuration of the correlation table 409 shown in FIG. 4 is no more than an example. For example, the regions A to D (405 to 408) may each have a separate correlation table. Further, the correlation table may be configured to exclude a part of the monitoring data 401, statistical data 402, events 403, and processes 404. Further, respective regions can individually store information in any forms representing the correlation of the elements. Hereinafter, the method of storing the correlation will be described in detail. However, the method is only an example of storing information representing a correlation.

Figure 7:
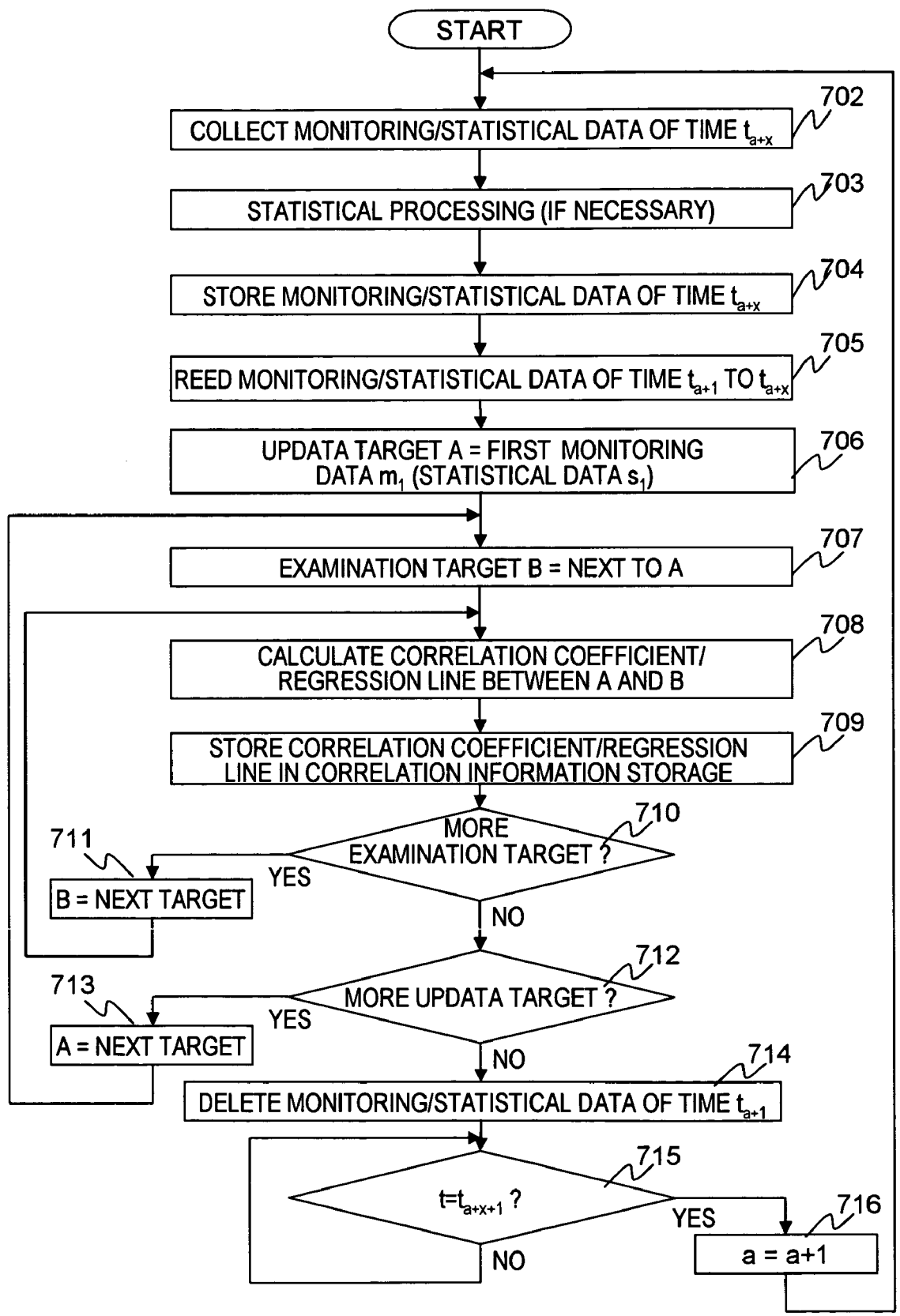
FIG. 7 is a flowchart of a process performed to update the correlation information stored in the region A of the correlation table according to the first embodiment of this invention.

An example of the correlation of elements stored in the region A (405) of the correlation table 409 will be described with reference to FIGS. 5 to 7.

Figure 5:
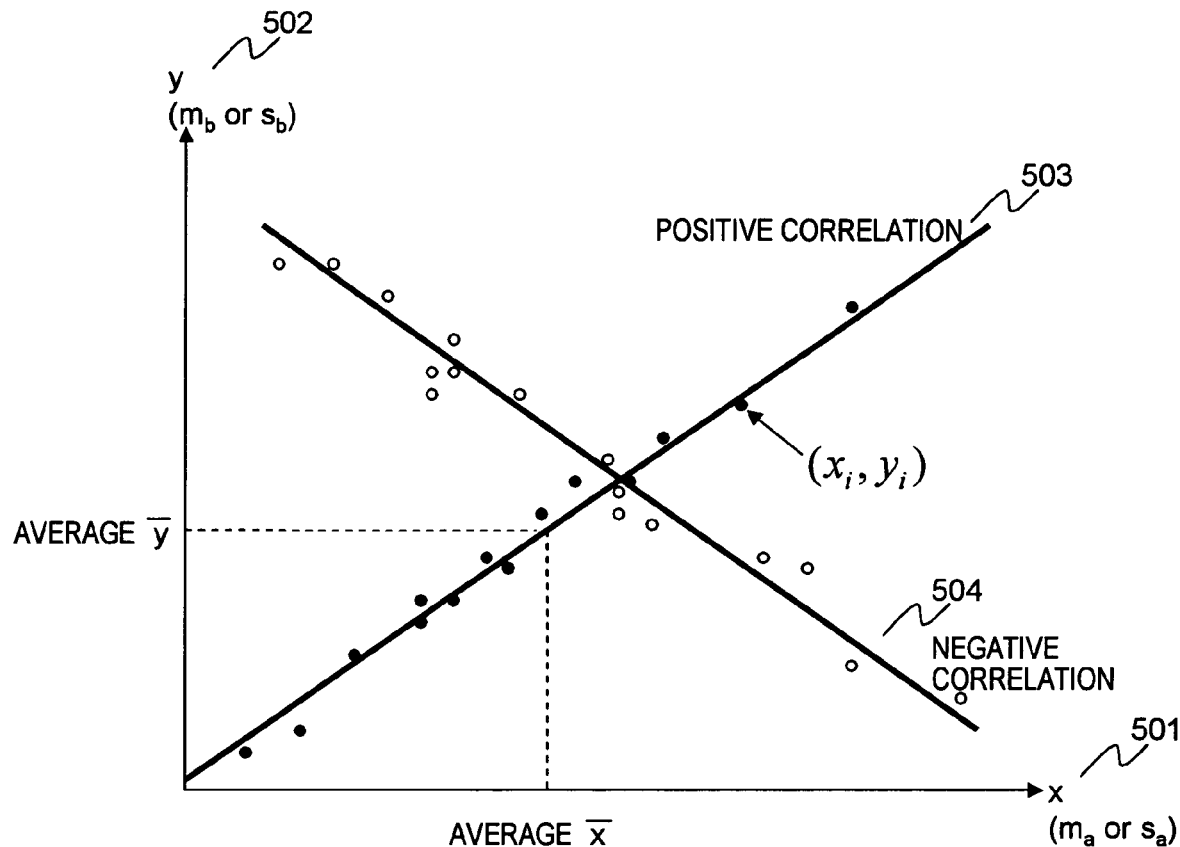
FIG. 5 is an explanatory diagram of an example of the correlation information stored in a region A of a correlation table according to the first embodiment of this invention.

FIG. 5 is a graph showing an example of the correlation in the case where monitoring data ma or statistical data $s_a$ is positioned on an x-axis 501 and another monitoring data $m_b$ or statistical data $s_b$ is positioned on a y-axis 502.

Reference Symbol ● in FIG. 5 indicates a state where a positive correlation 503 is present between items of data on the x-axis and the y-axis, and ○ indicates a state where a negative correlation 504 is present therebetween.

For example, the CPU usage rate increases proportional to the number of users using the application, which is an example of the positive correlation 503. On the other hand, remaining capacity of the memory decreases proportional to the number of users using the application, which is an example of the negative correlation 504. Further, the number of retries for reading the disk is unrelated to the number of users using the application. The correlation in this case is neither positive nor negative.

A correlation coefficient 505 is an index for quantifying the correlation as described above. A correlation coefficient r is a value defined by an equation 505 shown in FIG. 5 with respect to combinations of x and y, the numbers of x and y each being N $(x_i, y_i)$ (i=1, 2, ... N). The correlation coefficient r represents a positive value of equal to or less than 1 and close to 1 in the positive correlation 503, and represents a negative value of equal to or more than −1 and close to −1 in the negative correlation 504. On the other hand, the correlation coefficient r represents a value close to 0 when there is no correlation. In other words, the correlation coefficient r indicates whether the correlation between the two items of data is positive or negative, and the strength thereof.

By storing the correlation coefficient r in the region A (405) of the correlation table 409, the correlation of the monitoring data 401 and the statistical data 402 can be provided. Although not only the strength of the correlation but also whether the correlation is of a positive correlation or the negative correlation can be obtained with the correlation coefficient r, whether the positive correlation satisfies y=x or y=2x cannot be obtained with only the correlation coefficient r. In the case where there exists a correlation, an equation to indicate the correlation is obtained. A line expressed by this equation is called a "regression line". A method of obtaining the regression line is disclosed specifically in "Introduction to Statistics", Takahusa Nakamura et al., University of Tokyo Press, 1989, ISBN 4-13-042060-7.

FIG. 6 shows an example of another correlation between the monitoring data and the statistical data.

In FIG. 5, the case where there is a linear correlation between the monitoring data and the statistical data is shown. However, for example, in the case of a relation between a response time $m_b$ for an operation of the application and the number of users ma using the application, the correlation therebetween can be generally represented by a quadratic curve 603 shown in FIG. 6 rather than by the linear correlation. In the case of the correlation described above, the correlation coefficient r (505) of FIG. 5 represents a value close to 0 as in the case where there is no correlation. In the case, a linear correlation 605 can be obtained by the statistical processing of squaring x in the x-axis direction. The data collector/statistical processor 201 also performs the statistical processing as described above. An example of the method of storing data in the region A (405) of the correlation table 409 includes a method of storing data as a correlation of monitoring data $m_b$ and statistical data $s_c$ by setting the statistical data $s_c$ as a square of x (square of ma). It should be noted that an example of the method of obtaining the linear correlation includes that using the support vector machine. Details of this method are disclosed in "An Introduction to Support Vector Machines: And Other Kernel-Based Learning Methods", Nello Cristianini et al., KYORITSU SHUPPAN Co., Ltd., 2005, ISBN 4-320-12134-1.

FIGS. 5 and 6 each shows an example of the method of storing the correlation between the monitoring data 401 and the statistical data 402. Next, processing of updating correlation information stored in the region A (405) of the correlation table 409 by using the method of storing the correlation described above with reference to FIGS. 5 and 6 will be described with reference to the flowchart shown in FIG. 7.

First, the monitoring data and the statistical data at time $t_{a+x}$ are obtained from the data collector/statistical processor 201 (Step 702). Next, the statistical processing shown in FIG. 6 is carried out if necessary (Step 703). Then, the obtained monitoring data and the statistical data at the time $t_{a+x}$ are stored (Step 704), and the monitoring data items and the statistical data of time $t_{a+1}$ to $t_{a+x}$ are read out (Step 705).

The graphs shown in FIGS. 5 and 6 can be created from those read data items. Here, the elements on the ordinate axis of the correlation table 409 are referred to as update target A, and elements on the abscissa axis are referred to as examination target B. First, the update target A is set as a first monitoring data $m_1$ or statistical data $s_1$ (Step 706). Next, the examination target B is set as the monitoring data $m_2$ or statistical data $s_2$ subsequent to A (Step 707).

Then, correlation information of the correlation coefficient, the regression line, and the like of the update target A and the examination target B is calculated by the method described with reference to FIGS. 5 and 6 (Step 708). The calculated results of Step 708 are registered on the ordinate axis A and abscissa axis B of the correlation table 409, respectively (Step 709).

After that, evaluation is made as to whether there are more examination targets (Step 710). When there are more examination targets, the next examination target is set as the examination target B, and the procedure returns to Step 708. On the other hand, when there are no more examination targets, the processing advances to Step 712.

In Step 712, evaluation is made as to whether there are more update targets. When there are more update targets, the next update target is set as the update target A, and the procedure returns to Step 707. On the other hand, when there are no more update targets, the monitoring data and the statistical data of the earliest time $t_{a+1}$ are deleted (Step 714). Then, when the time reaches the next time $t_{a+x+1}$, 1 is added to a and the procedure returns to Step 702.

Figure 9:
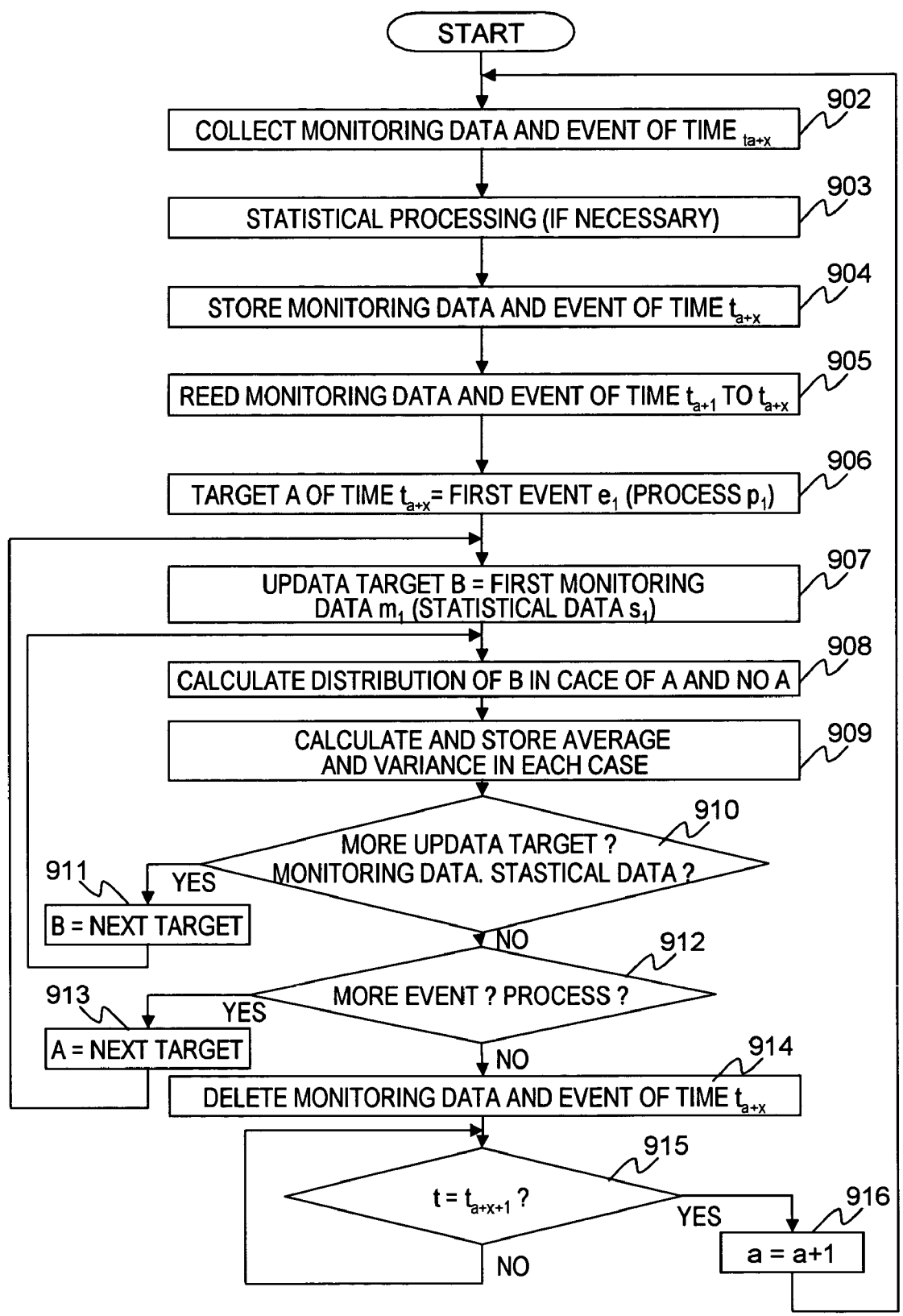
FIG. 9 is a flowchart of a process performed to update the correlation information stored in the region B of the correlation table according to the first embodiment of this invention.

Next, an example of the correlation stored in the region B (406) of the correlation table 409 will be described with reference to FIGS. 8 and 9.

A transition table 801 shown in FIG. 8 shows transition of the monitoring data and the statistical data at respective times with respect to the events and processes generated/executed from time $t_{a+1}$ to $t_{a+x}$.

Based on the transition table 801, a distribution chart 806 having a distribution probability 803 of a monitoring data $m_1$ on the ordinate axis is created by setting the monitoring data $m_1$ on the abscissa axis 802 and separating the distribution probability 803 by the time of generation of an event $e_A$ and that having no generation of the event $e_A$. The correlation between the event $e_A$ and the monitoring data $m_1$ can be obtained from this distribution chart 806.

On the abscissa axis 802, reference symbol ○ indicates the monitoring data $m_1$ at the time of generation of the event $e_A$. Graph 805 of the distribution chart 806 shows the distribution probability 803 of ○ by the Gauss distribution. Further, an average value of the Gauss distribution is represented by $a_0$, and variance thereof is represented by $\sigma_0$.

Similarly, each reference symbol ● on the abscissa axis indicates the monitoring data $m_1$ at the time when no event $e_A$ is generated. Graph 804 shows the distribution probability 803 of ● by the Gauss distribution. Further, the average value of the Gauss distribution is represented by $a_x$, and the variance thereof is represented by $\sigma_x$.

In the distribution chart 806, monitoring data and statistical data are in strong correlation with the generation of the events and the execution of the processes when differences between the average values $a_0$ and $a_x$ are large and when differences between the variances $\sigma_0$ and $\sigma_x$ are small.

Next, an example of the processing of updating the correlation information stored in the region B (406) of the correlation table 409 by the method of storing the correlation information described with reference to FIG. 8 will be described with reference to the flowchart shown in FIG. 9.

First, monitoring data and statistical data of time $t_{a+x}$ and an event and process generated/executed at time $t_{a+x}$ are obtained from the data collector/statistical processor 201 (Step 902). Next, the statistical processing shown in FIG. 8 is carried out if necessary (Step 903). Then, the monitoring data of time $t_{a+x}$, the event generated at time $t_{a+x}$, and the like are stored (Step 904), and monitoring data times from time $t_{a+1}$ to $t_{a+x}$, events generated during time $t_{a+1}$ to $t_{a+x}$, and the like are read out (Step 905).

The chart including the graphs of distribution probability shown in FIG. 8 can be created from those read data items. Here, elements on the abscissa axis of the correlation table 409 are referred to as target A, and elements on the ordinate axis thereof are referred to as update target B. First, the target A is set as a first event $e_1$ or first process $p_1$ (Step 906). Next, the update target B is set as a first monitoring data $m_1$ or statistical data $s_1$ (Step 907). Then, distribution of the update target B at the time of generation and non-generation of the event which is the target A, or at the time of execution and non-execution of the process which is the target A is obtained (Step 908) to calculate average values and variances of the data items. The calculation results are stored in the ordinate axis B and the abscissa axis A, respectively (Step 909).

After that, evaluation is made as to whether there are more update targets (Step 910). When there are more update targets, a next update target is set as the update target B, and the procedure returns to Step 908. On the other hand, when there are no more update targets, the processing advances to Step 912.

In Step 912, evaluation is made as to whether there are more events or processes (Step 912). When there are more events or processes, a next event or process is set as the target A, and the procedure returns to Step 907. On the other hand, when there are no more update targets, the monitoring data and the event of the earliest time $t_{a+1}$ are deleted (Step 914). Then, when the time reaches the next time of $t_{a+x+1}$, 1 is added to a, and the procedure returns to Step 902.

Next, an example of the correlation stored in the region C (407) of the correlation table 409 will be described with reference to FIGS. 10 and 11.

Figure 10:
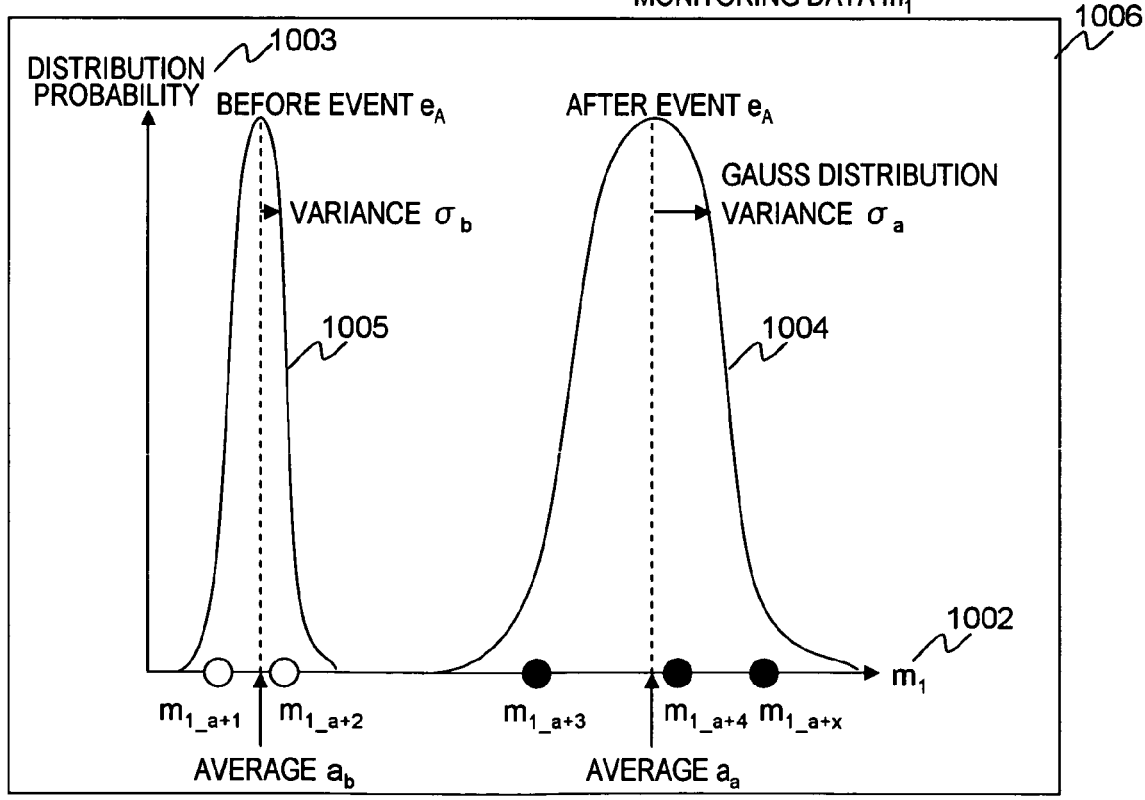
FIG. 10 is an explanatory diagram of an example of the correlation information stored in a region C of the correlation table according to the first embodiment of this invention.
Figure 11:
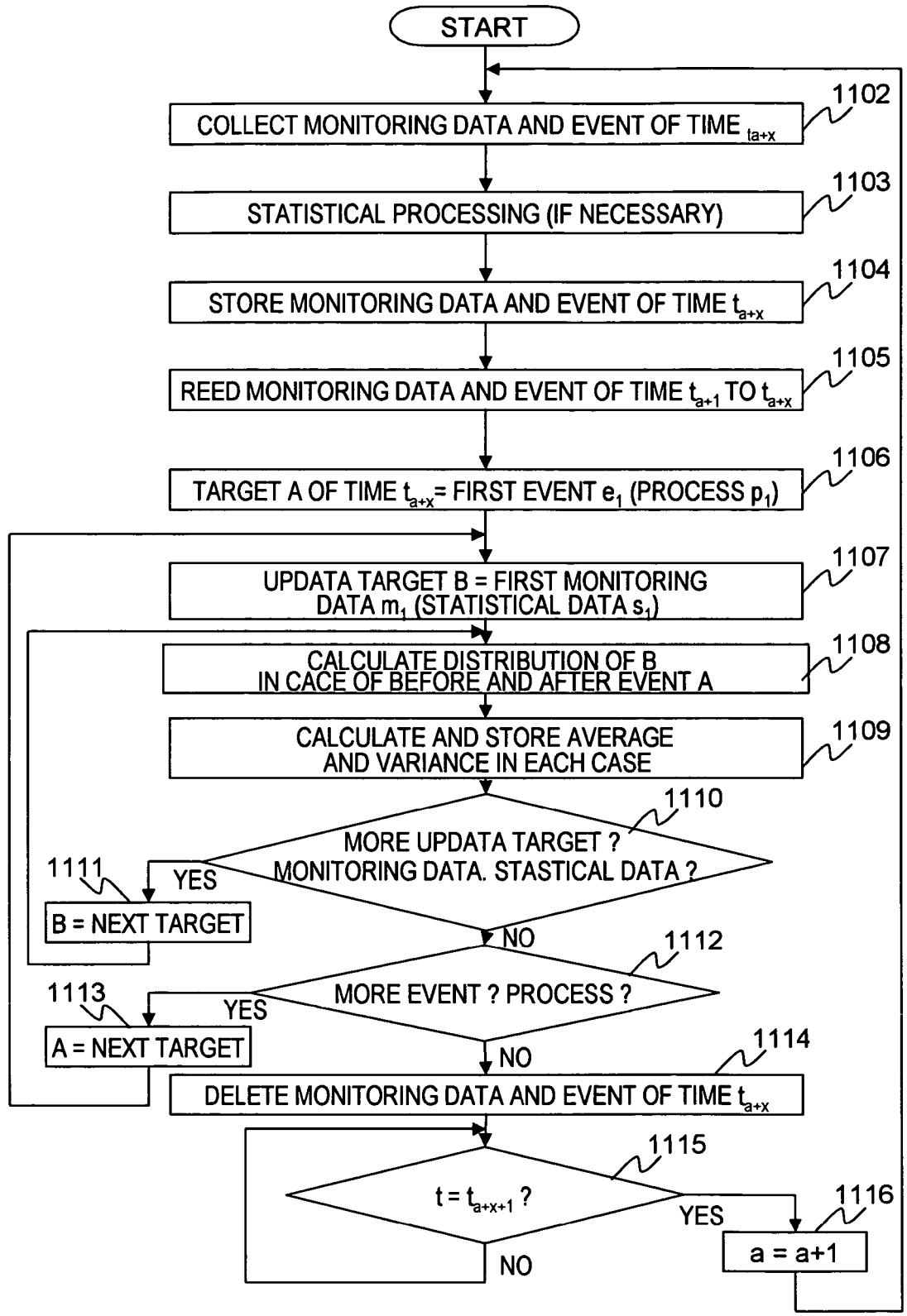
FIG. 11 is a flowchart of a process performed to update the correlation information stored in a region CB of the correlation table according to the first embodiment of this invention.

A transition table 1001 shown in FIG. 10 shows the presence/absence of generation of an event or execution of a process from time $t_{a+1}$ to $t_{a+x}$ and monitoring data and statistical data of respective times.

Based on the transition table 1001, a distribution chart 1006 having a distribution probability 1003 of a monitoring data $m_1$ on the ordinate axis is created by setting the monitoring data $m_1$ on the abscissa axis 1002 and separating the distribution probability 1003 before and after generation of an event $e_A$. The correlation between the event $e_A$ and the monitoring data $m_1$ can be obtained from this distribution chart 1006.

Each of reference symbols ○ on the abscissa axis 1002 indicates the monitoring data $m_1$ before generation of the event $e_A$. Graph 1005 of the distribution chart 1006 shows the distribution probability 1003 of ○ by the Gauss distribution. Further, an average value of the Gauss distribution is represented by $a_b$, and variance thereof is represented by $a_b$.

Similarly, each of reference symbols ● on the abscissa axis indicates the monitoring data $m_1$ after generation of the event $e_A$. Graph 1004 shows the distribution probability 1003 of ● by the Gauss distribution. Further, the average value of the Gauss distribution is represented by $a_a$, and the variance thereof is represented by $\sigma_a$.

In the distribution chart 1006, monitoring data and statistical data are strongly influenced by the generation of the events and the execution of the processes, when the differences between the average values $a_b$ and $a_a$ are large and when differences between the variances $\sigma_b$ and $\sigma_a$ are small.

Next, an example of the processing of updating the correlation information stored in the region C (407) of the correlation table 409 by the method of storing the correlation information described with reference to FIG. 10 will be described with reference to the flowchart shown in FIG. 11.

First, monitoring data and statistical data of time $t_{a+x}$ and an event and process generated/executed at the time $t_{a+x}$ are obtained from the data collector/statistical processor 201 (Step 1102). Next, the statistical processing shown in FIG. 10 is carried out as necessary (Step 1103). Then, the monitoring data of time $t_{a+x}$, the event generated at time $t_{a+x}$, and the like are stored (Step 1104), and monitoring data items from time $t_{a+1}$ to $t_{a+x}$, events generated during time $t_{a+1}$ to $t_{a+x}$, and the like are read out (Step 1105).

The chart including the graphs of distribution probability shown in FIG. 10 can be created from those read data items. Here, elements on the ordinate axis of the correlation table 409 are referred to as target A, and elements on the abscissa axis thereof are referred to as update target B. First, the target A is set as a first event $e_1$ or first process $p_1$ (Step 1106). Next, the update target B is set as a first monitoring data $m_1$ or statistical data $s_1$ (Step 1107). Then, distribution of the update target B before and after generation of the event which is the target A, or before and after execution of the process which is the target A is obtained (Step 1108) to calculate average values and variances of the data items. The calculation results are stored in the ordinate axis A and the abscissa axis B of the correlation table 409, respectively (Step 1109).

After that, evaluation is made as to whether there are more update targets (Step 1110). When there are more update targets, a next update target is set as the update target B, and the procedure returns to Step 1108. On the other hand, when there are no more update targets, the processing advances to Step 1112.

In Step 1112, evaluation is made as to whether there are more events or processes (Step 1112). When there are more events or processes, a next event or process is set as the target A, and the procedure returns to Step 1107. On the other hand, when there are no more update targets, the monitoring data and the event of the earliest time $t_{a+1}$ are deleted (Step 1114). Then, when the time reaches the next time $t_{a+x+1}$, 1 is added to a, and the procedure returns to Step 1102.

Next, an example of the correlation stored in the region D (408) of the correlation table 409 will be described with reference to FIGS. 12 and 13.

Figure 12:
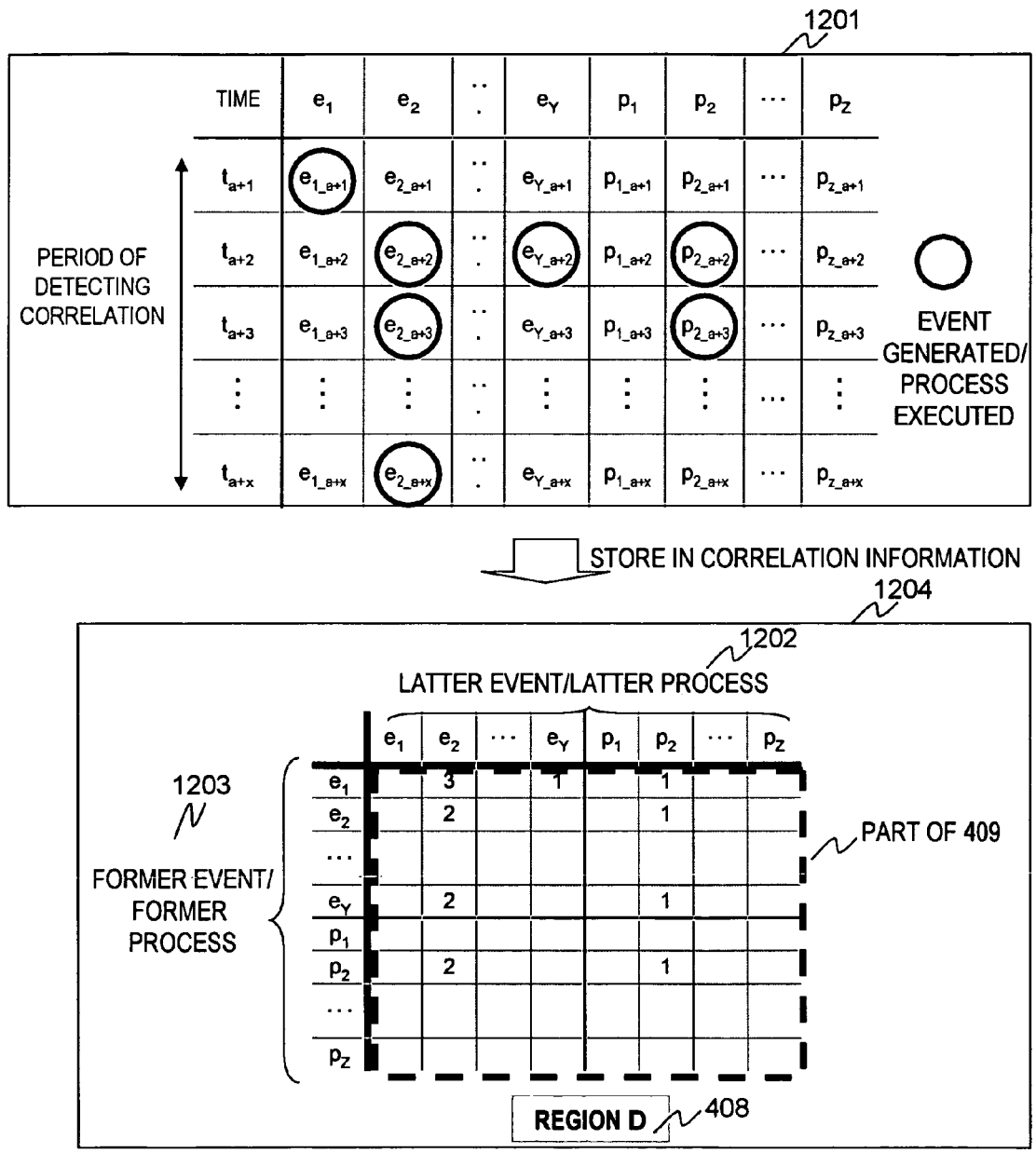
FIG. 12 is an explanatory diagram of an example of the correlation information stored in a region D of the correlation table according to the first embodiment of this invention.
Figure 13:
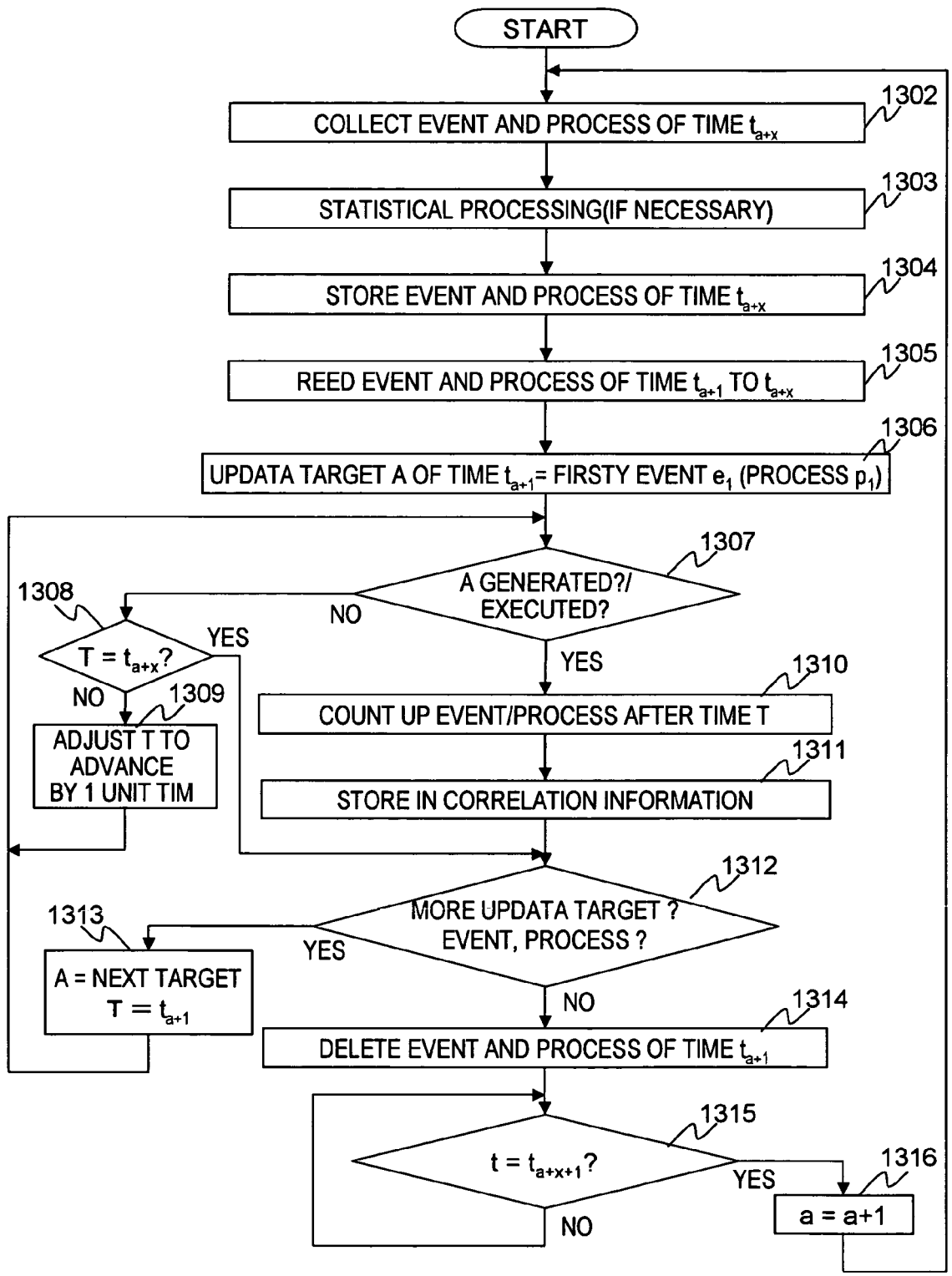
FIG. 13 is a flowchart of a process performed to update the correlation information stored in a region DB of the correlation table according to the first embodiment of this invention.

A transition table 1201 shown in FIG. 12 shows events or processes generated/executed during a period of detecting a correlation from time $t_{a+1}$ to $t_{a+x}$. In this transition table 1201, the events and processes having a circle around indicate that respective events and processes have been generated/executed.

Based on this transition table 1201, a correlation of the event and process is obtained and stored in the region D (408) of the correlation table 409. In the region D (408), for example, the ordinate axis represents a preceding event/former process 1203, and the abscissa axis represents a subsequent event/subsequent process 1202.

The correlation information stored in the region D (408) based on the order of generation of the events or the order of execution of the processes during the period of detecting a correlation of the transition table 1201. Taking an event $e_2$, for example, the event $e_2$ is generated at time $t_{a+2}$, and that the events and processes being generated/executed at or after the time $t_{a+2}$ during the period of detecting a correlation, includes a process $p_2$ for once and the event $e_2$ for twice. By storing the results in the column of $e_2$ of the region D (408), it can be understood that there is a high probability that the event $e_2$ will generated again subsequent to the preceding event $e_2$.

Next, an example of the processing of updating the correlation information stored in the region D (408) of the correlation table 409 by the method of storing the correlation information described with reference to FIG. 12 will be described with reference to the flowchart shown in FIG. 13.

First, an event and process generated/executed at time $t_{a+x}$ are obtained from the data collector/statistical processor 201 (Step 1302). Next, the statistical processing shown in FIG. 12 is carried out if necessary (Step 1303). Then, the event and process generated/executed at time $t_{a+x}$ are stored (Step 1304), and events and processes generated/executed from time $t_{a+1}$ to $t_{a+x}$ are read out (Step 1305).

The correlation table shown in FIG. 12 can be created from those read data items. Here, elements on the ordinate axis of the correlation table 409 are referred to as update target A. Evaluation is made first on whether the update target A has been generated/executed at time $t_{a+1}$ (Step 1307). When no update target A has been generated/executed, evaluation is made on whether the time is $t_{a+x}$ (Step 1308). As a result, when the time is not $t_{a+x}$, the time is adjusted to advance by 1 unit time (Step 1309), and the procedure returns to Step 1307. On the other hand, when the time is $t_{a+x}$, the processing advances to Step 1312.

On the other hand, when it is evaluated that the update target A has been generated/executed in Step 1307, the number of generated times or executed times of the update target A, with respect to the events or processes generated/executed at or after that time, is counted up (Step 1310), and the result of the count is stored as the correlation information (Step 1311).

Next, evaluation is made on presence/absence of the events or processes to be the next update target (Step 1312). When there are more update targets, a next update target is set as the update target A, and the time is restored to its initial status (Step 1313). When there are no more update targets, the event or process at the earliest time $t_{a+1}$ is deleted (Step 1314). Then, when the time reaches time $t_{a+x+1}$, 1 is added to a, and the procedure returns to Step 1302.

Figure 14:
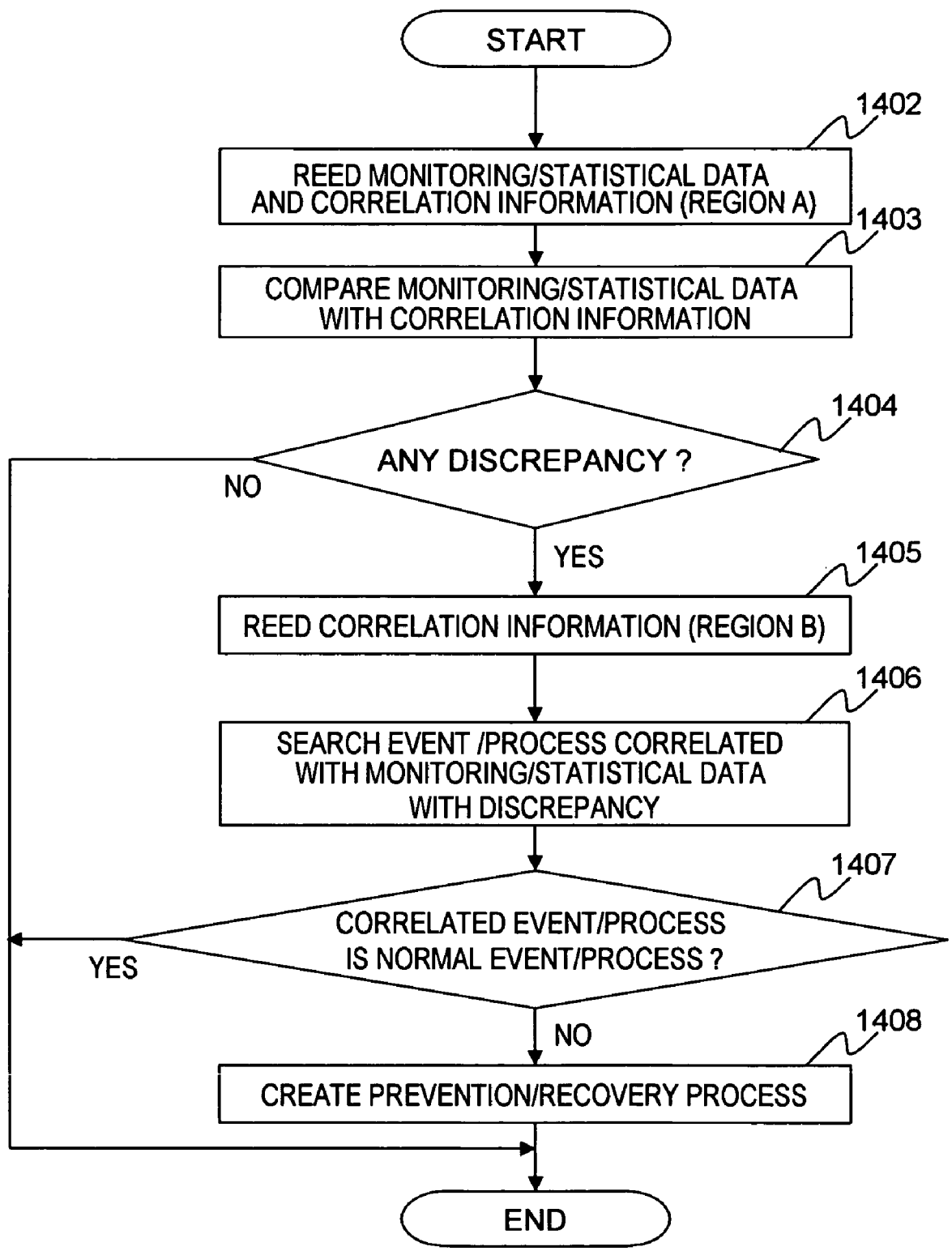
FIG. 14 is a flowchart showing an operation of a detector/process creator according to the first embodiment of this invention.

Hereinbefore, examples of the method of creating the correlation information stored in the correlation information storage 203 have been described. Next, an operation of the detector/process creator 205 will be described with reference to the flowchart shown in FIG. 14.

The detector/process creator 205 reads out current monitoring data, statistical data, etc. from the data collector/statistical processor 201, and reads out correlation information from the correlation information storage 203 via the correlation information abstracter 204 (Step 1402). In this processing, the correlation information stored in the region A (405) is used.

Next, the current monitoring data and statistical data are compared with the correlation information (Step 1403). In Step 1403, for example, when the correlation coefficient of the monitoring data $m_1$ and the statistical data $s_1$ is 1, and there is a relationship represented by a regression line of $s_1 = m_1$ in the correlation information, the current monitoring data and statistical data are compared the correlation information so as to evaluate whether the current monitoring data $m_1$ and statistical data $s_1$ have the relationship of $s_1 = m_1$. When the relationship between the current monitoring data and statistical data, and the correlation information is consistent, the detector/process creator 205 evaluates that there is no error/failure, and ends the operation.

On the other hand, when there is a discrepancy in the relationship of the current monitoring data and statistical data, and the correlation information, the correlation information stored in the region B (406) is read out subsequently (Step 1405). Then, the detector/process creator 205 searches for the events and processes correlated with the monitoring data and statistical data having the discrepancy (Step 1406).

The average values, variances, and the like of the monitoring data and statistical data at the time of generation and non-generation of the event, and at the time of execution and non-execution of the process are stored in the region B (406). Accordingly, the detector/process creator 205 can search for the events and processes whose generation/execution is correlated with the current monitoring data and statistical data having the discrepancy. After that, evaluation is made on whether the obtained events and processes are normal events and processes (Step 1407). The evaluation of Step 1407 is made based on attributes imparted to the events and processes, for example.

When the obtained events and processes are evaluated to be normal, the detector/process creator 205 evaluates that no error/failure has been generated, and ends the operation. On the other hand, when the obtained events and processes are evaluated to have a correlation with the events and process evaluated to be abnormal, the detector/process creator 205 creates a prevention/recovery process for countering with the error/failure (Step 1408). Details of the processing of Step 1408 are as described above.

It should be noted that when events and processes having the correlation cannot be obtained in Step 1406, unidentified error/failure unlike those in the past may be generated. In that case, the detector/process creator 205 evaluates that there is error/failure, and creates a prevention/recovery process in Step 1408. It should be noted that in this case, the detector/process creator 205 can also evaluate that no error/failure is generated.

Figure 15:
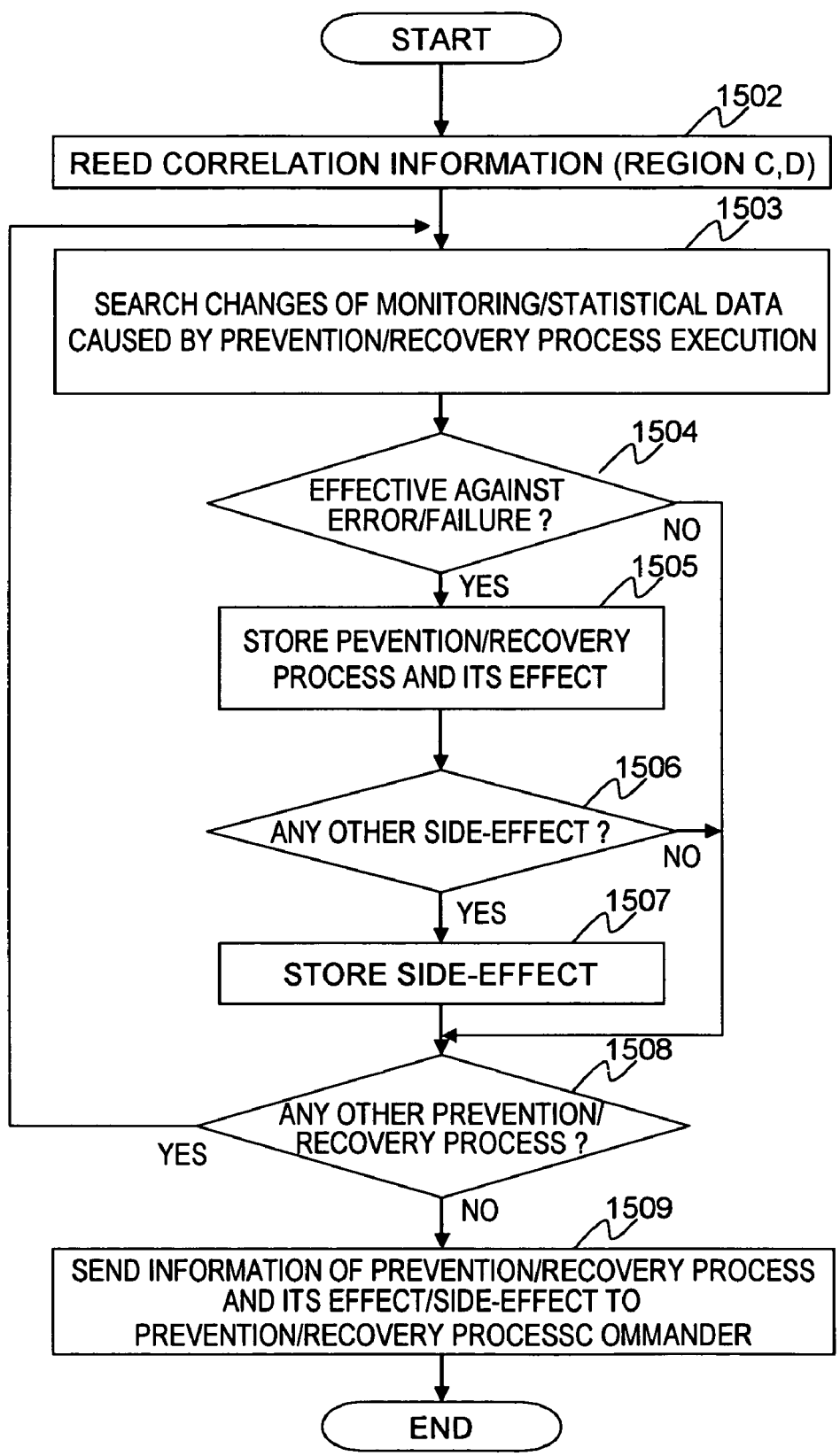
FIG. 15 is a flowchart showing an operation of an effect/side-effect evaluator according to the first embodiment of this invention.

Next, an operation of the effect/side-effect evaluator (hereinafter, referred to as "evaluator") 206 will be described with reference to the flowchart shown in FIG. 15.

The evaluator 206 obtains from the detector/process creator 205 information related to the monitoring data and statistical data detected to have error/failure at the time of detection, and the prevention/recovery process. Further, the evaluator 206 obtains information on the current monitoring data, statistical data, and the like from the data collector/statistical processor 201. Then, the evaluator 206 reads out correlation information from the correlation information storage 203 via the correlation information abstracter 204 (Step 1502). In this processing, the correlation information items stored in the region C (407) and the region D (408) are mainly used.

Next, the evaluator 206 obtains from the region C (407) correlation information indicating what changes of the monitoring data and statistical data detected to have error/failure are caused by the execution of the prevention/recovery process (Step 1503). Then, evaluation is made on whether error/failure is removed by adding the changes of the obtained monitoring data and statistical data to the current monitoring data and statistical data (Step 1504). In other words, the effect of the prevention/recovery process execution is evaluated.

When no effect of the prevention/recovery process can be expected as a result of the evaluation, the processing advances to Step 1508, and another process is searched. On the other hand, when the effect of the prevention/recovery process can be expected, the effect is stored (Step 1505). Then, the evaluator 206 obtains the changes of the other monitoring data and statistical data caused by the process from the region C (407). The obtained changes of the monitoring data and statistical data are added to the current monitoring data and statistical data, whereby evaluation is made on whether any other error/failure occurs (Step 1506).

When other error/failure occurs and there is a side-effect caused by the prevention/recovery process execution, the side-effect is stored (Step 1507). Assuming that the processing of Steps 1503 to 1507 are one cycle, when there is another prevention/recovery process (Step 1508), the procedure returns to Step 1503 and repeats the same processing in the cycle.

On the other hand, when evaluation of all processes has been completed, the evaluator 206 sends information of the prevention/recovery process, the effect of the process stored in Step 1505, and the side-effect thereof stored in Step 1507 to the prevention/recovery process commander 208 (Step 1509). After that, the processing is ended.

The operations of the evaluator/commander controller 207 and the prevention/recovery process commander 208 are as described above with reference to FIGS. 2 and 3.

Second Embodiment

Next, a second embodiment of this invention will be described with reference to FIG. 16. The second embodiment is different from the first embodiment in the following points.

In the first embodiment shown in FIG. 2, the process created for the prevention and recovery with respect to the detected error/failure is evaluated on an effect and side-effect basis. On the other hand, in the second embodiment, a process command inputted externally is evaluated on an effect/side-effect basis thereof. Accordingly, a controller of failure prevention/recovery 106 of the second embodiment includes a process command input interface 1601.

The controller of failure prevention/recovery 106 of the second embodiment includes a data collector/statistical processor 201, a correlation information updater 202, a correlation information storage 203, a correlation information abstracter 204, the process command input interface 1601, an effect/side-effect evaluator 1602, an evaluator/commander controller 1603, and a process commander 1604. A processor executes a program stored in a storage (not shown) to implement those components. Of the components of the controller of failure prevention/recovery 106 of the second embodiment, components which perform the same operation as those of the first embodiment are denoted by the same reference numerals, and the description thereof is omitted.

The process command input interface 1601 is an interface through which a process is designated externally. A process command may be inputted to the process command input interface 1601 not only to deal with an error/failure when it occurs but also to change system configuration, to update software, or to perform scheduled maintenance and incidental maintenance for a routine.

The effect/side-effect evaluator 1602 evaluates the process command inputted from the process command input interface 1601 on the effect/side-effect basis, like the effect/side-effect evaluator 206 of the first embodiment. Therefore, the effect/side-effect evaluator 1602 can also evaluate whether or not an error/failure status occurs due to the side-effect of the process executed for a routine.

The evaluator/commander controller 1603 controls the operations of the effect/side-effect evaluator 1602 and the process commander 1604, like the evaluator/commander controller 207 of the first embodiment.

The process commander 1604 obtains, like the prevention/recovery process commander 208 of the first embodiment, information on the process command inputted from the effect/side-effect evaluator 1602 and on the effect and side-effect of the process to determine whether the execution of the process is necessary, the process execution order, the time when the process is executed, or the like.

Figure 17:
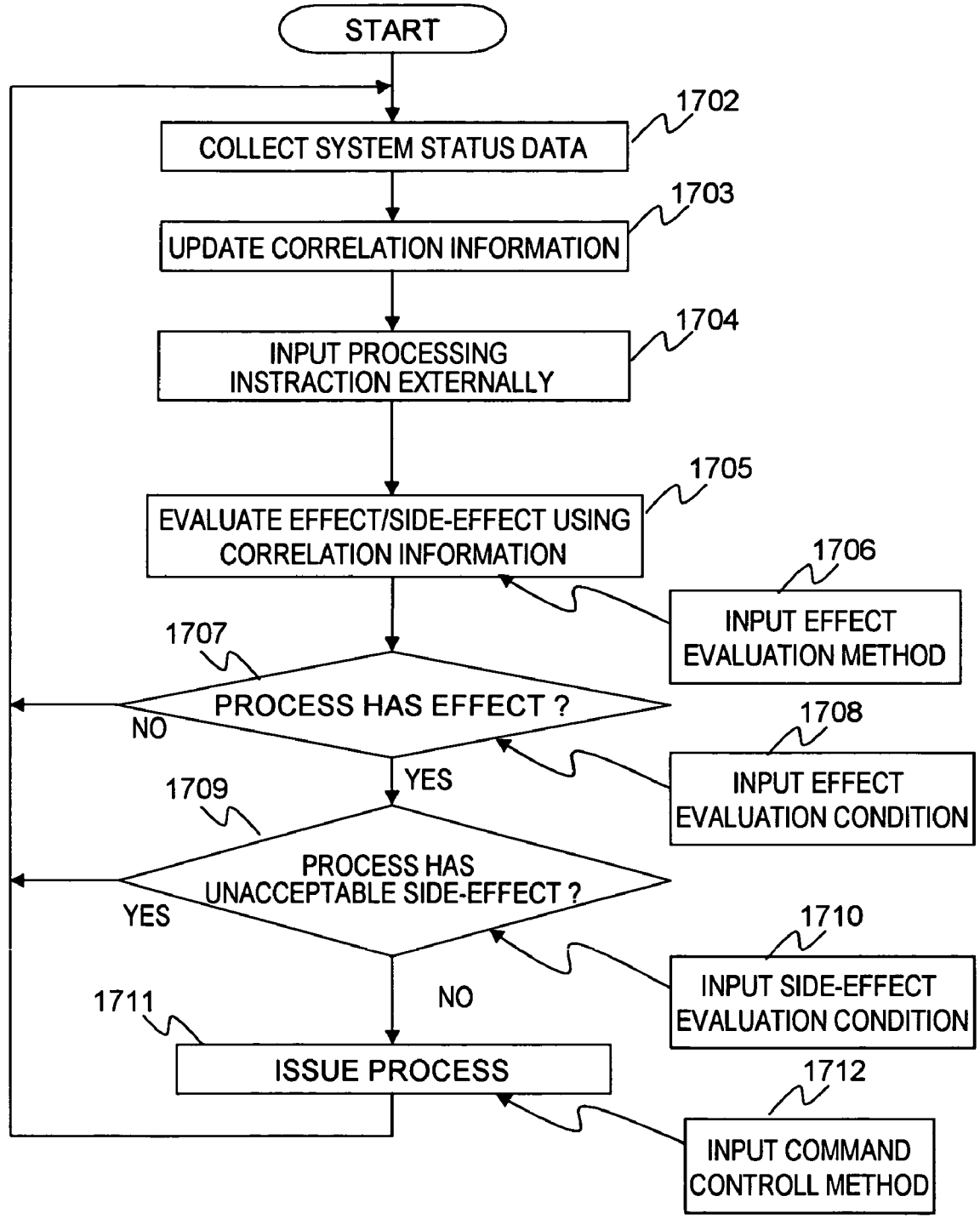
FIG. 17 is a flowchart showing an operation of the controller of failure prevention/recovery according to the second embodiment of this invention.

Next, an operation of the controller of failure/recovery 106 of the second embodiment will be described with reference to the flowchart of FIG. 17.

First, a data collector/statistical processor 201 collects information on a status of the target system 101 (Step 1702).

Next, the correlation information updater 202 updates the correlation information stored in the correlation information storage 203 using the pieces of information collected by the data collector/statistical processor 201 (Step 1703). It should be noted that, in the initial status, the processing of Step 1703 is to add correlation information.

Next, the process command input interface 1601 receives an external input of the process command (Step 1704).

Next, the effect/side-effect evaluator 1602 evaluates the effect and side-effect of the process using the correlation information (Step 1705). The effect and side-effect of the process are evaluated based on conditions inputted to the evaluator/commander controller 1603 in Step 1706.

Then, the process commander 1604 determines whether or not the process has an effect (Step 1707). The effect is evaluated based on the conditions inputted to the evaluator/commander controller 1603 in Step 1708.

When the effect of the process cannot be expected, the process is not executed and the procedure returns to Step 1702. When the effect of the process can be expected, the side-effect on others is evaluated (Step 1709). The side-effect is evaluated based on the conditions inputted to the evaluator/commander controller 1603 in Step 1710.

As a result of the evaluation, when the side-effect is unacceptable, the process is not executed and the procedure returns to Step 1702. When the side-effect is evaluated to be insignificant, the process commander 1604 commands the target system 101 to execute the process (Step 1711). The commander control method regarding whether the command execution is necessary, the command execution order, or the like is based on the method inputted to the evaluator/commander controller 1603 in Step 1712.

Upon issuance of the command in Step 1711, the procedure returns to Step 1702.

It should be noted that the update of the correlation information in Step 1703 may be carried out at an arbitrary time point after Step 1704 or before returning to Step 1702. Further, the input processing of Steps 1706, 1708, 1710, and 1712 may be omitted as long as predetermined data (method) is used.

Further, when the process is not executed, the fact that the process has not been executed is notified of the process command input interface 1601. Upon reception of the notification, the process command input interface 1601 displays or stores the fact.

As described above, in the second embodiment, the process command inputted from the process command input interface 1601 is evaluated on the effect/side-effect basis. Therefore, it is possible to evaluate whether an error/failure status occurs through the process executed in the normal case, and the occurrence of the error/failure status can be notified to the administrator. Thus, an operation error caused by the administrator can be reduced.

Third Embodiment

Next, a third embodiment of this invention is described with reference to FIG. 18. The third embodiment is different from the first and second embodiments in the following points.

Figure 16:
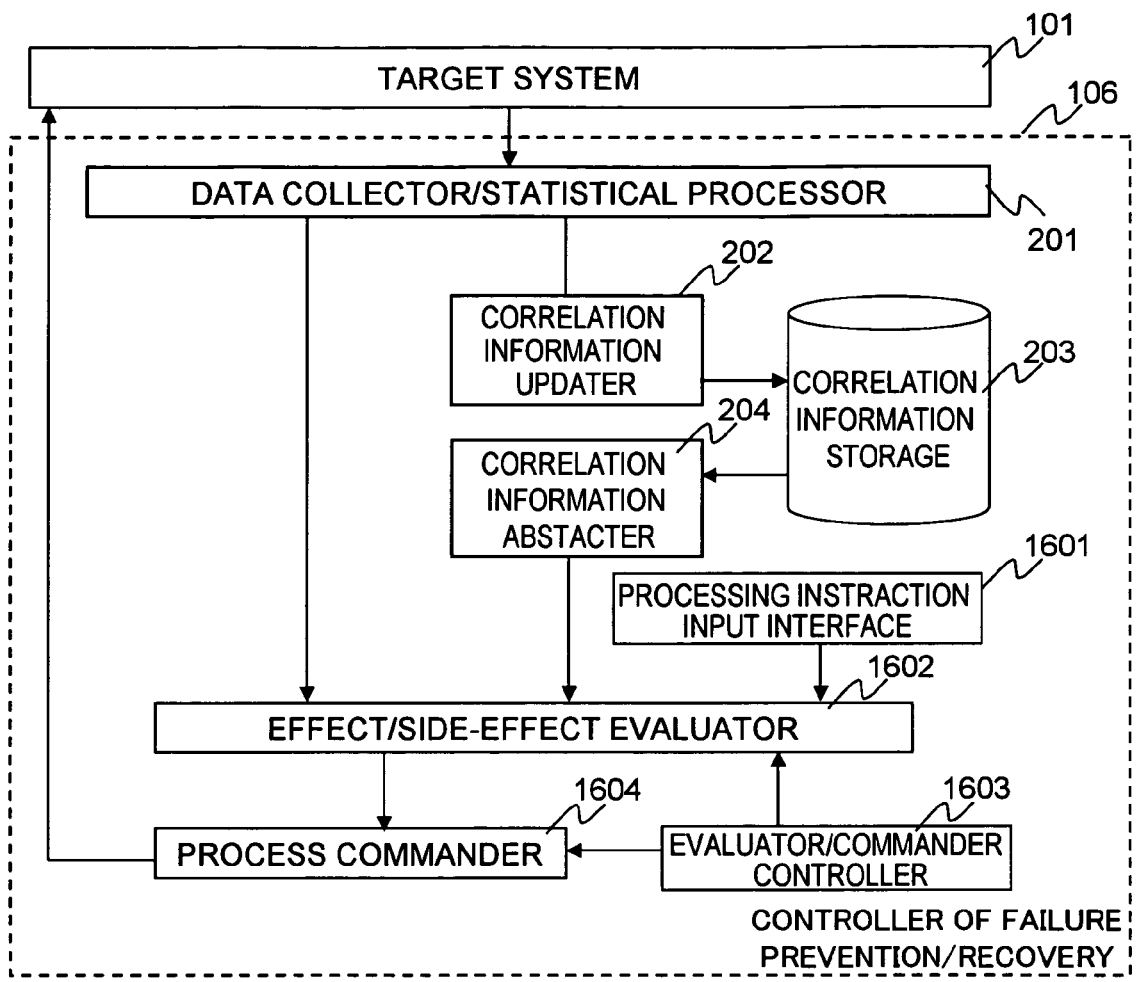
FIG. 16 is a block diagram showing a configuration of a controller of failure prevention/recovery according to a second embodiment of this invention.

In the first and second embodiments shown in FIGS. 2 and 16, as a result of the evaluation of the process on the effect/side-effect basis, the process is not executed in some cases. On the other hand, in the third embodiment, a process is fed back in a case where it is determined that a sufficient effect cannot be expected or a side-effect on others is unacceptable by an effect/side-effect evaluator 1803. Therefore, a controller of failure prevention/recovery 106 includes feedback loops 1804 and 1805.

The controller of failure prevention/recovery 106 of the third embodiment includes a data collector/statistical processor 201, a correlation information updater 202, a correlation information storage 203, a correlation information abstracter 204, an error/failure detector-root cause analyzer-prevention/recovery process creator 1801, a process command input interface 1802, an effect/side-effect evaluator 1803, an evaluator/commander controller 1806, and a process commander 1807. A processor executes a program stored in a storage (not shown) to implement those components. Of the components of the controller of failure prevention/recovery 106 of the third embodiment, components which perform the same operation as those of the first embodiment are denoted by the same reference numerals, and the description thereof is omitted.

The error/failure detector-root cause analyzer-prevention/recovery process creator (hereinafter, abbreviated as detector/process creator) 1801 uses collected/statistically processed information by the data collector/statistical processor 201 and a correlation information read out from the correlation information storage 203 by the correlation information abstracter 204 to detect an error/failure status of the target system 101. In addition, the detector/process creator 1801 performs feedback on the process in a case where it is determined that a sufficient effect cannot be expected or a side-effect is unacceptable by the effect/side-effect evaluator 1803, based on the notification through the feedback loop 1804.

It should be noted that in the third embodiment, the detector/process creator 1801 may not be provided as in the second embodiment.

The process command input interface 1802 is an interface through which process is designated externally. A process command may be inputted to the process command input interface 1802 not only to deal with an error/failure when it occurs but also to change system configuration, to update software, or to perform scheduled maintenance and incidental maintenance for a routine. In addition, when it is determined that the sufficient effect of the process cannot be expected and when the side-effect on others is unacceptable by the effect/side-effect evaluator 1803, the process command input interface 1802 receives a process command again, based on the notification through the feedback loop 1805. Through the process received by the process command input interface 1802, another process can be executed.

The effect/side-effect evaluator 1803 receives a root cause analysis result and a process for prevention/recovery from the detector/process creator 1801 when error/failure is detected, like the effect/side-effect evaluator 206 of the first embodiment. Then, the effect/side-effect evaluator 1803 uses information indicating a status of target system 101 obtained by the data collector/statistical processor 201 and a correlation information stored in the correlation information storage 203 through the correlation information abstracter 204 to evaluate the effect and side-effect on the target system 101 through execution of the prevention/recovery process. Further, when the sufficient effect of the process cannot be expected and when the side-effect on others is unacceptable, the effect/side-effect evaluator 1803 notifies the detector/process creator 1801 of the fact through the feedback loop 1804.

In addition, like the effect/side-effect evaluator 1602 of the second embodiment, the effect/side-effect evaluator 1803 evaluates the process command inputted from the process command input interface 1802 on the effect/side-effect basis. Further, when the sufficient effect of the process cannot be expected and when the side-effect on others is unacceptable, the effect/side-effect evaluator 1803 notifies the process command input interface 1802 of the fact through the feedback loop 1805.

The evaluator/commander controller 1806 controls the operations of the effect/side-effect evaluator 1803 and the process commander 1807, like the evaluator/commander controller 207 of the first embodiment. The evaluator/commander controller 1806 controls a convergence condition of the feedback loops 1804 and 1805. For example, generation management is performed at the time of feedback to enable control which makes feedback possible over the third generation at maximum.

The process commander 1807 obtains, like the prevention/recovery process commander 208 of the first embodiment, information on the process command inputted from the effect/side-effect evaluator 1803 and on the effect/side-effect of the process to determine whether the execution of the process is necessary, the process execution order, the time when the process is executed, or the like.

Figure 19:
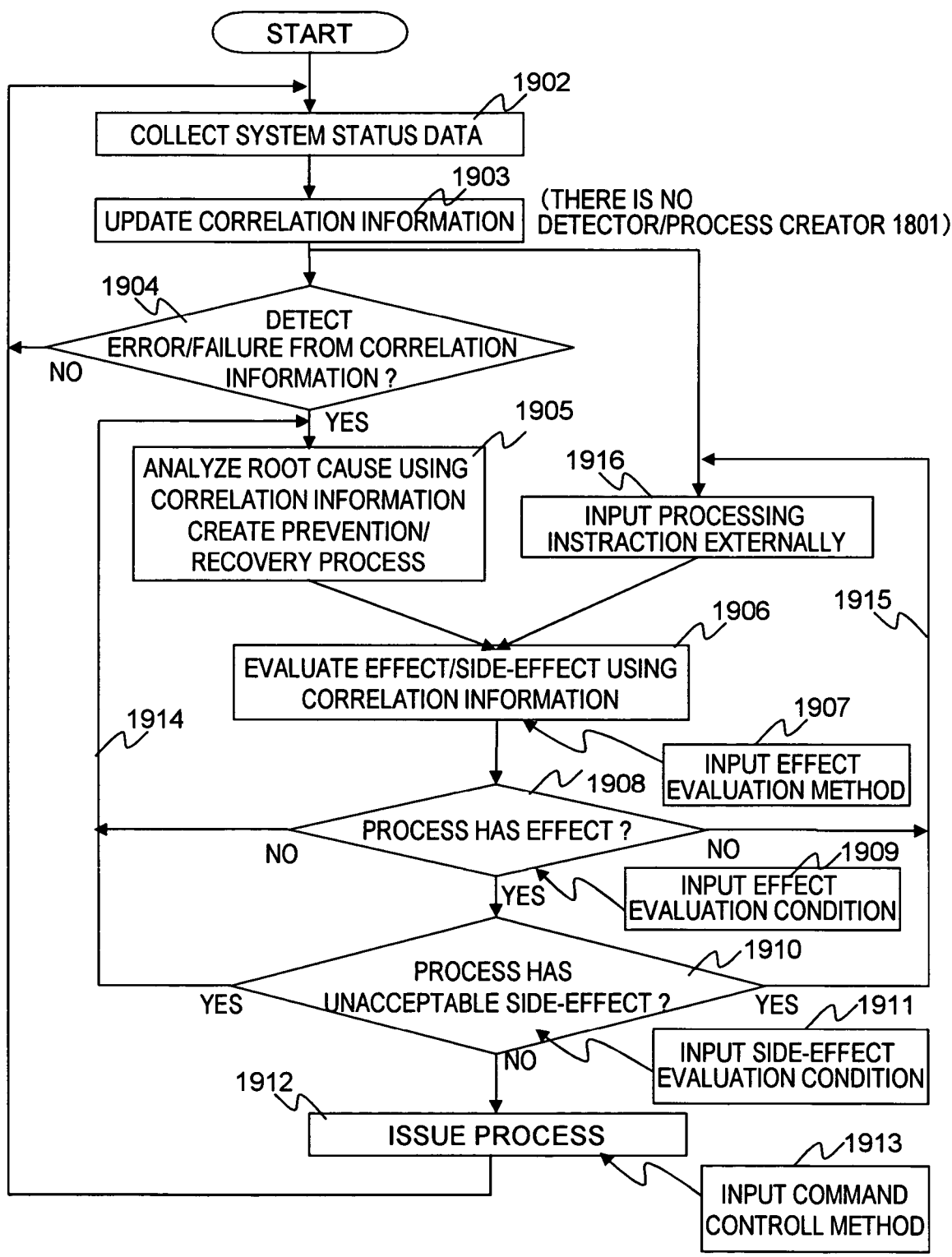
FIG. 19 is a flowchart showing an operation of the controller of failure prevention/recovery according to the third embodiment of this invention.

Next, an operation of the controller of failure/recovery 106 of the third embodiment is described with reference to the flowchart of FIG. 19.

First, the data collector/statistical processor 201 collects information on the status of the target system 101 (Step 1902).

Next, the correlation information updater 202 updates the correlation information stored in the correlation information storage 203 using the pieces of information collected by the data collector/statistical processor 201 (Step 1903). It should be noted that in the initial status, the processing of Step 1903 is to add correlation information.

After Step 1903, processing is branched depending on presence or absence of the detector/process creator 1801 which is an arbitrary component of the third embodiment. When the detector/process creator 1801 is provided, the procedure proceeds to Step 1904 to detect error/failure using the correlation information. On the other hand, when the detector/process creator 1801 is not provided, the procedure proceeds to Step 1916 to wait for an input from the process command input interface 1802.

Next, in Step 1904, the detector/process creator 1801 detects the presence or absence of error/failure based on the current system status and the correlation information. An example of the method of detecting the presence or absence of the error/failure is as described above. The procedure returns to Step 1902 when no error/failure is detected in Step 1904.

On the other hand, when the error/failure is detected in Step 1904, the detector/process creator 1801 analyzes the root cause by using the correlation information and creates the failure prevention/recovery process (Step 1905). An example of the processing of Step 1905 is as described above.

Next, the effect/side-effect evaluator 1802 evaluates the effect and side-effect of the process using the correlation information (Step 1906). The effect and side-effect of the process are evaluated based on conditions inputted to the evaluator/commander controller 1806 in Step 1907.

The process commander 1807 evaluates whether the effect of the process can be obtained or not (Step 1908). The evaluation as to the effect is made based on conditions inputted to the evaluator/commander controller 1806 in Step 1909. The maximum number of repeating the feedback operations 1914 and 1915 is also inputted to the evaluation/commander controller 1806.

When the effect of the process cannot be expected, the procedure returns to Step 1905 (feedback operation 1914). When the effect of the process can be expected, the side-effect on others are evaluated (Step 1910). The evaluation as to the side-effect is made based on the conditions inputted to the evaluator/commander controller 1806 in Step 1911.

As a result of the evaluation, when the side-effect is unacceptable, the process is not executed and the procedure returns to Step 1905 (feedback operation 1914). When the side-effect is evaluated to be insignificant, the process commander 1807 commands the target system 101 to execute the process (Step 1912). The commander control method regarding whether the command execution is necessary, the command execution order, or the like is based on the method inputted to the evaluator/commander controller 1806 in Step 1913.

Upon issuance of the command for the prevention/recovery process in Step 1912, the procedure returns to Step 1902.

Meanwhile, the process command input interface 1802 receives a process command inputted externally (Step 1916). Also, in this case, the same processing as that of Step 1905 is performed in the steps subsequent to Step 1906. It should be noted that in this case, the procedure returns to Step 1916 through the feedback operation 1915 from Steps 1908 and 1910.

The number of repeating the feedback operations 1914 and 1915 is limited according to the number inputted to the evaluator/commander controller 1806.

As described above, in the third embodiment, in order to feed back the process based on the effect/side-effect thereof, and thus the feedback loops 1804 and 1805 are provided. With this configuration, another process is selected or another process command input is received, which makes it possible to execute another process which is more appropriate.

Fourth Embodiment

Figure 20:
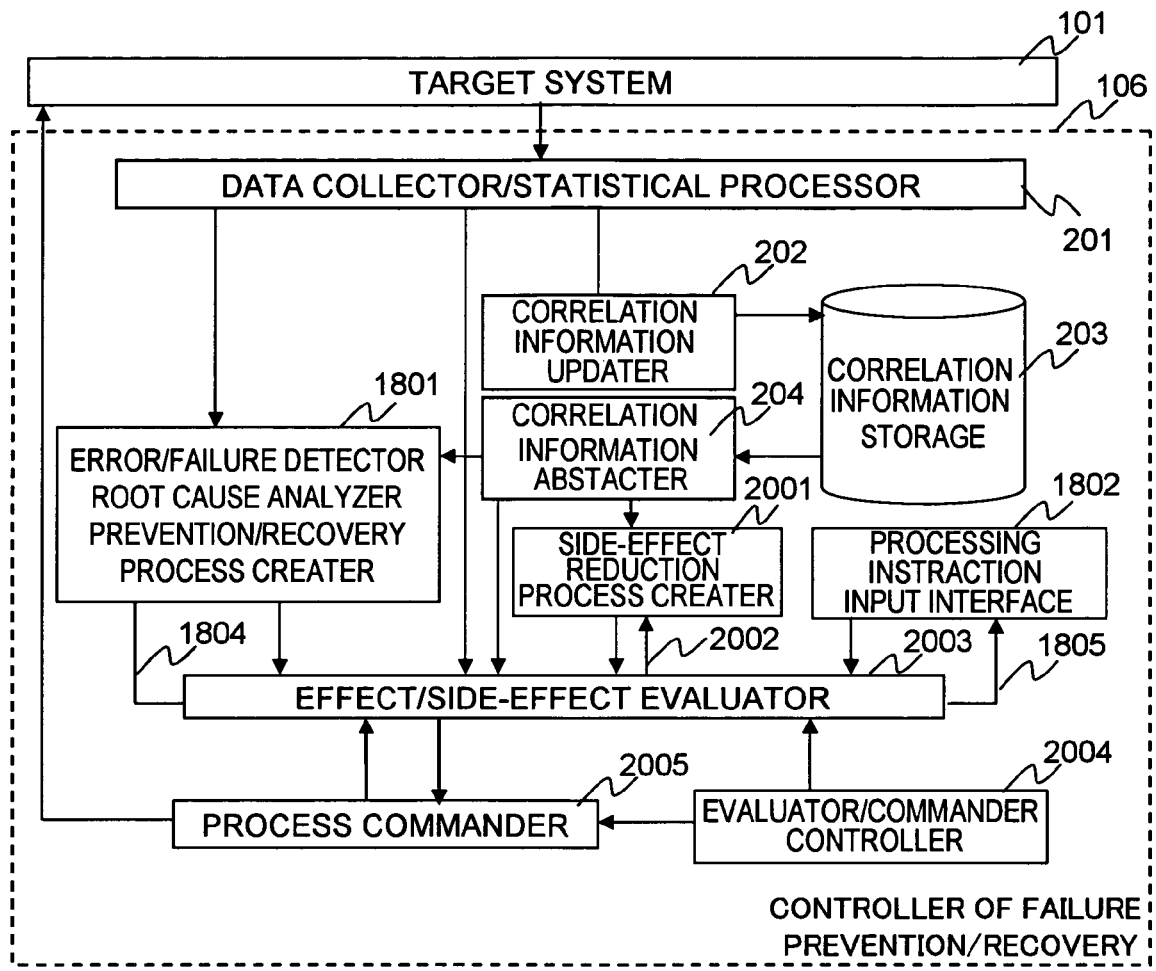
FIG. 20 is a block diagram showing a configuration of a controller of failure prevention/recovery according to a fourth embodiment of this invention.

Next, a fourth embodiment of this invention will be described with reference to FIG. 20. The fourth embodiment is different from the third embodiment in the following points.

Figure 18:
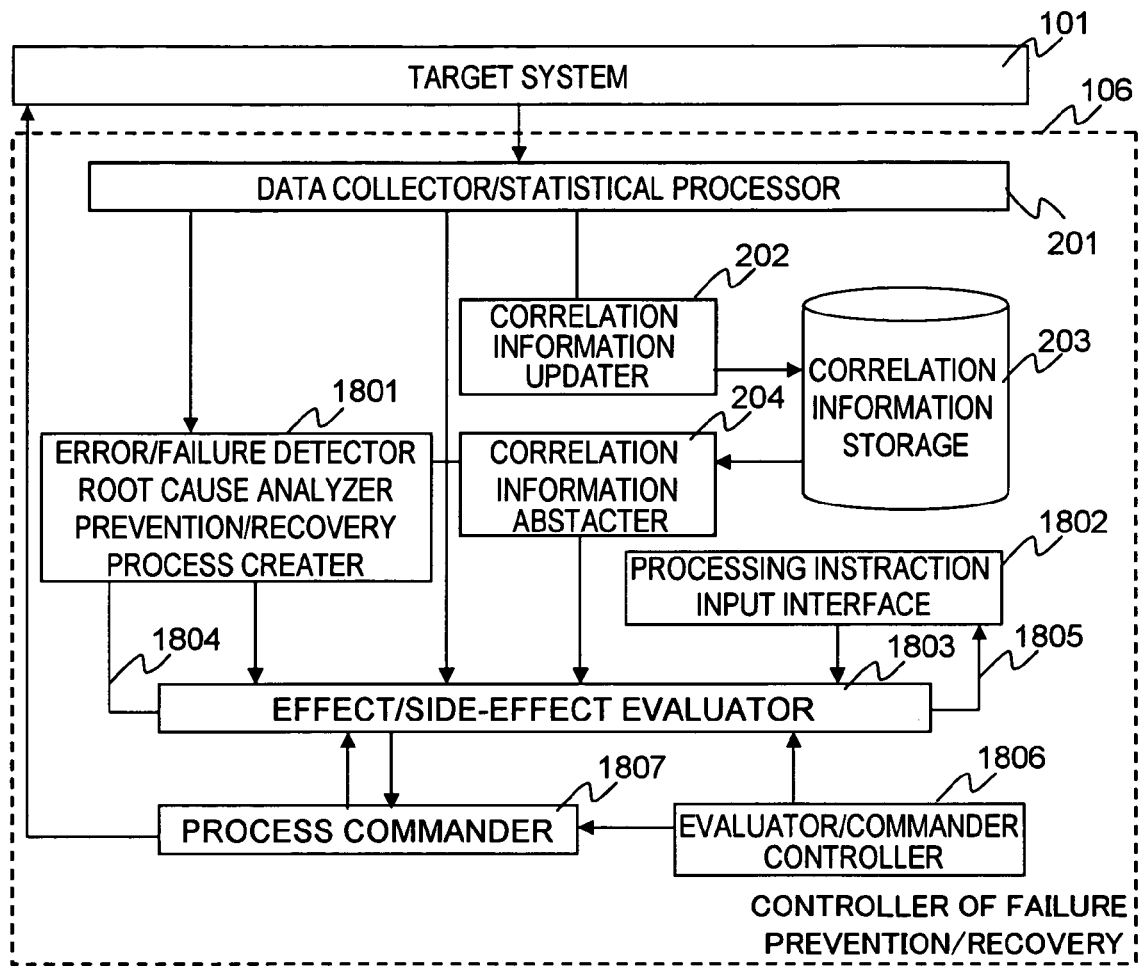
FIG. 18 is a block diagram showing a configuration of a controller of failure prevention/recovery according to a third embodiment of this invention.

In the third embodiment shown in FIG. 18, the feedback loops 1804 and 1805 are provided to re-create the process in the detector/process creator 1801 or receive the input of another process command in the process commander input interface 1802, thereby making it possible to execute another processing. However, a process having an effect and a small side-effect on others cannot necessarily be executed by the re-creation of the process or the re-input of the process command. In view of this, there is provided a method of executing a process having a large effect and a small side-effect as a whole. This method is implemented by simultaneously or subsequently performing a process of canceling a side-effect of a process which produces an effect but also has the side-effect on others. Therefore, a controller of failure prevention/recovery 106 of the fourth embodiment includes a side-effect reduction process creator 2001.

The controller of failure prevention/recovery 106 of the fourth embodiment includes a data collector/statistical processor 201, a correlation information updater 202, a correlation information storage 203, a correlation information abstracter 204, an error/failure detector-root cause analyzer-prevention/recovery process creator 1801, a process command input interface 1802, the side-effect reduction process creator 2001, an effect/side-effect evaluator 2003, an evaluator/commander controller 2004, and a process commander 2005. A processor executes a program stored in a storage to implement those components. Of the components of the controller of failure prevention/recovery 106 of the fourth embodiment, components which perform the same operation as those of the third embodiment are denoted by the same reference numerals, and the description thereof is omitted.

The side-effect reduction process creator 2001 obtains through a feedback loop 2002 information on a process which is evaluated to have an effect but also a side-effect on others by the effect/side-effect evaluator 2003 and the process commander 2005. Then, the side-effect reduction process creator 2001 retrieves a process which produces an effect of reducing the side-effect from the correlation information storage 203 through the correlation information abstracter 204.

Like the effect/side-effect evaluator 1803 of the third embodiment, the effect/side-effect evaluator 2003 receives from the detector/process creator 1801 a result of a root cause analysis and a prevention/recovery process at the time of detecting an error/failure, to thereby evaluate an effect/side-effect to be produced on a target system 101 by the execution of the process.

Like the evaluator/commander controller 1806 of the third embodiment, the evaluator/commander controller 2004 controls operations of the effect/side-effect evaluator 2003 and the process commander 2005. In addition, the evaluator/commander controller 2004 controls the number of repeating feedback to the side-effect reduction process creator 2001 through the feedback loop 2002, and an execution schedule such as an execution order in which the side-effect reduction process thus created and a process to be paired therewith are performed.

Like the prevention/recovery process commander 1807 of the third embodiment, the process commander 2005 obtains a process command inputted from the effect/side-effect evaluator 2003 and information on an effect and side-effect of the process to determine whether the execution of the process is necessary, the process execution order, the time when the process is executed, or the like.

It should be noted that in the fourth embodiment, the detector/process creator 1801 may not be provided as in the second embodiment.

Figure 21:
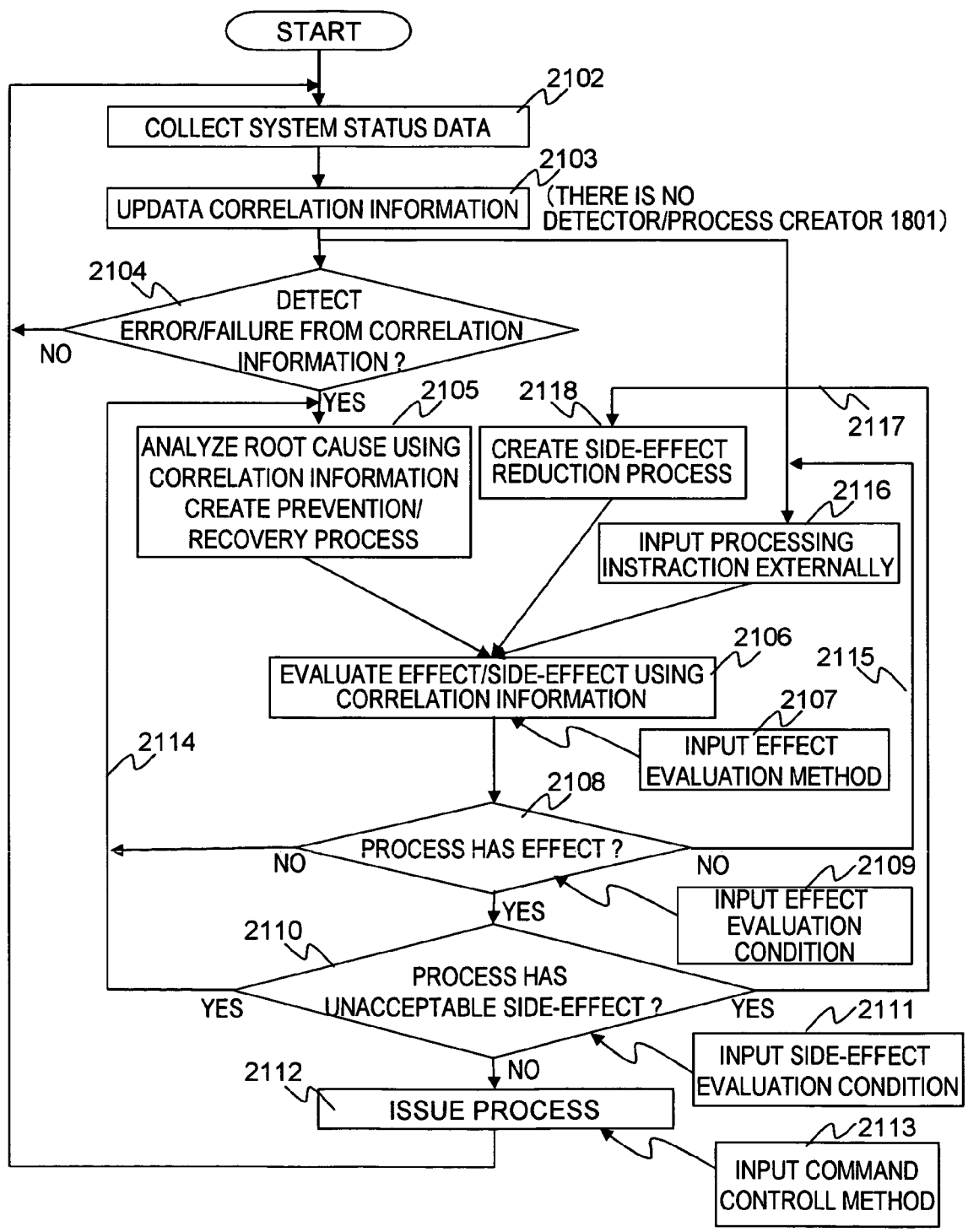
FIG. 21 is a flowchart showing an operation of the controller of failure prevention/recovery according to the fourth embodiment of this invention.

Next, the operation of the controller of failure prevention/recovery 106 according to the fourth embodiment will be described with reference to the flowchart of FIG. 21.

First, the data collector/statistical processor 201 collects information on the status of the target system 101 (Step 2102).

Next, the correlation information updater 202 updates the correlation information stored in the correlation information storage 203 using the pieces of information collected by the data collector/statistical processor 201 (Step 2103). It should be noted that in the initial status, the processing of Step 2103 is to add correlation information.

After Step 2103, processing is branched depending on the presence or absence of the detector/process creator 1801 which is an arbitrary component of the fourth embodiment. When the detector/process creator 1801 is provided, the procedure proceeds to Step 2104 to detect error/failure using the correlation information. On the other hand, when the detector/process creator 1801 is not provided, the procedure proceeds to Step 2116 to wait for an input from the process command input interface 1802.

In Step 2104, the detector/process creator 1801 detects the presence or absence of an error/failure based on the current system status and the correlation information. An example of the method of detecting the presence or absence of the error/failure is as described above. The procedure returns to Step 2102 when no error/failure is detected in Step 2104.

On the other hand, when error/failure is detected in Step 2104, the detector/process creator 1801 analyzes the root cause by using the correlation information and creates the prevention/recovery process (Step 2105). An example of the processing of Step 2105 is as described above.

Next, the effect/side-effect evaluator 2003 evaluates the effect and side-effect of the process using the correlation information (Step 2106). The effect and side-effect of the process are evaluated based on conditions inputted to the evaluator/commander controller 2004 in Step 2107.

The process commander 2005 evaluates whether the effect of the process can be obtained or not (Step 2108). The evaluation as to the effect is made based on conditions inputted to the evaluator/commander controller 2004 in Step 2109. The maximum number of feedback operations 2114 and 2115 is also inputted to the evaluation/commander controller 2004.

When the effect of the process cannot be expected, the procedure returns to Step 2105 (feedback operation 2114). When the effect of the process can be expected, the side-effect on others are evaluated (Step 2110). The evaluation as to the side-effect is made based on the conditions inputted to the evaluator/commander controller 2004 in Step 2111.

As a result of the evaluation, when the side-effect is unacceptable, the procedure returns to Step 2118 (feedback operation 2117). The side-effect reduction process creator 2001 creates a process of reducing the side-effect (Step 2118). The side-effect reduction process thus created is evaluated on the presence or absence of the effect of reducing the side-effect and on an extent of the side-effect in the steps subsequent to Step 2106. The maximum number of the feedback operations 2117 is also inputted to the evaluator/commander controller 2004.

When the side-effect is evaluated to be insignificant, the process commander 2005 commands the target system 101 to execute the process (Step 2112). The commander control method regarding whether the command execution is necessary, the command execution order, or the like is based on the method inputted to the evaluator/commander controller 2004 in Step 2113.

Upon issuance of the process command in Step 2112, the procedure returns to Step 2102.

Meanwhile, the process command input interface 1802 receives a process command inputted externally (Step 2116). Also, in this case, the same process as the process created in Step 2105 is performed in the steps subsequent to Step 2106. It should be noted that in this case, the procedure returns to Step 2116 through the feedback operation 2115 from Step 2108.

The feedback operations 2114, 2115, and 2117 are limited according to the number inputted to the evaluator/commander controller 2004.

As described above, in the fourth embodiment, in order to create the side-effect reduction process, the feedback loop 2002 is provided. Thus, another side-effect reduction process is executed simultaneously or subsequently, which makes it possible to implement the process producing a large effect and a small side-effect as a whole.

Fifth Embodiment

Figure 22:
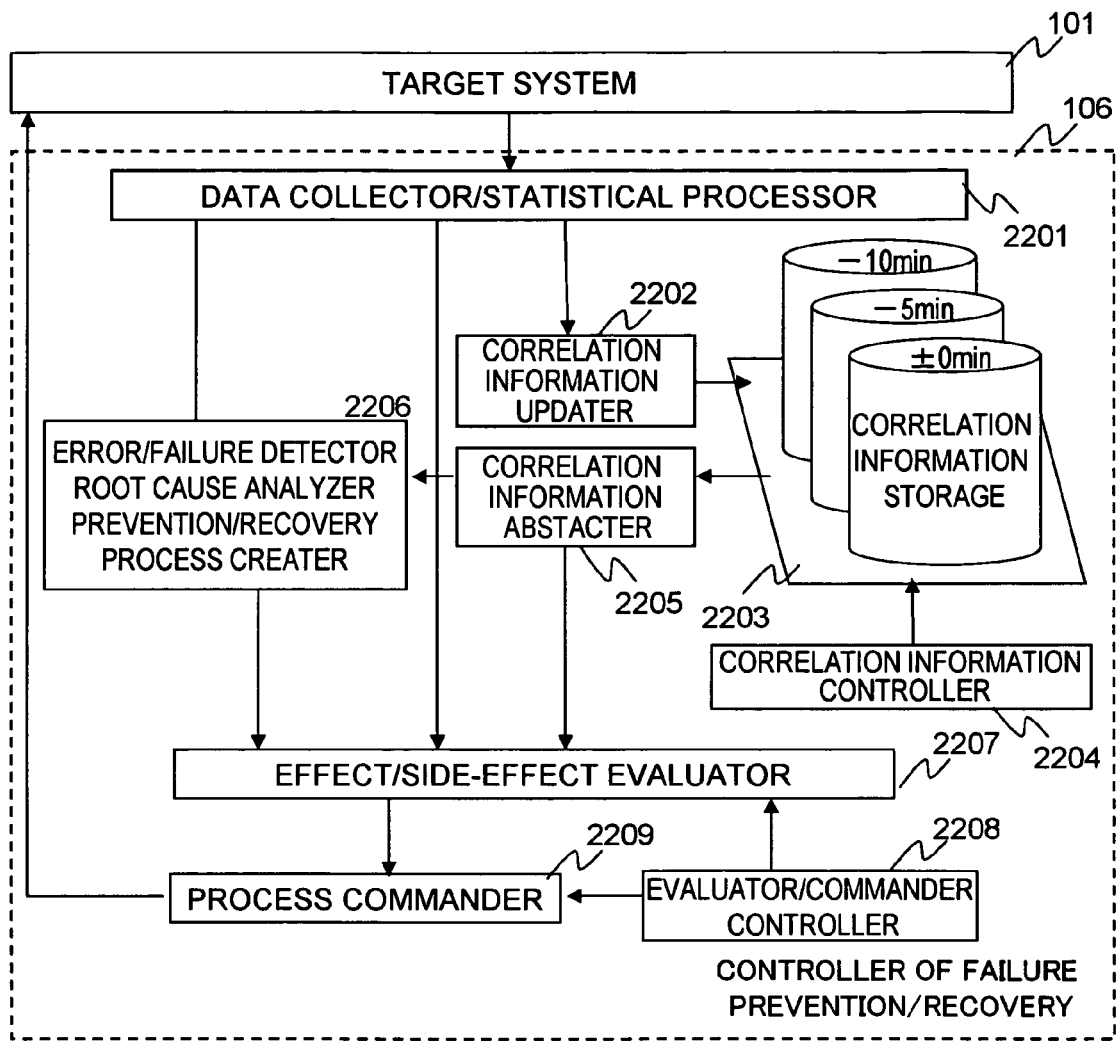
FIG. 22 is a block diagram showing a configuration of a controller of failure prevention/recovery according to a fifth embodiment of this invention.

Next, a fifth embodiment of this invention is described with reference to FIG. 22. The fifth embodiment is different from the first embodiment in the following points.

In the first embodiment as shown in FIG. 2, the correlation information storage 203 stores the correlation information created based on the information obtained in a predetermined period from a certain time as a reference. However, even when the correlation is unclear at a certain time, there are some cases where the correlation is obtained by shifting the information in time. Therefore, in the fifth embodiment, a configuration is adopted in which the correlation is stored while being shifted in time.

A controller of failure prevention/recovery 106 of the fifth embodiment includes a data collector/statistical processor 2201, a correlation information updater 2202, a correlation information storage 2203, a correlation information controller 2204, a correlation information abstracter 2205, an error/failure detector-root cause analyzer-prevention/recovery process creator 2206, an effect/side-effect evaluator 2207, an evaluator/commander controller 2208, and a process commander 2209. A processor executes a program stored in a storage to implement those components.

Like the data collector/statistical processor 201 of the first embodiment, the data collector/statistical processor 2201 creates data indicating a correlation between information items of an event, a process, etc., monitoring data, and statistical data.

Like the correlation information updater 202 of the first embodiment, the correlation information updater 2202 stores in the correlation information storage 2203 the correlation information created by the data collector/statistical processor 2201.

The correlation information storage 2203 includes a plurality of storages, which store a plurality of correlation information items obtained while being shifted in time. For example, a storage with a representation of "−10 minutes" stores correlation information created based on monitoring data A and monitoring data B which is obtained ten minutes earlier.

In other words, in the correlation of the fifth embodiment, to shift the time indicates that, at the time of creating correlation information of an index A and an index B, to use data of the index B, which is obtained earlier than the index A by a predetermined time. Herein, the index refers to monitoring data, statistical data, an event, a process, or the like.

The correlation information controller 2204 sets the time difference at the time of creating respective correlation information items of the correlation information storage 2203 including the plurality of storages. The correlation information controller 2204 includes an external interface and sets the time difference through the external interface.

It should be noted that in the fifth embodiment, in order to correspond to the correlation information storage 2203 including the plurality of the storages, the correlation information updater 2202, the correlation information abstracter 2205, the detector/process creator 2206, and the evaluator 2207, the evaluator/commander controller 2208, the process commander 2209, and the like are configured such that the process using the plurality of correlation information items can be performed.

The correlation information abstracter 2205 reads out the correlation information from the correlation information storage 2203, like the correlation information abstracter 204 of the first embodiment.

The error/failure detector-root cause analyzer-prevention/recovery process creator (hereinafter, abbreviated as detector/process creator) 2206 detects an error/failure status of the target system 101 by using the information subjected to collection/statistical process performed by the data collector/statistical processor 2201 and the correlation information read out form the correlation information storage 2203 by the correlation information abstracter 2205, like the detector/process creator 205 of the first embodiment.

The effect/side-effect evaluator 2207 receives a root cause analysis result and a prevention/recovery process from the detector/process creator 2206 at the time of detecting the error/failure, like the evaluator 206 of the first embodiment. Then, the effect/side-effect evaluator 2207 uses information indicating the status of the target system 101 obtained by the data collector/statistical processor 2201 and the correlation information stored in the correlation information storage 2203 through the correlation information abstracter 2205 to evaluate the effect/side-effect on the target system 101 to be caused by the execution of the prevention/recovery process.

The evaluator/commander controller 2208 controls the operations of the effect/side-effect evaluator 2207 and the process commander 2209, like the effect/side-effect evaluator 207 of the first embodiment.

Like the prevention/recovery process commander 208 of the first embodiment, the process commander 2209 obtains information on the process command inputted from the effect/side-effect evaluator 2207 and on the effect/side-effect of the process to determine whether the execution of the process is necessary, the process execution order, the time when the process is executed, or the like.

Figure 23:
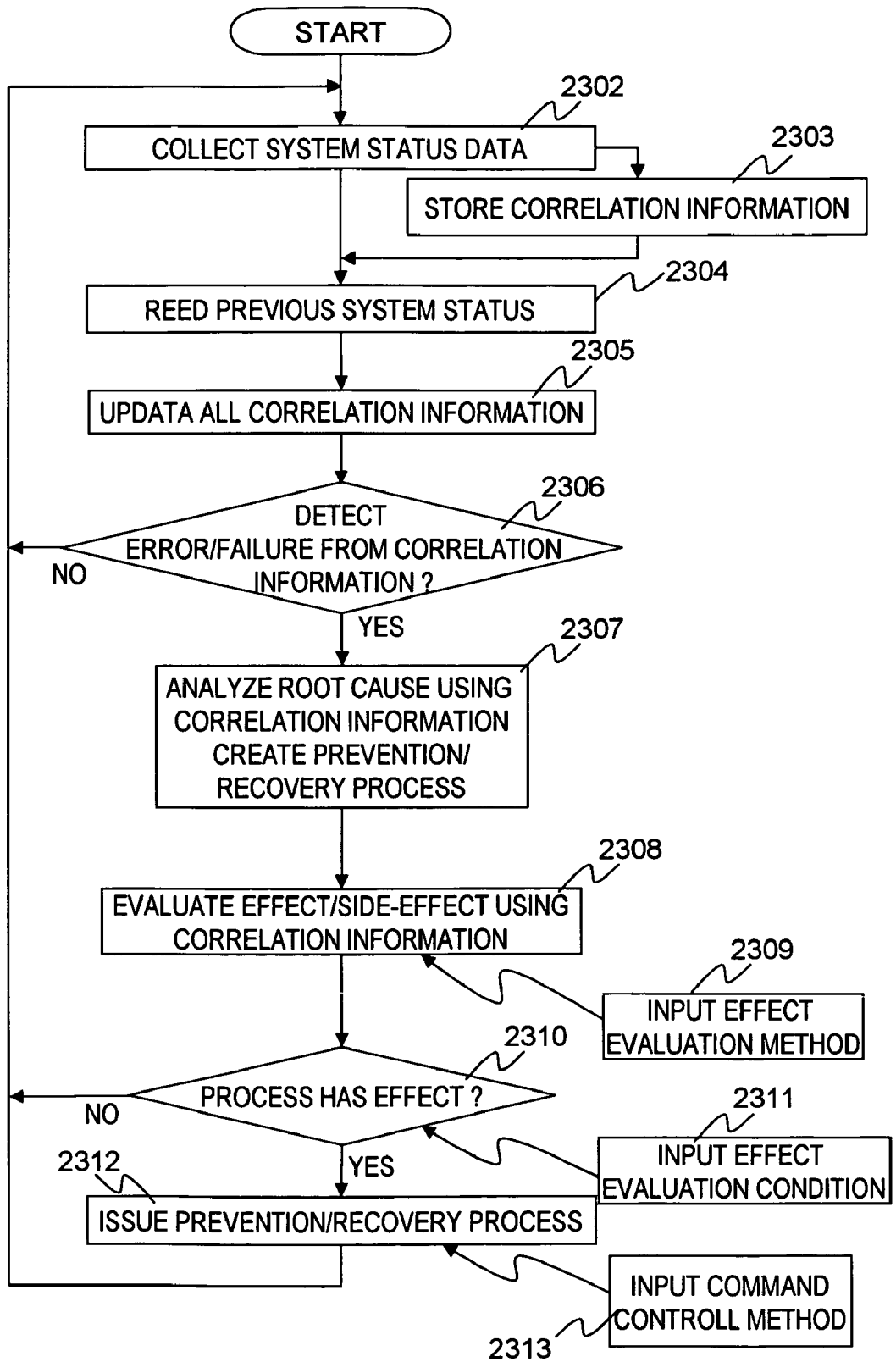
FIG. 23 is a flowchart showing an operation of the controller of failure prevention/recovery according to the fifth embodiment of this invention.

Next, the operation of the controller of failure prevention/recovery 106 of the fifth embodiment will be described with reference to the flowchart of FIG. 23.

First, the data collector/statistical processor 2201 collects information on the status of the target system 101 (Step 2302).

Next, the correlation information updater 2202 stores the information collected by the data collector/statistical processor 2201 (Step 2303), and obtains the previous system status from the data collector/statistical processor 2201 (Step 2304). Then, the correlation information updater 2202 updates all the correlation information, including the one with the time shifted, stored in the correlation information storage 2203 (Step 2305).

Next, the detector/process creator 2206 detects the presence or absence of error/failure based on the current system status and the correlation information (Step 2306). An example of the method of detecting the presence or absence of the error/failure is as described above. The procedure returns to Step 2302 when no error/failure is detected in Step 2306.

On the other hand, when error/failure is detected in Step 2306, the detector/process creator 2206 analyzes the root cause by using the correlation information and creates the prevention/recovery process (Step 2307). An example of the processing of Step 2307 is as described above.

Next, the effect/side-effect evaluator 2207 evaluates the effect and side-effect of the process by using a plurality of correlation information items (Step 2308). The effect and side-effect of the process are evaluated based on conditions inputted to the evaluator/commander controller 2208 in Step 2309.

Then, the process commander 2209 evaluates the presence or absence of the effect of the process (Step 2310). The evaluation as to the effect is made based on the conditions inputted to the evaluator/commander controller 2208 in Step 2311.

In the case where no effect of the process can be expected, the procedure returns to Step 2302. On the other hand, in the case where the effect of the process can be expected, the process commander 2209 issues a command for the prevention/recovery process to the target system 101 (Step 2312). The commander control method regarding whether the command execution is necessary, the command execution order, or the like is based on the method inputted to the evaluator/commander controller 2208 in Step 2313.

Upon issuance of the command for the prevention/recovery process in Step 2312, the procedure returns to Step 2302.

It should be noted that the update of the correlation information in Step 2305 may be carried out at an arbitrary point of time after Step 2306 or before returning to Step 2302. Further, the input processing of Steps 2309, 2311, and 2313 may be omitted as long as predetermined data (method) is used.

As described above, in the fifth embodiment, the plurality of correlation information items shifted are stored while being shifted in time in the correlation information storage 2203, so the correlation between indexes can be grasped more appropriately, which makes it possible to execute the more proper process.

Sixth Embodiment

Figure 24:
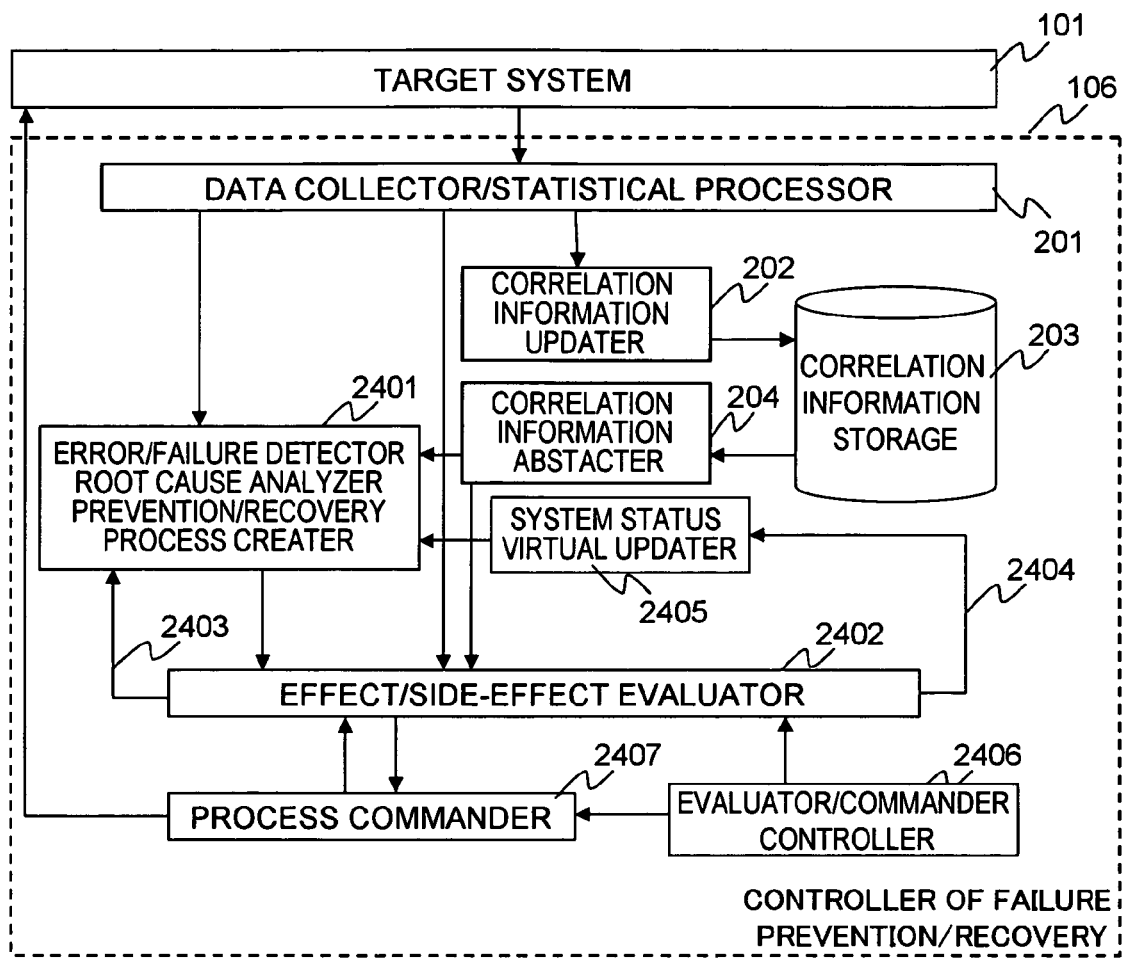
FIG. 24 is a block diagram showing a configuration of a controller of failure prevention/recovery according to a sixth embodiment of this invention.

Next, a sixth embodiment of this invention will be described with reference to FIG. 24. The sixth embodiment is different from the third embodiment in the following points.

In the third embodiment shown in FIG. 18, the feedback loops 1804 and 1805 are provided to re-create the process in the detector/process creator 1801 or receive the input of another process command in the process commander input interface 1802, thereby making it possible to execute another processing. However, it is not always possible to execute a process having an effect and a small side-effect on others by the re-creation of the process and the re-input of the process command. Further, there is a possibility of causing another failure depending on the process to be executed. In view of the above, there is provided a method of executing a process having a large effect and a small side-effect as a whole by simultaneously or subsequently performing a process of enhancing the effect of a process which produces a small effect and has a small side-effect on others. Further, there is also provided a method of predicting the occurrence of another failure to prevent the failure. Therefore, a controller of failure prevention/recovery 106 of the sixth embodiment includes a system status virtual updater 2405.

The controller of failure prevention/recovery 106 of the sixth embodiment includes a data collector/statistical processor 201, a correlation information updater 202, a correlation information storage 203, a correlation information abstracter 204, an error/failure detector-root cause analyzer-prevention/recovery process creator 2401, an effect/side-effect evaluator 2402, the system status virtual updater 2405, an evaluator/commander controller 2406, and a process commander 2407. A processor executes a program stored in a storage to implement those components.

Of the components of the controller of failure prevention/recovery 106 of the sixth embodiment, components which perform the same operation as those of the third embodiment are denoted by the same reference numerals, and the description thereof is omitted. It should be noted that this embodiment does not include the process commander input interface 1802 which is included in the controller of failure prevention/recovery 106 of the third embodiment, but may be provided with a process commander input interface.

The error/failure detector-root cause analyzer-prevention/recovery process creator (hereinafter, abbreviated as detector/process creator) 2401 uses the information which has been collected/statistically processed by the data collector/statistical processor 201 and a correlation information which has been read out from the correlation information storage 203 by the correlation information abstracter 204 to detect an error/failure status of the target system 101. In addition, the detector/process creator 2401 performs feedback on the process in a case where it is evaluated that a sufficient effect cannot be expected or a case where it is evaluated that a side-effect on others is unacceptable by the effect/side-effect evaluator 2402, based on the notification through the feedback loop 2403.

Like the effect/side-effect evaluator 1803 of the third embodiment, the effect/side-effect evaluator 2402 receives from the detector/process creator 2401 a result of a root cause analysis and prevention/recovery process at the time of detecting an error/failure to evaluate an effect/side-effect to be caused on a target system 101 by the execution of the process.

The system status virtual updater 2405 obtains through a feedback loop 2404 information on change in monitoring data and statistical data which is caused after execution of the process evaluated to have a small effect and a small side-effect on others by the effect/side-effect evaluator 2402 and the process commander 2407, and information on the current system status. Then, the system status virtual updater 2405 virtually creates a system status after the execution of the process, and sends the status to the detector/process creator 2401.

The detector/process creator 2401 refers to correlation information from the information on the system status virtually created, to thereby perform error/failure detection and root cause analysis in the system in which the process is executed. Thus, the detector/process creator 2401 creates a process to be executed simultaneously with/subsequently to the process having the small effect.

The evaluator/commander controller 2406 controls the operations of the effect/side-effect evaluator 2402 and the process commander 2407, like the effect/side-effect evaluator 1806 of the third embodiment.

Like the prevention/recovery process commander 1807 of the third embodiment, the process commander 2407 obtains information on the process command inputted from the effect/side-effect evaluator 2402 and on the effect/side-effect of the process to determine whether the execution of the process is necessary, the process execution order, the time when the process is executed, or the like.

Figure 25:
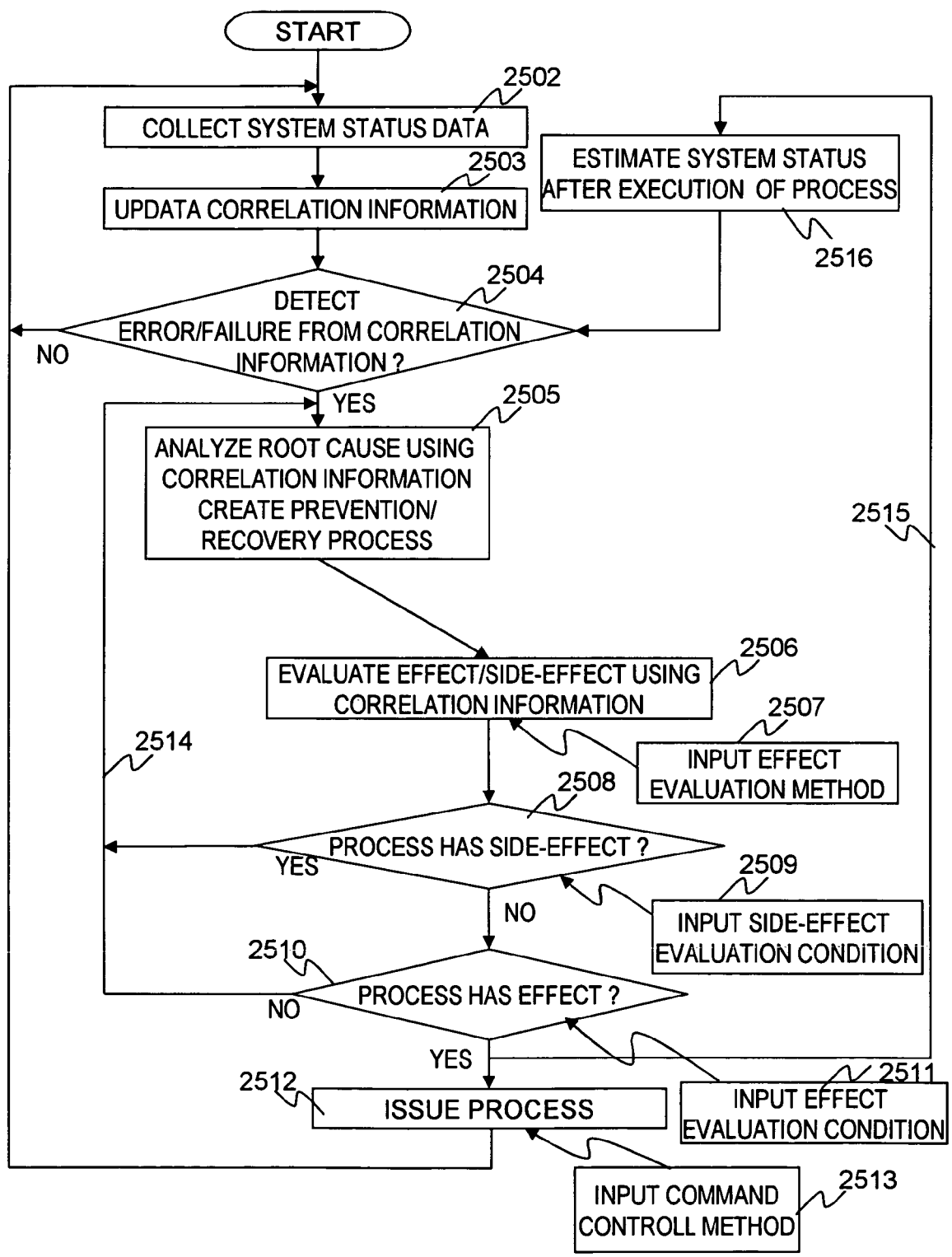
FIG. 25 is a flowchart showing an operation of the controller of failure prevention/recovery according to the sixth embodiment of this invention.

Next, the operation of the controller of failure prevention/recovery 106 of the sixth embodiment will be described with reference to the flowchart of FIG. 25.

First, the data collector/statistical processor 201 collects information on the status of the target system 101 (Step 2502).

Next, the correlation information updater 202 updates the correlation information stored in the correlation information storage 203 using the pieces of information collected by the data collector/statistical processor 201 (Step 2503). It should be noted that in the initial status, the processing of Step 2503 is to add correlation information.

Next, in the Step 2504, the detector/process creator 2401 detects the presence or absence of error/failure based on the current system status and the correlation information (Step 2504). An example of the method of detecting the presence or absence of the error/failure is as described above. The procedure returns to Step 2502 when no error/failure is detected in Step 2504.

On the other hand, when an error/failure is detected in Step 2504, the detector/process creator 2401 analyzes the root cause using the correlation information and creates the prevention/recovery process (Step 2505). An example of the processing of Step 2505 is as described above.

Next, the effect/side-effect evaluator 2402 evaluates the effect and side-effect of the process by using the correlation information (Step 2506). The effect and side-effect of the process are evaluated based on conditions inputted to the evaluator/commander controller 2406 in Step 2507.

The process commander 2407 evaluates the side-effect on others (Step 2508). The evaluation as to the side-effect is made based on conditions inputted to the evaluator/commander controller 2406 in Step 2509. Also, the maximum number of feedback operations 2514 is inputted to the evaluator/commander controller 2406.

When it is evaluated as a result of the evaluation that the side-effect is large, the process is not executed, and the procedure returns to Step 2505 (feedback operation 2514). When the side-effect is evaluated to be insignificant, the evaluation as to the effect of the process is made (Step 2510). The evaluation as to the effect is made based on the conditions inputted to the evaluator/commander controller 2406 in Step 2511.

When it is evaluated as a result of the evaluation that the effect of the process cannot expected, the procedure returns to Step 2505 (feedback operation 2514). On the other hand, the effect of the process can be expected, the procedure returns to Step 2516 (feedback operation 2515), and whether error/failure is detected in the system status after the execution of the process is evaluated (Step 2504).

Further, the process commander 2407 commands the target system 101 to execute the process (Step 2512). The commander control method regarding whether the command execution is necessary, the command execution order, or the like is based on the method inputted to the evaluator/commander controller 2406 in Step 2513.

Upon issuance of the command in Step 2512, the procedure returns to Step 2502.

The feedback operations 2514 and 2515 are limited in accordance with the maximum number of repetitions which has been inputted to the evaluator/commander controller 2406.

As described above, in the sixth embodiment, the feedback loop 2404 for predicting the effect/side-effect of the process is provided. Therefore, another appropriate process is selected, which makes it possible to execute a more proper process.

Seventh Embodiment

Next, a seventh embodiment of this invention is described with reference to FIG. 26.

The correlation information according to the first to sixth embodiments includes the correlation information on an event basis and on a process basis. However, in some cases, events and processes depend on one another on a time axis. In the seventh embodiment, the correlation information is stored in the correlation information storage 203 in a unit of a series of events (event sequence) and a series of processes (process sequence).

Figure 26:
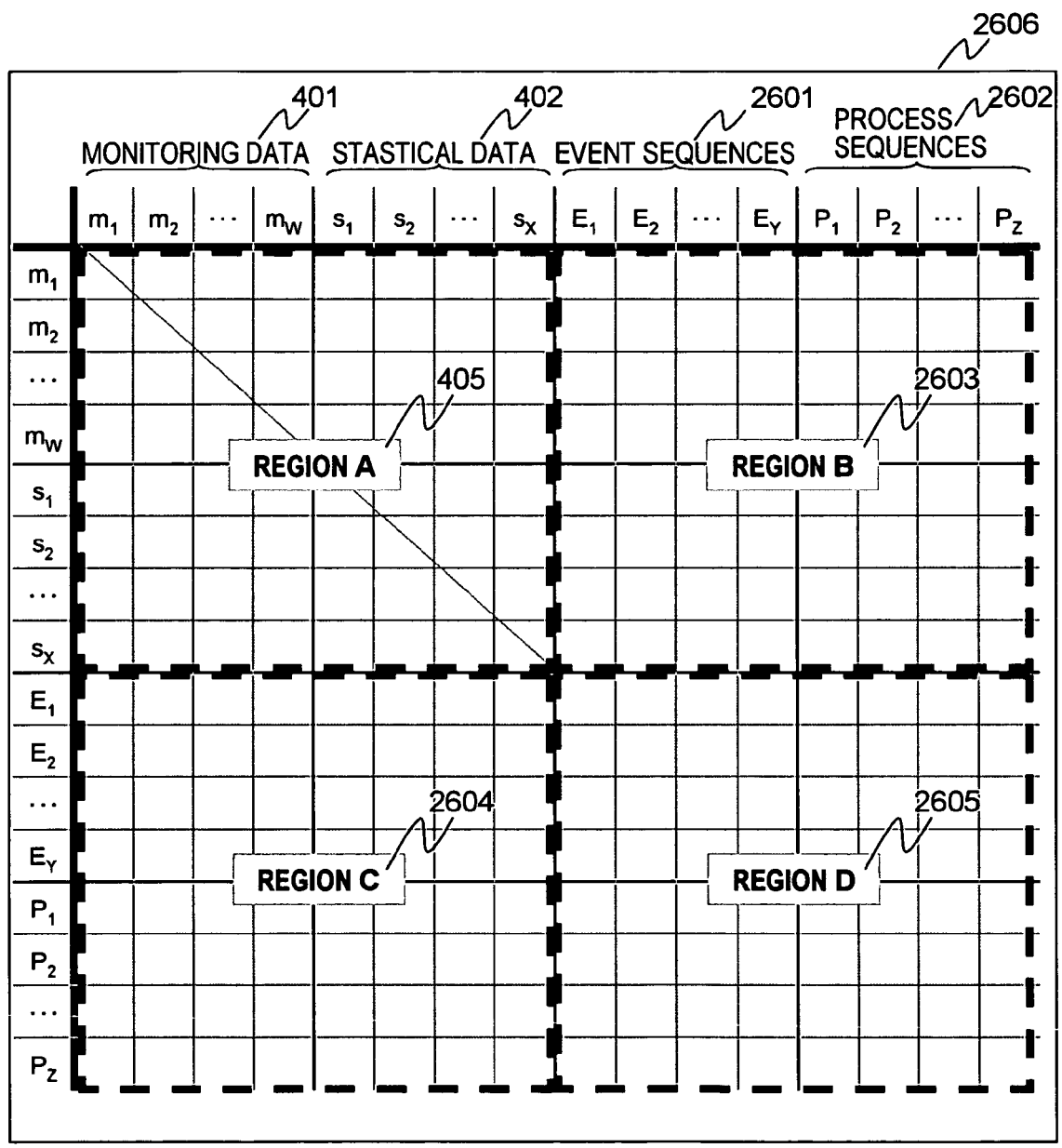
FIG. 26 is an explanatory diagram of correlation information stored in a correlation information storage according to a seventh embodiment of this invention.

FIG. 26 shows a configuration of a correlation table 2606 of the seventh embodiment.

An event sequence 2601 is a group of a plurality of events including an order of occurrence thereof. For example, an event sequence $E_a$ in the figure indicates a series of events in which an event $e_a$ is generated, followed by an event $e_b$, and lastly an event $e_c$ occurs. It should be noted that in the event sequence 2601, a process may be included.

In the similar manner, a process sequence 2602 is a group of a plurality of processes including an execution order thereof. For example, a process sequence $P_a$ indicates a series of processes in which a process $p_a$ is executed, followed by a process $p_b$, and lastly a process $p_c$ is executed. It should be noted that in the process sequence 2602, an event may be included.

As described above, in the seventh embodiment, an effect/side-effect of the process is predicted based on the correlation information on the event sequence and the process sequence to thereby make it possible to select and execute more appropriate process.

As above, seven embodiments are described as embodiments of this invention. This invention also includes a combination of the seven embodiments with one another. Further, this invention includes an embodiment mode in which a part of the functions or operation flow is eliminated in each embodiment.

Figure 27:
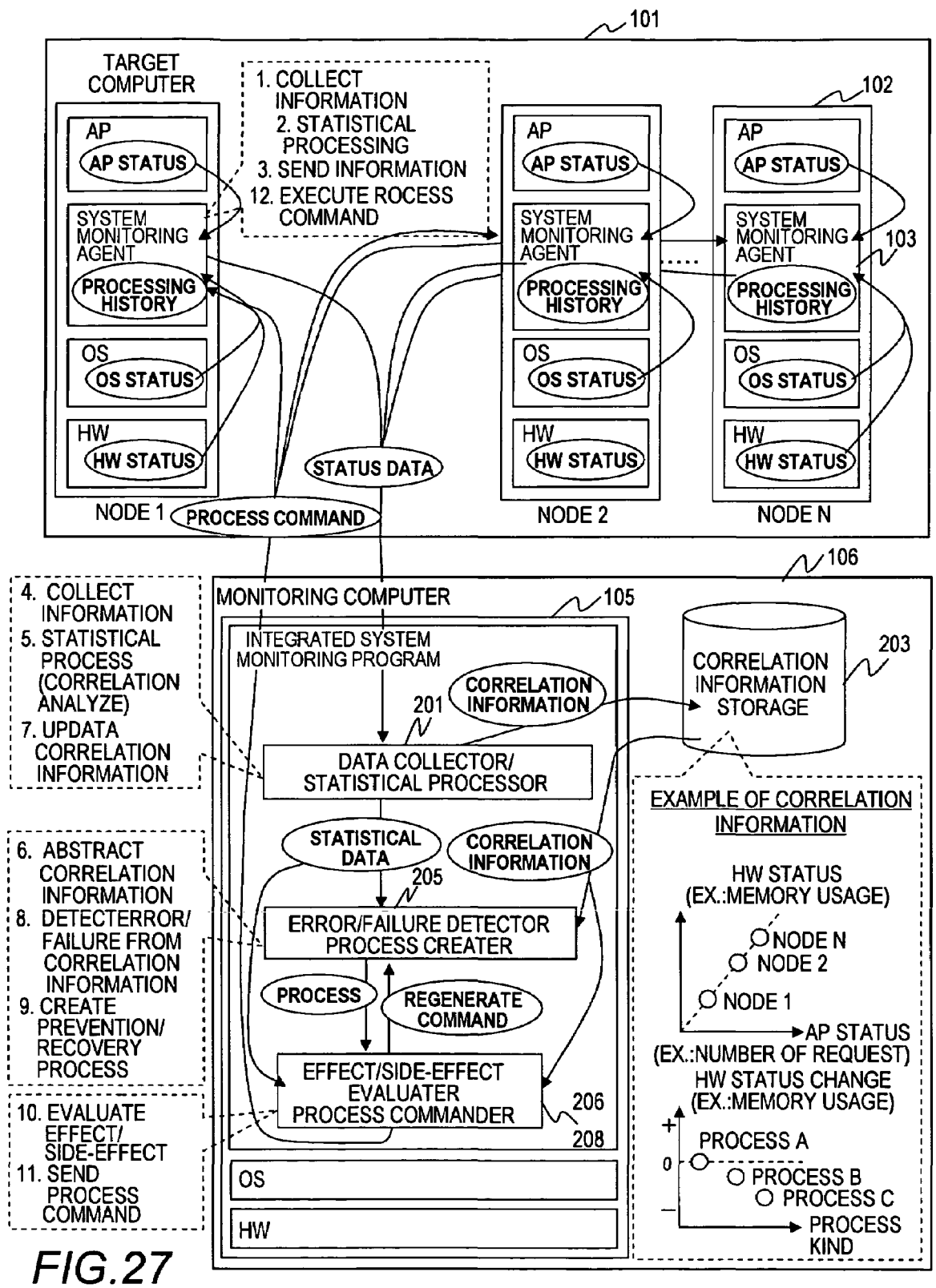
FIG. 27 is an explanatory diagram of a realization example of the computer system according to this invention.

FIG. 27 shows an implementation example of the computer system according to this invention. The target computer system 101 includes N target computers 102 corresponding to nodes 1 to N. In each computer 102, an operating system (OS) is executed on hardware (HW). In addition, operated in the target computer system 101 are a system monitoring agent 103 and an application program (AP). The system monitoring agent 103 collects a hardware status (HW status) such as a usage rate of the CPU and an amount of the memory usage, an operating system status (OS status) such as a number of system calls, an application status (AP status) such as a process throughput, and the like. Further, the system monitoring agent 103 collects processing histories with respect to the target computer 102.

The controller of failure prevention/recovery 106 includes a monitoring computer 105 and the correlation information storage 203. In the monitoring computer 105, an operating system (OS) and an integrated system monitoring program operate on hardware (HW). The integrated system monitoring program includes the collector/statistical processor 201, the detector/process creator 205, and the effect/side-effect evaluator 206 and the process commander 208. The collector/statistical processor 201 collects status information items collected by the system monitoring agent 103 of the target computer system 102 to perform a statistical process such as a correlation analysis. The detector/process creator 205 detects an error/failure caused in the target system 101 based on the statistical information, the correlation information, etc. to create a failure prevention/recovery process for the error/failure. The effect/side-effect evaluator 206 and the process commander 208 evaluates the process created by the detector/process creator 205 on the effect/side-effect basis thereof based on the statistical information and the correlation information to selectively execute the process. The process to be executed is transmitted to the system monitoring agent 103 of the target computer 102 and executed. The correlation information storage 203 exchanges the correlation information with the integrated system monitoring program. Examples of the correlation information include information indicating that an application status (e.g., the number of requests) and a hardware status (e.g., the amount of the memory usage) have a proportional relationship, and information indicating that changes (e.g., changes in amount of the memory usage) in hardware status when the processes A, B, and C are executed in the target computer 102 are different from one another.

An example of the procedure for performing system monitoring using the system monitoring agent 103 and the controller of failure prevention/recovery 106 in the computer system shown in FIG. 27 includes the following 12 steps.

(1) The system monitoring agent 103 collects status data of the target computer.

(2) The system monitoring agent 103 performs statistical processing on the collected information.

(3) The system monitoring agent 103 sends the information to the monitoring computer 105.

(4) The data collector/statistical processor 201 collects information from the system monitoring agent 103.

(5) The data collector/statistical processor 201 performs statistical processing such as correlation analysis.

(6) The error/failure detector/process creator 205 extracts correlation information from the correlation information storage 203.

(7) The data collector/statistical processor 201 updates the correlation information of the correlation information storage 203.

(8) The error/failure detector/process creator 205 detects error/failure from the statistical data or the correlation information.

(9) The error/failure detector/process creator 205 creates a prevention/recovery process for preventing/removing the detected error/failure.

(10) The effect/side-effect evaluator 206 and the prevention/recovery process commander 208 evaluate an effect and side-effect of the process.

(11) The effect/side-effect evaluator 206 and the prevention/recovery process commander 208 send selected process command to the system monitoring agent 103.

(12) The system monitoring agent 103 executes the process command.

Figure 28:
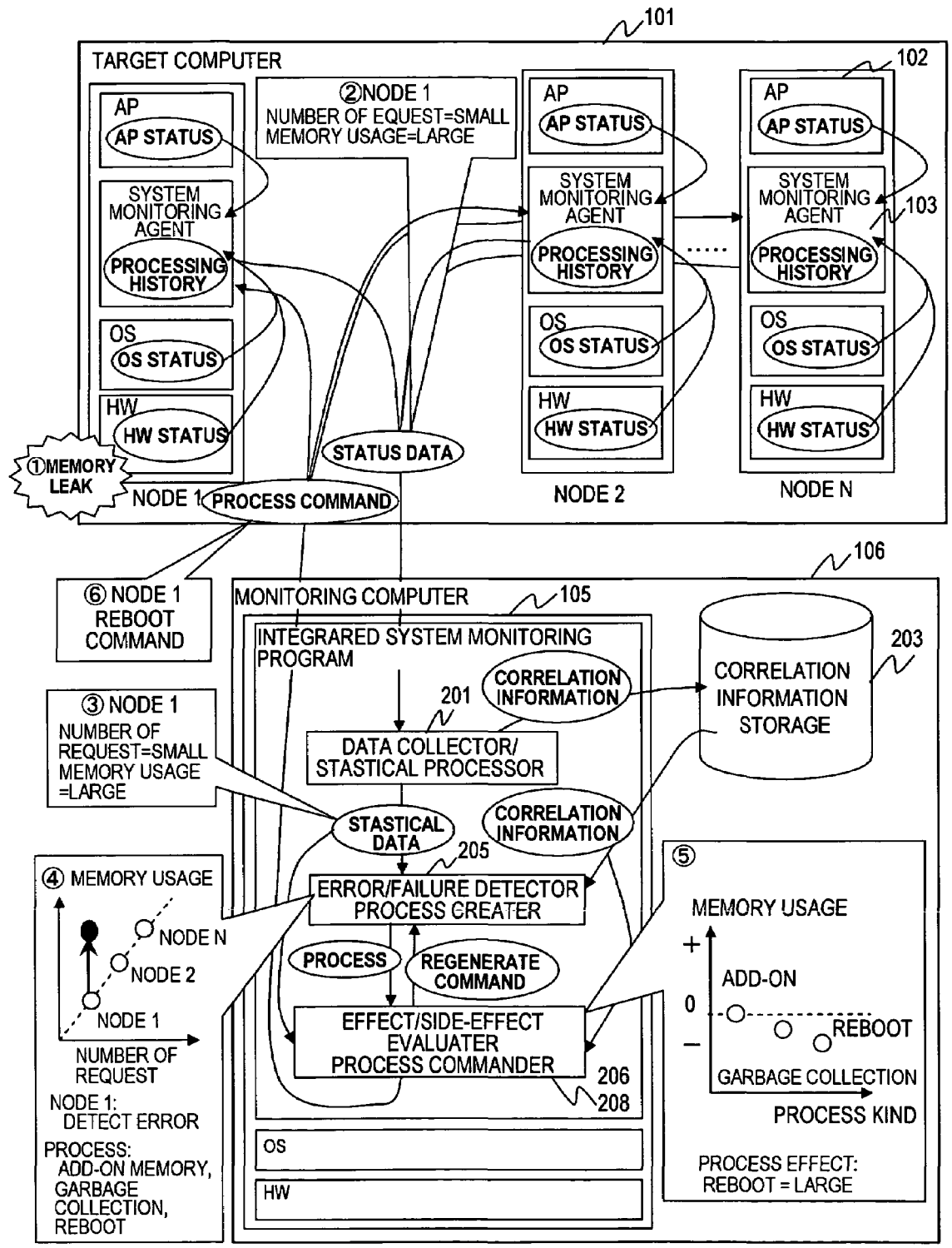
FIG. 28 is a diagram for explaining an operation to be performed when a failure occurs in the realization example of the computer system according to this invention.

FIG. 28 shows an example of the operation at the time of generation of error/failure in the computer system shown in FIG. 27. With reference to FIG. 28, description is made on the case where error/failure of memory leak is generated in the node 1 of the target computer 102 is taken as an example, and information exchanged by the controller of failure prevention/recovery or the like until the error/failure is removed.

The error/failure of the memory leak generated in the node 1 is transferred as status data, which indicates that the number of requests is small but the amount of the memory usage is large in the node 1, from the system monitoring agent 103 of the node 1 to the monitoring computer 105.

The error/failure detector/process creator 205 receives as the statistical data the statistical data indicating that the number of requests is small but the amount of the memory usage is large in the node 1, and receives from the correlation information storage 203 the correlation information updated by the data collector/statistical processor 201 by the time. According to the correlation information, when the number of requests is small, the amount of the memory usage is also small. However, because the amount of the memory usage is large in the node 1 irrespective of the fact that the number of requests is small, the error/failure detector/process creator 205 detects that error/failure is generated in the node 1. The error/failure detector/process creator 205 creates a process in the case of error/failure in which the amount of the memory usage is large. Here, the error/failure detector/process creator 205 outputs addition of a memory, garbage collection (GC), and reboot as the processes.

Each of the effect/side-effect evaluator 206 and the process commander 208 evaluates the increase or decrease of the amount of the memory usage after execution of the three processes based on the correlation information, selects reboot which has the largest process effect, and issues a reboot command to the system monitoring agent 103 of the node 1. Upon reception of the reboot command, the system monitoring agent 103 of the node 1 reboots the node 1.

According to this invention, a failure prevention process and a failure recovering process can be created based on a detection and prediction of the failure, and a system operation with low cost and high availability can be realized by the execution of the prevention/recovery process created in consideration to the effect and side-effect of the process. Accordingly, this invention can be used as a base technique for application servers and operation management tools.

Representative aspects of this invention include the following computer systems in addition to those defined in the claims.

(1) A computer system, in which the process creator detects a prediction of a failure to be caused in the service provided by the computer system with reference to the information collected by the information collector and the correlation information, and creates a process of preventing the failure whose prediction is detected.

(2) A computer system, in which the evaluator cancels, in one of a case where the effect given to the computer system through the execution of the at least one process is smaller than a predetermined threshold, and a case where the side-effect given to the computer system through the execution of the at least one process is larger than a predetermined threshold, the execution of the at least one process, notifies the process creator or the input unit that the execution of the at least one process is canceled, and requests one of a re-creation of the process from the process creator and a re-input of the process from the input unit.

(3) A computer system, in which:
the evaluator evaluates an effect and a side-effect given to the computer system through execution of the process re-created or re-inputted; and when the effect and the side-effect given to the computer system through the execution of the process do not fall within a predetermined range as a result of the evaluation, further requests repeatedly one of a re-creation of the process from the process creator and a re-input of the process from the input unit;
the evaluator includes a function of changing at least one of the number of times the process creator is requested to re-create the process and the number of times the input unit is requested to re-input the process; and
the computer system includes an interface for setting the numbers of times.

(4) A computer system, in which:
the process creator creates, when the side-effect given to the computer system through the execution of the at least one process is larger than a predetermined value, a process of reducing the side-effect with reference to the correlation information.

(5) A computer system, in which:
the evaluator evaluates a side-effect given to the computer system through execution of the process of reducing the side-effect;
the process creator further creates, when the side-effect given to the computer system through the execution of the process of reducing the side-effect is larger than a predetermined threshold, the process of reducing the side-effect repeatedly;
the process creator includes a function of changing the number of times the process of reducing the side-effect is created; and
the computer system includes an interface for setting the number of times for the process creator.

(6) A computer system, in which:
the correlation information storage stores information on a correlation between pieces of the information, collected by the information collector, whose collection times are different from each other.

(7) A computer system, further including a status updater for estimating a status of the computer system in which the at least one process has been executed, based on the result of the evaluation of the effect and the side-effect given to the computer system through the execution of the at least one process, in which:
the process creator detects a failure to be caused in the computer system of the estimated status with reference to the correlation information, and creates a process of avoiding the detected failure.

(8) A computer system, in which:
the evaluator evaluates a side-effect given to the computer system through execution of the created process of avoiding the detected failure;
the process creator further creates, when a failure that has occurred in the computer system through the execution of the process of avoiding the detected failure is detected as a result of the evaluation, the process of avoiding the detected failure repeatedly;
the process creator includes a function of changing the number of times the process of reducing the side-effect is created; and
the computer system further includes an interface for setting the number of times.

(9) A computer system, in which:
the correlation information storage stores, as the correlation information, at least one of correlation between statistical value calculated using the information collected by the information collector and correlation between the collected information and the statistical value.

(10) A computer system, in which:
the correlation information storage stores the information collected by the information collector such that information obtained when the events have been generated is separated from the other information.

(11) A computer system, in which:
the correlation information storage stores the collected information such that information obtained before the events have been generated is separated from information obtained after the events have is generated.

(12) A computer system, in which:
the correlation information storage stores, as the correlation information, at least one of correlation between event sequences each including a plurality of events, and correlation between the collected information and the event sequences.

While the present invention has been described in detail and pictorially in the accompanying drawings, the present invention is not limited to such detail but covers various obvious modifications and equivalent arrangements, which fall within the purview of the appended claims.

What is claimed is:

1. A control method for a computer system including at least one computer, comprising:
   collecting information on operating statuses inside and outside the computer system, on a process executed in the computer system, and on at least one of records of events that have been generated in the computer system;
   storing correlation information indicating a correlation among the collected pieces of information;
   at least one of: detecting a failure that has occurred in a service provided by the computer system from the collected information with reference to the stored correlation information and creating a recovering process for the detected failure; and inputting a recovering process executed by the computer system;
   evaluating an effect and a side-effect given to the computer system through execution of at least one of the created process and the inputted process with reference to the correlation information;
   determining at least one of a need, an order, and time of execution of the at least one process whose effect and side-effect are evaluated;
   canceling, in one of a case where the effect given to the computer system through the execution of the at least one process is smaller than a predetermined threshold, and a case where the side-effect given to the computer system through the execution of the at least one process is larger than a predetermined threshold, the execution of the at least one process; and
   performing one of a re-creation of the process and a request for a re-input of the process.

2. The control method according to claim 1, further comprising:
   detecting a prediction of a failure to be caused in the service provided by the computer system with reference to the collected information and the correlation information; and
   creating a process of preventing the failure whose prediction is detected.

3. The control method according to claim 1, further comprising:
   evaluating an effect and a side-effect given to the computer system through execution of one of the process on which one of the re-creation and the re-input is performed; and
   further performing, when the effect and the side-effect given to the computer system through the execution of the process are out of a predetermined range as a result of the evaluation, one of the repeated re-creation of the process, and the repeated request for the re-input of the process; and
   limiting at least one of the number of times the process is re-created and the number of times the process is requested to be re-inputted.

4. The control method according to claim 1, further comprising creating, when the side-effect given to the computer system through the execution of the at least one process is larger than a predetermined value, a process of reducing the side-effect with reference to the correlation information.

5. The control method according to claim 4, further comprising:
   evaluating a side-effect given to the computer system through execution of the process of reducing the created side-effect;
   further creating, when the side-effect given to the computer system through the execution of the process of reducing the side-effect is larger than a predetermined threshold as a result of the evaluation, the process of reducing the side-effect repeatedly; and
   limiting the number of times the process of reducing the side-effect is created.

6. The control method according to claim 1, further comprising storing information on a correlation between pieces of the collected information whose collection times are different from each other.

7. The control method according to claim 1, further comprising:
   estimating a status of the computer system in which the at least one process has been executed, based on the result of the evaluation of the effect and the side-effect given to the computer system through the execution of the at least one process;
   detecting a failure to be caused in the computer system of the estimated status with reference to the correlation information; and
   creating a process of avoiding the detected failure.

8. The control method according to claim 7, further comprising:
   evaluating a side-effect given to the computer system through execution of the created process of avoiding the detected failure;
   further creating, when a failure that has occurred in the computer system through the execution of the process of avoiding the detected failure is detected as a result of the evaluation, the process of avoiding the detected failure repeatedly; and
   limiting the number of times the process of avoiding the detected failure is created.

9. The control method according to claim 1, further comprising changing at least one of an evaluation method and a criterion for the effect and the side-effect given to the computer system through execution of the at least one process.

10. The control method according to claim 1, further comprising changing at least one of the need, the order, and the time of execution of the at least one process whose effect and side-effect are evaluated.

11. The control method according to claim 1, further comprising storing, as the correlation information, at least one of a correlation between statistical values calculated using the collected information and a correlation between the collected information and the statistical values.

12. The control method according to claim 1, further comprising storing the collected information such that information obtained when the events have been generated is separated from the other information.

13. The control method according to claim 1, further comprising storing the collected information such that information obtained before the events have been generated is separated from information obtained after the events have been generated.

14. The control method according to claim 1, further comprising storing, as the correlation information, at least one of a correlation between event sequences each including a plurality of events, and a correlation between the collected information and the event sequences.

15. A computer system including at least one computer, wherein:
 each computer comprises a processor, a communication interface, a storage device, and an input/output device; and
 the computer is configured to comprise:
 a data collector, which is configured by the processor, for collecting, via the communication interface, information on operating statuses inside and outside the computer system, on a process executed by the computer system, and on at least one of records of events that have been generated in the computer system;
 a correlation information storage unit for storing, in the storage device, correlation information indicating a correlation among the collected pieces of information;
 at least one of a process creator, which configures the processor, for detecting a failure that has occurred in a service provided by the computer system from the collected information with reference to the stored correlation information and creating a recovering process the detected failure, and an input unit, configured by the input/output device, an input of a process executed by the computer system;
 an evaluator, which is configured by one of the processor and the input/output device, for evaluating an effect and a side-effect given to the computer system through execution of at least one of the created process and the inputted process with reference to the correlation information stored in the storage device; and
 a process commander, which is configured by one of the processor and the input/output device, for determining at least one of a need, an order, and time of execution of the at least one process whose effect and side-effect are evaluated, and
 wherein:
 the evaluator cancels the execution of the at least one process in one of a case where the effect given to the computer system through the execution of the at least one process is smaller than a predetermined threshold, and a case where the side-effect given to the computer system through the execution of the at least one process is larger than a predetermined threshold, notifies at least one of the process creator and the input unit that the at least one process is not executed via the communication interface, and requests one of the re-creation from the process and the re-input of the process by the input/output device from the input unit;
 the evaluator comprises a function of changing the number of times the process creator is requested to re-create the process and the number of times the input unit is requested to re-input the process;
 the process creator creates, when the side-effect given to the computer system through the execution of the at least one process is larger than a predetermined threshold, a process of reducing the side-effect with reference to the correlation information;
 the process creator changes the number of times the process of reducing the side-effect is created; and
 the computer system further comprises an interface for setting the numbers of times the process of reducing the side-effect is created, for the evaluator and the process creator.

16. The computer system according to claim 15, wherein:
 the evaluator changes at least one of an evaluation method and an evaluation criterion for the effect and the side-effect given to the computer system through execution of the at least one process; and
 the computer system further comprises an interface for setting the evaluation method and the evaluation criterion.

17. The computer system according to claim 15, wherein:
 the process commander, which is configured by at least one of the processor and the input/output device, comprises a function of changing at least one of the need, the order, and the time of execution of the at least one process; and
 the computer system further comprises an interface for setting the need, the order, and the time of execution of the at least one process.

18. The computer system according to claim 15, further comprises:
 a status updater, which is configured by the processor, for estimating a status of the computer system in which the at least one process has been executed, based on the result of the evaluation of the effect and the side-effect given to the computer system through the execution of the at least one process, wherein:
 the process creator detects a failure to be caused in the computer system of the estimated status with reference to the correlation information and creates, by the processor, a process of avoiding the detected failure;
 the process creator comprises a function of changing the number of times the process of recovering the detected failure is created; and
 the computer system further comprises an interface for setting the number of times the process of recovering the detected failure is created, for the process creator.

* * * * *